US012640860B2

(12) United States Patent
Park et al.

(10) Patent No.: US 12,640,860 B2
(45) Date of Patent: May 26, 2026

(54) METHOD OF CONFIGURING AND INDICATING BEAM INFORMATION FOR M-TRP COMMUNICATION IN WIRELESS COMMUNICATION SYSTEM

(71) Applicant: Samsung Electronics Co., Ltd.,
Suwon-si (KR)

(72) Inventors: Kyoungmin Park, Suwon-si (KR);
Ameha Tsegaye Abebe, Suwon-si
(KR); Seongmok Lim, Suwon-si (KR);
Youngrok Jang, Suwon-si (KR);
Hyoungju Ji, Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 584 days.

(21) Appl. No.: 18/159,949

(22) Filed: Jan. 26, 2023

(65) Prior Publication Data
US 2023/0239091 A1      Jul. 27, 2023

(30) Foreign Application Priority Data

Jan. 27, 2022     (KR) ........................ 10-2022-0012189

(51) Int. Cl.
*H04L 5/00*          (2006.01)
*H04W 72/232*          (2023.01)
(52) U.S. Cl.
CPC .......... *H04L 5/0035* (2013.01); *H04L 5/0053*
(2013.01); *H04W 72/232* (2023.01)
(58) Field of Classification Search
CPC ........ H04L 5/00; H04L 5/0053; H04W 72/23;
H04W 36/06; H04W 68/005;
(Continued)

(56) References Cited

U.S. PATENT DOCUMENTS

| | | | | |
|---|---|---|---|---|
| 11,006,403 B2 * | 5/2021 | Zhang | ................... | H04L 5/0053 |
| 11,038,727 B2 * | 6/2021 | Khoshnevisan | ....... | H04B 7/024 |

(Continued)

FOREIGN PATENT DOCUMENTS

| | | |
|---|---|---|
| WO | 2021/191874 A1 | 9/2021 |
| WO | 2021/234212 A1 | 11/2021 |

OTHER PUBLICATIONS

Extended European Search Report dated Feb. 3, 2025, issued in a
European Patent Application No. 23747348.3.

(Continued)

*Primary Examiner* — Man U Phan
(74) *Attorney, Agent, or Firm* — Jefferson IP Law, LLP

(57)          ABSTRACT

The disclosure relates to a 5$^{th}$ generation (5G) communica-
tion system or a 6$^{th}$ generation (6G) communication system
for supporting higher data rates beyond a 4$^{th}$ generation (4G)
communication system such as long term evolution (LTE).
A method of a user equipment in a wireless communication
system is provided. The method includes receiving, a con-
figuration information for a plurality of transmission con-
figuration indicator (TCI) state including a first TCI state of
a first type for a control resource set (CORESET) and a
second TCI state of a second type which is different from a
first type, receiving, a physical downlink control channel
(PDCCH) based on the first TCI state, the first DCI including
information indicating the first TCI state for a first physical
downlink shared channel (PDSCH) scheduled to be trans-
mitted from a first transmission reception point (TRP) and
information indicating a second TCI state for a second
PDSCH scheduled to be transmitted from a second TRP.

16 Claims, 25 Drawing Sheets

(58) Field of Classification Search
CPC ... H04W 72/042; H04W 72/04; H04W 76/15;
H04W 68/00; H04B 7/024
USPC .......................................................... 370/329
See application file for complete search history.

(56) References Cited

U.S. PATENT DOCUMENTS

| | | | | |
|---|---|---|---|---|
| 11,201,711 | B2 * | 12/2021 | Tsai ..................... | H04L 27/2602 |
| 11,678,354 | B2 * | 6/2023 | Park ...................... | H04W 72/53 |
| | | | | 370/329 |
| 2019/0342907 | A1 * | 11/2019 | Huang .................. | H04W 72/23 |
| 2020/0045700 | A1 * | 2/2020 | Sun ........................ | H04L 5/0091 |
| 2020/0077369 | A1 * | 3/2020 | Zhang .................. | H04W 72/51 |
| 2020/0178272 | A1 * | 6/2020 | Khoshnevisan .. | H04W 72/1263 |
| 2020/0229161 | A1 * | 7/2020 | Raghavan ............. | H04L 5/0048 |
| 2020/0313729 | A1 * | 10/2020 | Zhou .................... | H04B 7/0695 |
| 2020/0313819 | A1 * | 10/2020 | Zhou .................... | H04L 5/0091 |
| 2020/0351055 | A1 * | 11/2020 | Manolakos ............ | H04B 7/088 |
| 2020/0351841 | A1 * | 11/2020 | Cirik .................... | H04B 7/0695 |
| 2020/0351892 | A1 * | 11/2020 | Yi ........................ | H04W 72/53 |
| 2021/0014837 | A1 * | 1/2021 | Papasakellariou .... | H04L 5/0053 |
| 2021/0050934 | A1 * | 2/2021 | Khoshnevisan ...... | H04L 1/0067 |
| 2021/0099898 | A1 * | 4/2021 | You ....................... | H04W 24/08 |
| 2021/0227530 | A1 | 7/2021 | Farag et al. | |
| 2021/0306867 | A1 * | 9/2021 | Hamidi-Sepehr ..... | H04W 76/20 |
| 2021/0314953 | A1 | 10/2021 | Park et al. | |
| 2021/0321442 | A1 | 10/2021 | Jung et al. | |
| 2021/0352629 | A1 * | 11/2021 | Haghighat ............ | H04L 1/1896 |
| 2022/0022192 | A1 | 1/2022 | Sakhnini et al. | |
| 2023/0188308 | A1 | 6/2023 | Karjalainen et al. | |

OTHER PUBLICATIONS

International Search Report dated May 1, 2023, issued in an International Application No. PCT/KR2023/001209.

* cited by examiner

TCI state #0
(700)

TCI state #1
(705)

TCI state #2
(710)

S
(1400)

L (1405)

| 0 | 1 | 2 | 3 | 4 | 5 | 6 | 7 | 8 | 9 | 10 | 11 | 12 | 13 |

OFDM symbol $$\text{Slot}\left[n \cdot \frac{2^{\mu_{\text{PDSCH}}}}{2^{\mu_{\text{PDCCH}}}}\right] + K_0 \ (1410)$$

RRC-configured TCI states (1600)

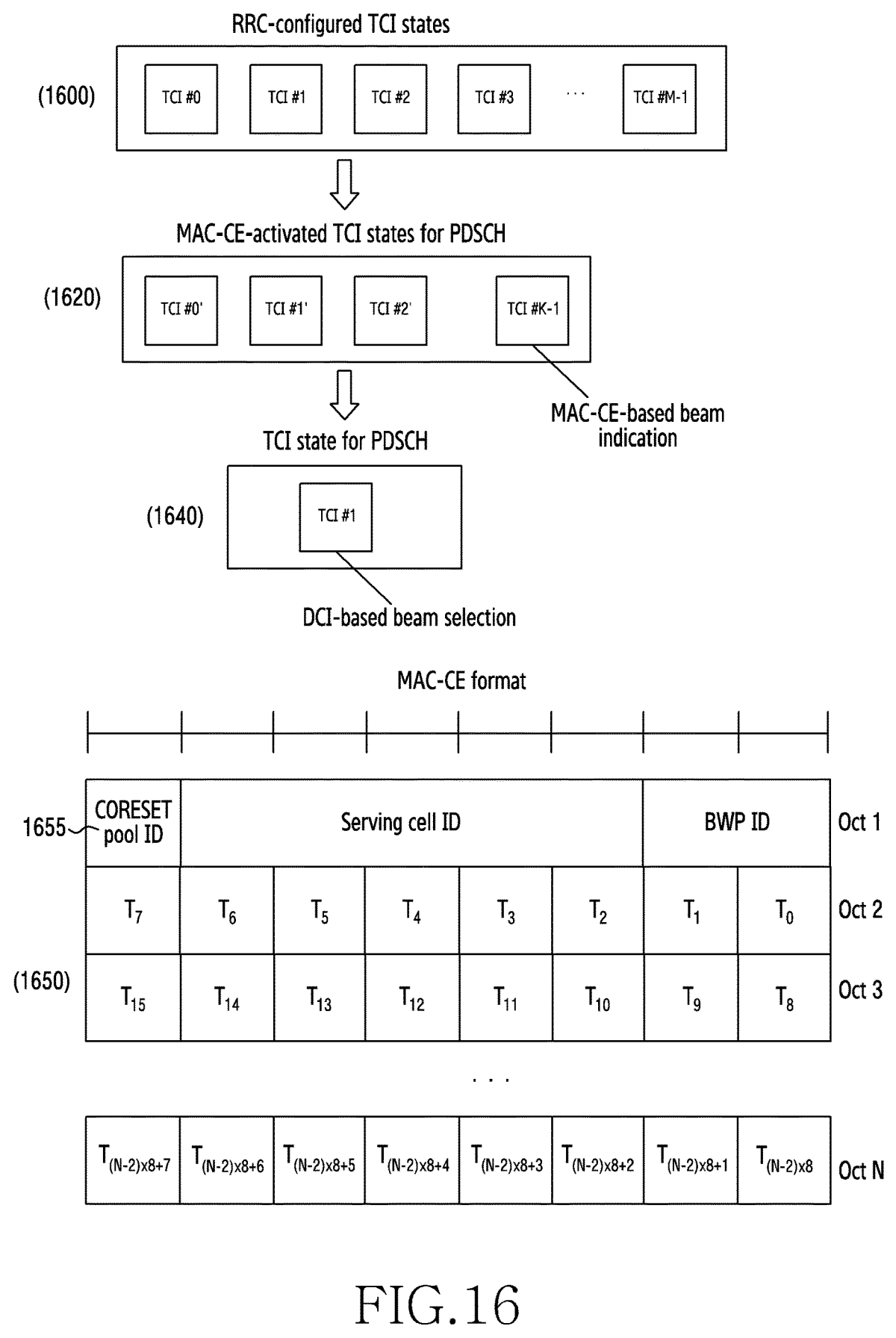

| TCI #0 | TCI #1 | TCI #2 | TCI #3 | ... | TCI #M-1 |

MAC-CE-activated TCI states for PDSCH (1620)

| TCI #0' | TCI #1' | TCI #2' | TCI #K-1 |

MAC-CE-based beam indication

TCI state for PDSCH (1640)

| TCI #1 |

DCI-based beam selection

MAC-CE format

| | | | | | | | | |

| CORESET pool ID | Serving cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

1655

(1650)

. . .

| $T_{(N-2)x8+7}$ | $T_{(N-2)x8+6}$ | $T_{(N-2)x8+5}$ | $T_{(N-2)x8+4}$ | $T_{(N-2)x8+3}$ | $T_{(N-2)x8+2}$ | $T_{(N-2)x8+1}$ | $T_{(N-2)x8}$ | Oct N |

FIG.16

METHOD OF CONFIGURING AND INDICATING BEAM INFORMATION FOR M-TRP COMMUNICATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0012189, filed on Jan. 27, 2022, in the Korean Intellectual Property Office, the disclosure of which is incorporated by reference herein in its entirety.

BACKGROUND

1. Field

The disclosure relates to operations of a base station (BS) and a user equipment (UE) in a wireless communication system. More particularly, the disclosure relates to a method and an apparatus for controlling beams for multiple transmission and reception point (M-TRP) communication in a wireless communication system.

2. Description of Related Art

To meet the increased demand for wireless data traffic since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) system'.

The 5G communication system is considered to be implemented in higher frequency (millimeter wave (mmWave)) bands, e.g., 28 gigahertz (GHz) or 60 GHz bands, so as to accomplish higher data rates. To decrease propagation loss of the radio waves and increase the transmission distance, the beamforming, massive multiple-input multiple-output (mMIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, the Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Accordingly, various attempts to apply the 5G communication system to the IoT are being made. For example, 5G communication technologies, such as a sensor network, M2M and MTC, are implemented by schemes, such as beamforming, MIMO, and an array antenna. The application of a cloud wireless access network (cloud RAN) as the aforementioned big data processing technology may be said to be an example of convergence between the third eye games (3eG) technology and the IoT technology.

As described above, various services can be provided according to the development of a wireless communication system, and thus a method of more smoothly providing the services is needed. More particularly, it is required to provide an efficient beam control scheme for M-TRP communication in the wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for providing beams for M-TRP communication in a wireless communication system.

Additional aspects will be set forth in part in the description which follows and, in part, will be apparent from the description, or may be learned by practice of the presented embodiments.

In accordance with an aspect of the disclosure, a method of a user equipment (UE) in a wireless communication system is provided. The method includes receiving, from a base station, a configuration information for a plurality of transmission configuration indicator (TCI) state including a first TCI state of a first type for a control resource set (CORESET) and a second TCI state of a second type which is different from a first type, receiving, from the base station, a physical downlink control channel (PDCCH) including a first downlink control information (DCI) based on the first TCI state, the first DCI including information indicating the first TCI state for a first physical downlink shared channel (PDSCH) scheduled to be transmitted from a first transmission reception point (TRP) and information indicating a second TCI state for a second PDSCH scheduled to be transmitted from a second TRP, and receiving the first PDSCH based on the first TCI state from the first TRP and the second PDSCH based on the second TCI state from the second TRP.

In an embodiment, the method may further include receiving, from the base station, the PDCCH including a second DCI based on the first TCI state, the second DCI including at least one of information indicating the third TCI state of the first type for the first PDSCH or information indicating a forth TCI state of the second type for the second PDSCH, in case that the second DCI includes the information indicating the third TCI state of the first type, applying the third TCI state after a beam application time from receiving of the second DCI, and in case that the second DCI includes the information indicating the forth TCI state of the second type, applying the forth TCI state immediately after receiving of the second DCI.

In an embodiment, the method may further include in case that the second DCI includes the information indicating the third TCI state of the first type, transmitting, to the base station, acknowledgement (ACK) indicating successful reception of the third TCI state.

In an embodiment, a TCI state of the first type may be a permanent type TCI state (P-TCI state), and a TCI state of the second type may be a temporary type TCI state (TP-TCI state).

In an embodiment, the base station may include at least one of the first TRP and the second TRP.

In accordance with another aspect of the disclosure, a method of a base station in a wireless communication system is provided. The method includes transmitting, to a user equipment (UE), a configuration information for a plurality of transmission configuration indicator (TCI) state including a first TCI state of a first type for a control resource set (CORESET) and a second TCI state of a second type which is different from a first type, transmitting, to the UE, a physical downlink control channel (PDCCH) including a first downlink control information (DCI) based on the first TCI state, the first DCI including information indicating the first TCI state for a first physical downlink shared channel (PDSCH) scheduled to be transmitted from a first transmission reception point (TRP) and information indicating a second TCI state for a second PDSCH scheduled to be transmitted from a second TRP, and transmitting, to the UE, the first PDSCH based on the first TCI state from the first TRP and the second PDSCH based on the second TCI state from the second TRP.

In an embodiment, the method may further include transmitting, to the UE, the PDCCH including a second DCI based on the first TCI state, the second DCI including at least one of information indicating the third TCI state of the first type for the first PDSCH or information indicating a forth TCI state of the second type for the second PDSCH, in case that the second DCI includes the information indicating the third TCI state of the first type, applying the third TCI state after acknowledgement (ACK) indicating successful reception of the third TCI state from the UE.

In an embodiment, the method may further include in case that the second DCI includes the information indicating the forth TCI state of the second type, applying the forth TCI state immediately after transmitting of the second DCI.

In an embodiment, a TCI state of the first type may be a permanent type TCI state (P-TCI state), and a TCI state of the second type may be a temporary type TCI state (TP-TCI state).

In an embodiment, the base station may include at least one of the first TRP and the second TRP.

In accordance with another aspect of the disclosure, a user equipment (UE) in a wireless communication system is provided. The UE includes a transceiver and at least one processor coupled with the transceiver and configured to receive, from a base station, a configuration information for a plurality of transmission configuration indicator (TCI)

state including a first TCI state of a first type for a control resource set (CORESET) and a second TCI state of a second type which is different from a first type, receive, from the base station, a physical downlink control channel (PDCCH) including a first downlink control information (DCI) based on the first TCI state, the first DCI including information indicating the first TCI state for a first physical downlink shared channel (PDSCH) scheduled to be transmitted from a first transmission reception point (TRP) and information indicating a second TCI state for a second PDSCH scheduled to be transmitted from a second TRP, and receive the first PDSCH based on the first TCI state from the first TRP and the second PDSCH based on the second TCI state from the second TRP.

In an embodiment, the at least one processor may further configured to receive, from the base station, the PDCCH including a second DCI based on the first TCI state, the second DCI including at least one of information indicating the third TCI state of the first type for the first PDSCH or information indicating a forth TCI state of the second type for the second PDSCH, in case that the second DCI includes the information indicating the third TCI state of the first type, apply the third TCI state after a beam application time from receiving of the second DCI, and in case that the second DCI includes the information indicating the forth TCI state of the second type, apply the forth TCI state immediately after receiving of the second DCI.

In an embodiment, the at least one processor may further configure to in case that the second DCI includes the information indicating the third TCI state of the first type, transmit, to the base station, acknowledgement (ACK) indicating successful reception of the third TCI state.

In an embodiment, a TCI state of the first type may be a permanent type TCI state (P-TCI state), and a TCI state of the second type may be a temporary type TCI state (TP-TCI state).

In an embodiment, the base station may include at least one of the first TRP and the second TRP.

In accordance with another aspect of the disclosure, a base station in a wireless communication system is provided. The base station includes a transceiver and at least one processor coupled with the transceiver and configured to transmit, to a user equipment (UE), a configuration information for a plurality of transmission configuration indicator (TCI) state including a first TCI state of a first type for a control resource set (CORESET) and a second TCI state of a second type which is different from a first type, transmit, to the UE, a physical downlink control channel (PDCCH) including a first downlink control information (DCI) based on the first TCI state, the first DCI including information indicating the first TCI state for a first physical downlink shared channel (PDSCH) scheduled to be transmitted from a first transmission reception point (TRP) and information indicating a second TCI state for a second PDSCH scheduled to be transmitted from a second TRP, and transmit, to the UE, the first PDSCH based on the first TCI state from the first TRP and the second PDSCH based on the second TCI state from the second TRP.

In an embodiment, the at least one processor may further configure to transmit, to the UE, the PDCCH including a second DCI based on the first TCI state, the second DCI including at least one of information indicating the third TCI state of the first type for the first PDSCH or information indicating a forth TCI state of the second type for the second PDSCH, in case that the second DCI includes the information indicating the third TCI state of the first type, apply the third TCI state after acknowledgement (ACK) indicating successful reception of the third TCI state from the UE.

In an embodiment, the at least one processor may further configure to in case that the second DCI includes the information indicating the forth TCI state of the second type, apply the forth TCI state immediately after transmitting of the second DCI.

In an embodiment, a TCI state of the first type may be a permanent type TCI state (P-TCI state), and a TCI state of the second type may be a temporary type TCI state (TP-TCI state).

In an embodiment, the base station may include at least one of the first TRP and the second TRP.

Disclosed embodiments provide an apparatus and a method for effectively providing a service in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Figure 12:
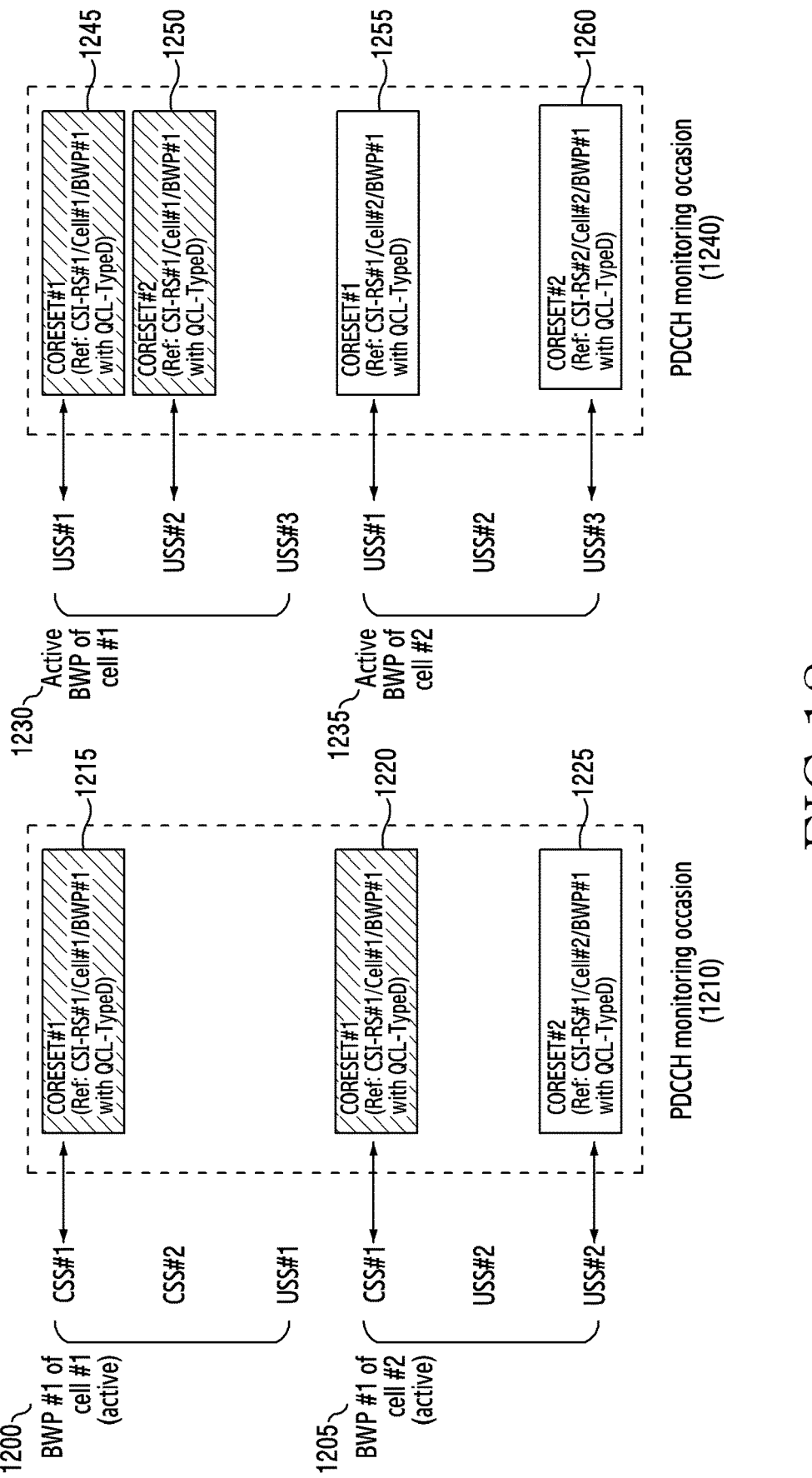
Figure 13:
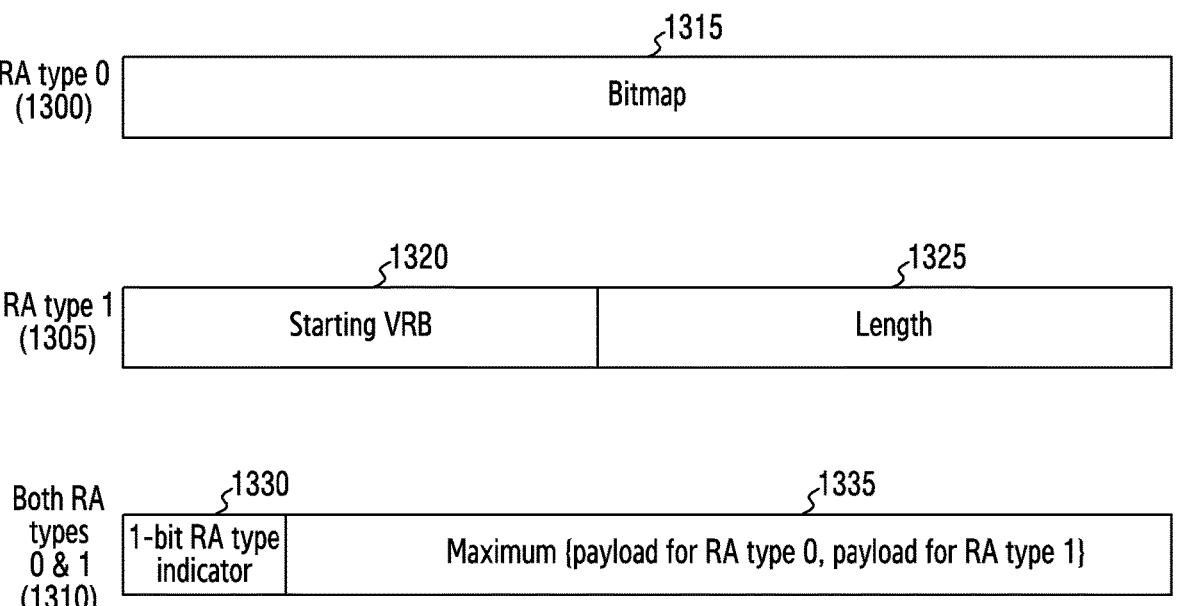
Figure 14:
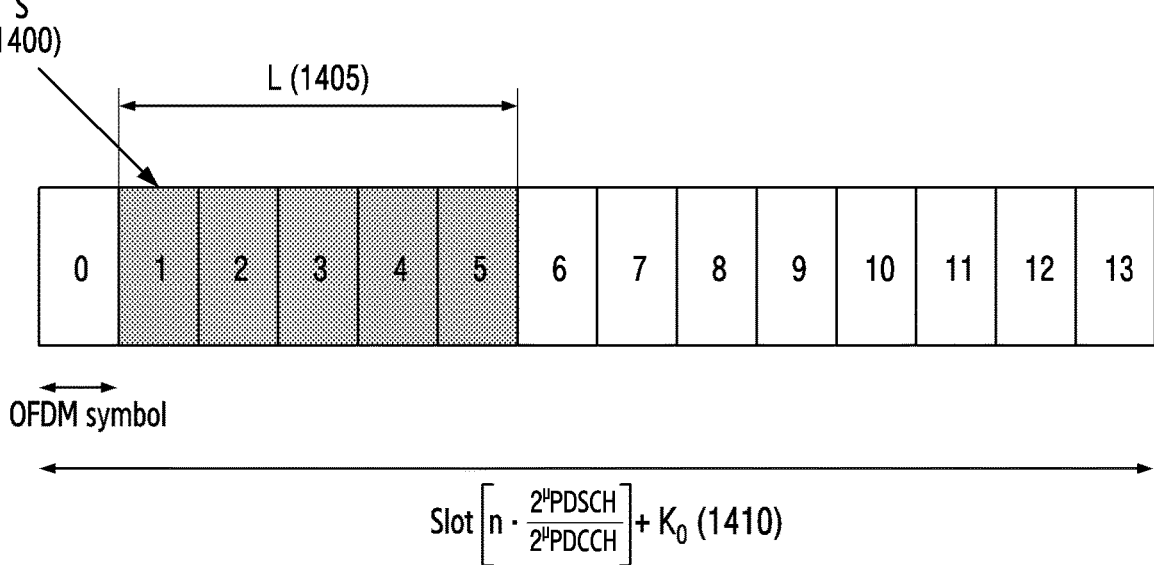
Figure 15:
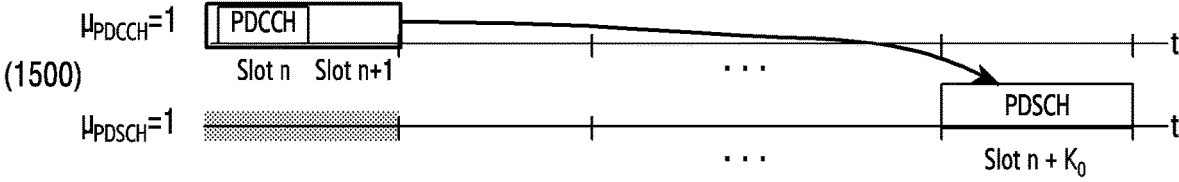
Figure 15:
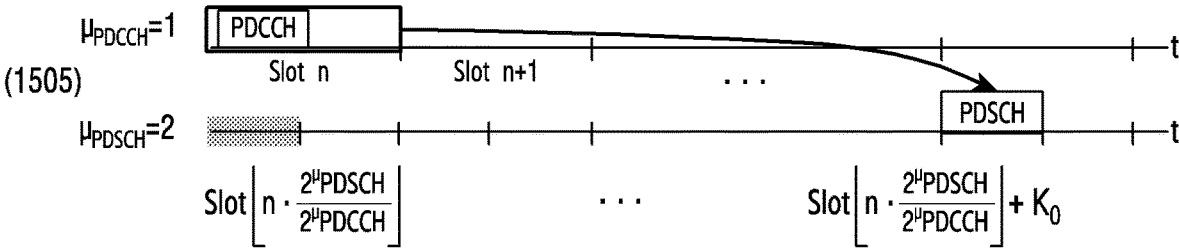
Figure 17:
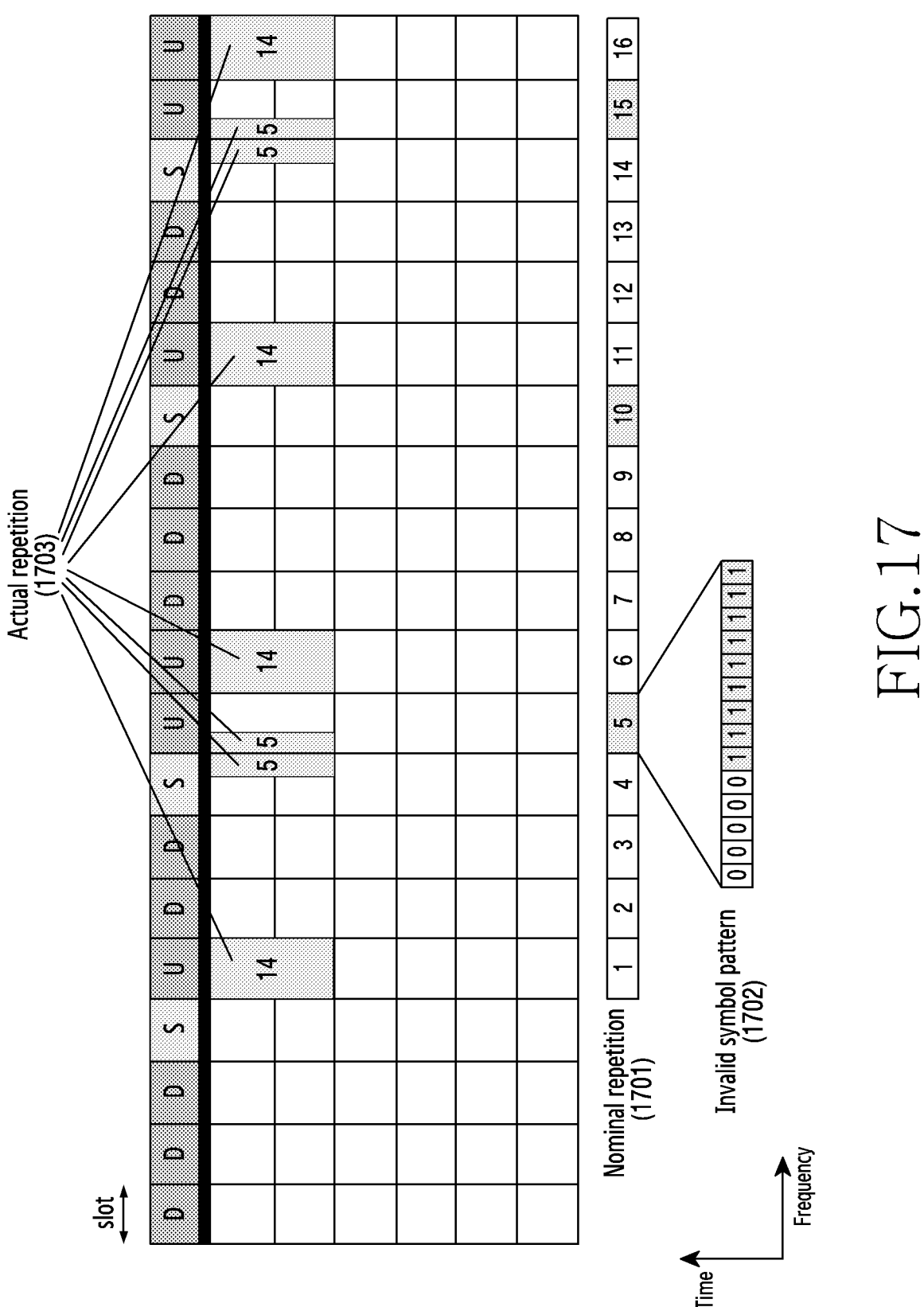
Figure 18:
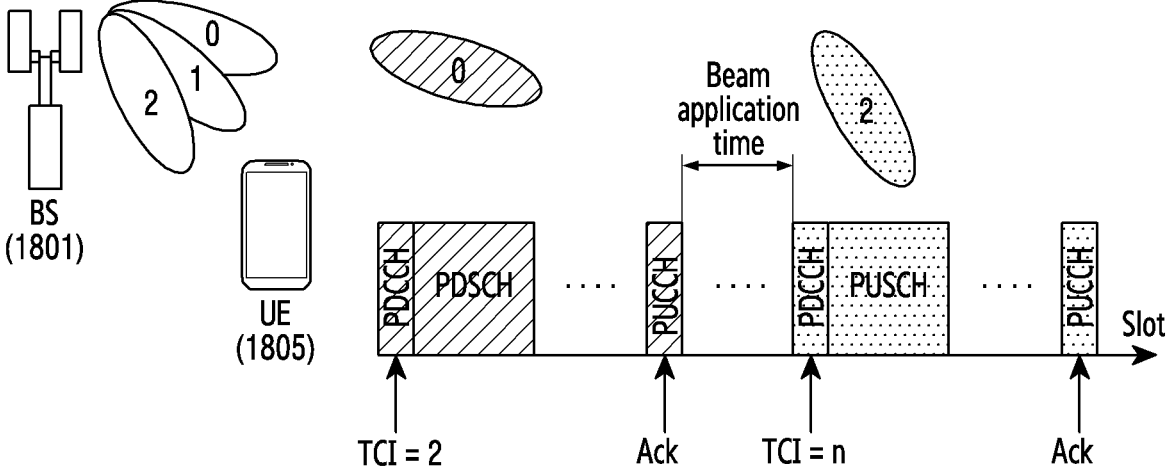
Figure 19:
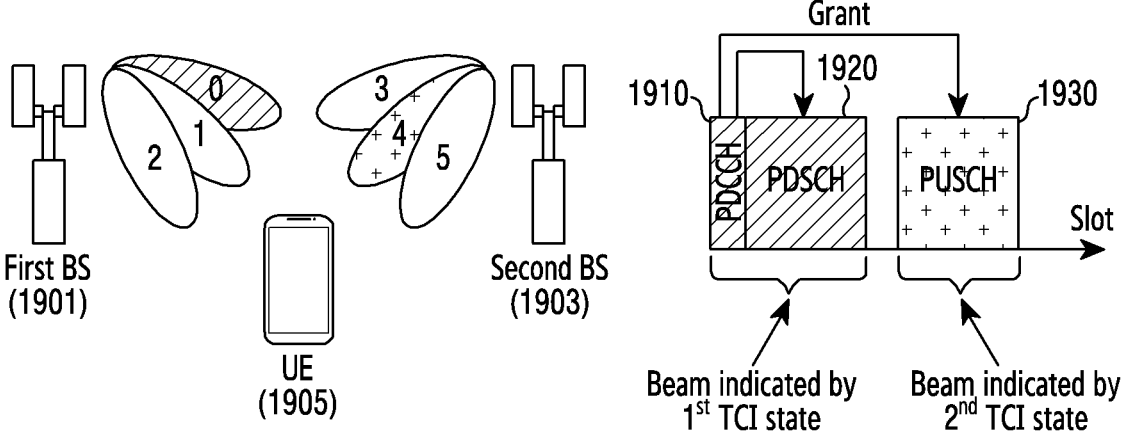
Figure 20:
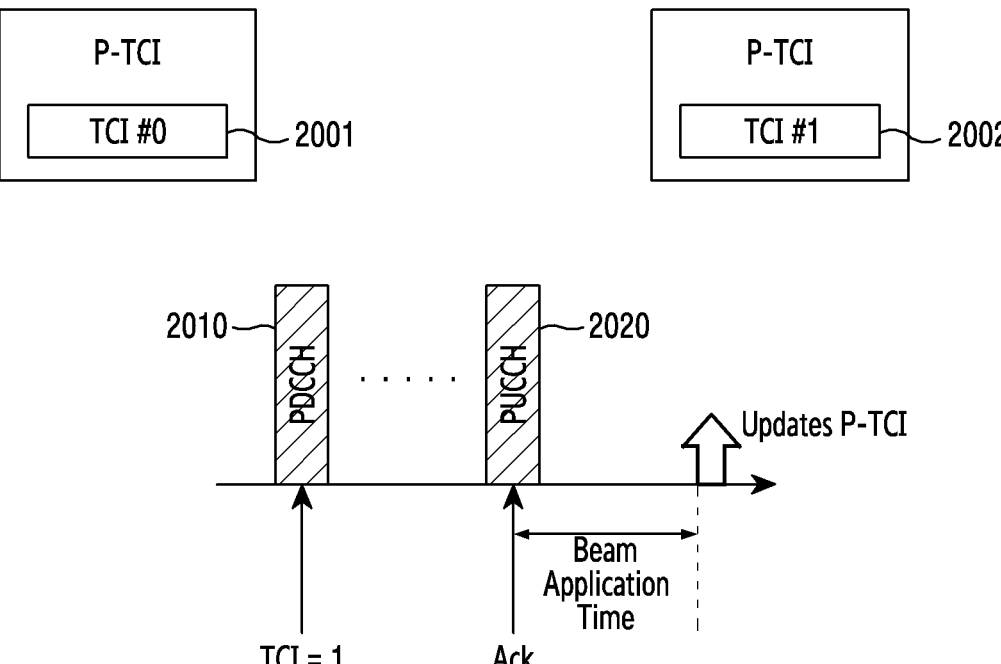
Figure 21:
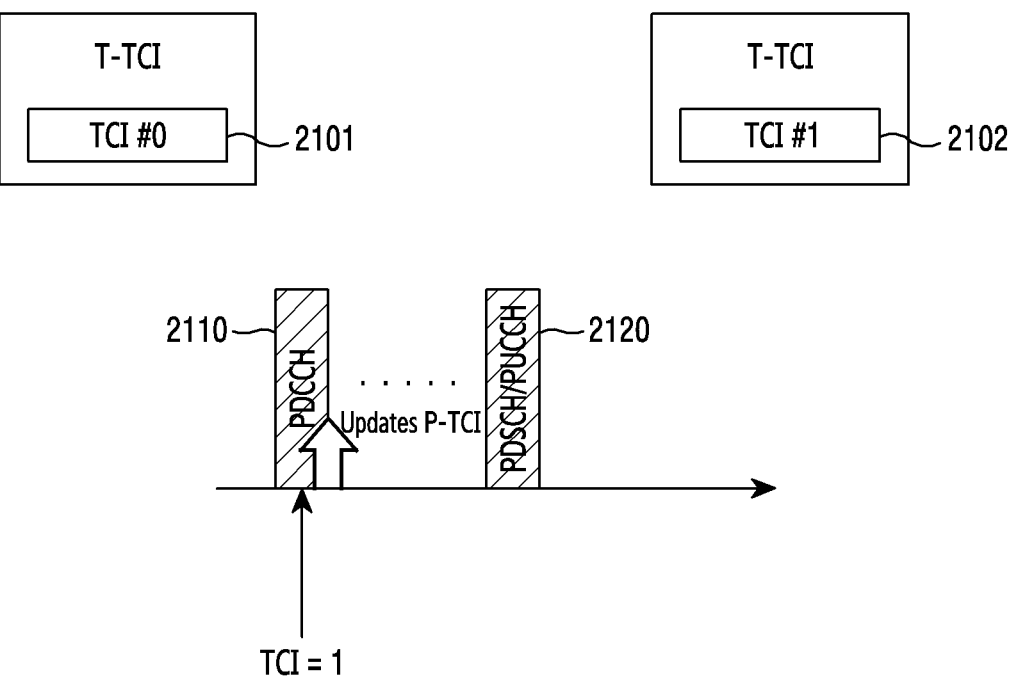
Figure 22:
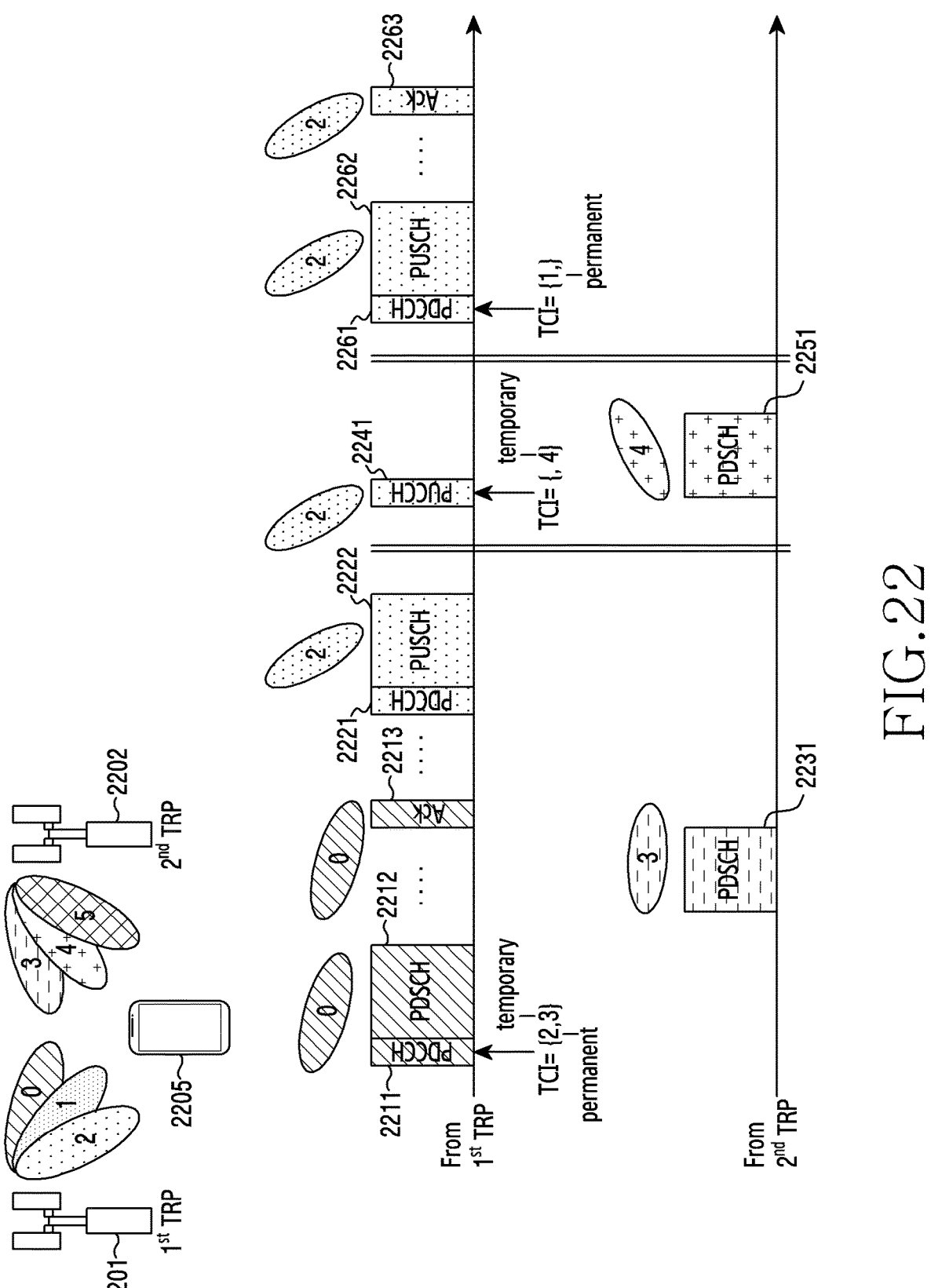
Figure 23:
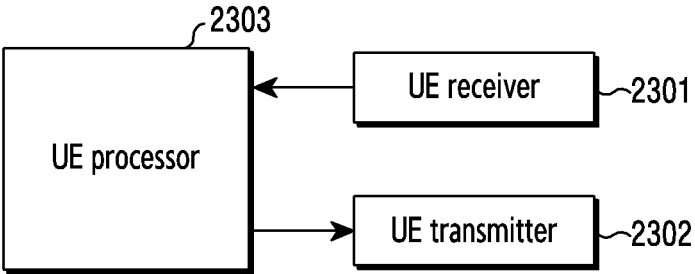
Figure 24:
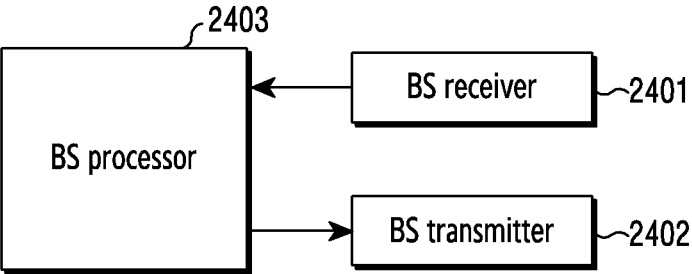

6 and rate matching resources in a wireless communication system according to an embodiment of the disclosure;

FIG. 12 illustrates a method of selecting a control resource set which can be received based on a priority when the UE receives a downlink control channel in a wireless communication system according to an embodiment of the disclosure;

FIG. 13 illustrates frequency axis resource allocation of a PDSCH in a wireless communication system according to an embodiment of the disclosure;

FIG. 14 illustrates time axis resource allocation of a PDSCH in a wireless communication system according to an embodiment of the disclosure;

FIG. 15 illustrates time axis resource allocation according to subcarrier spacing of a data channel and a control channel in a wireless communication system according to an embodiment of the disclosure;

FIG. 16 illustrates a process for beam configuration and activation of a PDSCH according to an embodiment of the disclosure;

FIG. 17 illustrates a physical uplink shared channel (PUSCH) repetitive transmission type B in a wireless communication system according to an embodiment of the disclosure;

FIG. 18 illustrates a scheme for controlling transmission/reception beams of channels or signals based on the common TCI state according to an embodiment of the disclosure;

FIG. 19 illustrates a method of providing information on a plurality of beams through a plurality of pieces of TCI information according to an embodiment of the disclosure;

FIG. 20 illustrates an operation of changing the P-TCI state according to an embodiment of the disclosure;

FIG. 21 illustrates an operation of changing a T-TCI state according to an embodiment of the disclosure;

FIG. 22 illustrates an operation of rapidly changing a communication mode and a communication beam by the mixed use of a P-TCI state and a T-TCI state according to an embodiment of the disclosure;

FIG. 23 illustrates a configuration of the UE according to an embodiment of the disclosure; and FIG. 24 illustrates a configuration of the BS according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Some components in the accompanying drawings are exaggerated, omitted, or schematically illustrated. In addition, a size of each component does not entirely reflect an actual size. The same reference number is given to the same or corresponding element in each drawing.

In addition, in describing the disclosure, a detailed description of a related known function or configuration will be omitted if it is deemed to make the gist of the disclosure unnecessarily vague. Terms to be described hereafter have been defined by taking into consideration functions in the disclosure, and may be different depending on a user or an operator's intention or practice. Accordingly, they should be defined based on contents over the entire specification.

Hereinafter, a base station is an entity which performs resource assignment of a terminal, and may be at least one of a next-generation node B (gNode B (gNB)), an evolved Node B (eNode B), a Node B, a base station (BS), a radio access unit, a BS controller and a node on a network. The terminal may include a user equipment (UE), a mobile station (MS), a cellular phone, a smartphone, a computer and a multimedia system for performing a communication function. In the disclosure, downlink (DL) indicates a radio transmission path of a signal transmitted from a base station to a terminal, and uplink (UL) indicates a radio transmission path of a signal transmitted from a terminal to a base station. In addition, a long term evolution (LTE) or LTE-advanced (LTE-A) system may be explained as an example, but the embodiments of the disclosure may be applied to other communication systems having a similar technical background or channel form. For example, a 5th generation (5G) mobile communication technology (new radio (NR)) developed after LTE-A may be included herein, and 5G may be a concept embracing the existing LTE and LTE-A and similar other services. Further, the disclosure may also be applied to other communication systems through some modifications without significantly departing from the range of the disclosure based on determination of those skilled in the technical knowledge.

At this time, it will be understood that each block of the process flowchart illustrations and combinations of the flowchart illustrations may be executed by computer program instructions. Since these computer program instructions may be mounted on a processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). In addition, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

At this time, the term '~unit' as used herein indicates software or a hardware component, such as a field programmable gate array (FPGA) or an application-specific integrated circuit (ASIC), and unit may perform specific roles. However, unit is not limited to software or hardware. A unit may be configured to reside on an addressable storage medium and configured to reproduce on one or more processors. Accordingly, unit may include, for example, components, such as software components, object-oriented software components, class components and task components, processes, functions, attributes, procedures, sub-routines, segments of program code, drivers, firmware, microcode, circuitry, data, databases, data structures, tables, arrays, and variables. The functionalities provided in the components and a unit may be combined to fewer components and units or may be further separated into additional components and units. Further, the components and units may be implemented to reproduce one or more central processing units (CPUs) within a device or a security multimedia card. In addition, a unit in one embodiment may include one or more processors.

A wireless communication system is evolving from its early voice-oriented service to, for example, a broadband wireless communication system which provides high-speed, high-quality packet data services according to communication standards, such as high-speed packet access (HSPA) of 3rd generation partnership project (3GPP), LTE or evolved universal terrestrial radio access (E-UTRA), LTE-A, LTE-Pro, high-rate packet data (HRPD) of 3GPP2, ultra-mobile broadband (UMB), and Institute of Electrical and Electronics Engineers (IEEE) 802.16e.

As a representative example of the broadband wireless communication system, the LTE system employs an orthogonal frequency division multiplexing (OFDM) scheme in the DL, and a single-carrier frequency-division multiple access (SC-FDMA) scheme in the UL. The UL indicates a radio link through which a UE or an MS transmits data or a control signal to an eNode B or a BS, and the DL indicates a radio link through which an eNode B or a BS transmits data or a control signal to a UE or an MS. Such a multi-access scheme generally distinguishes data or control information of each user by assigning and operating time-frequency resources for carrying data or control information of each user not to overlap, that is, to establish orthogonality.

A future communication system after LTE, that is, the 5G communication system, should be able to freely reflect various requirements of users and service providers, and accordingly should support a service for simultaneously satisfying various requirements. Services considered for the 5G communication systems includes enhanced mobile broadband (eMBB), massive machine type communication (mMTC), ultra reliability low latency communication (URLLC) and so on.

The eMBB aims to provide a faster data rate than a data rate supported by existing LTE, LTE-A or LTE-Pro. For example, the eMBB in the 5G communication system should be able to provide a peak data rate of 20 gigabits per second (Gbps) in the DL and 10 Gbps in the UL in terms of one base station. In addition, the 5G communication system should provide the peak data rate and concurrently provide an increased user perceived data rate of the terminal. To satisfy these requirements, improvements of various transmission and reception technologies are required, including a further advanced MIMO transmission technology. In addition, while signals are transmitted using a maximum 20 megahertz (MHz) transmission bandwidth in a 2 GHz band used by the LTE, the 5G communication system uses a frequency bandwidth wider than 20 MHz in the frequency band of 3~6 GHz or 6 GHz or higher, thus satisfying the required data rate in the 5G communication system.

At the same time, the 5G communication system is considering mMTC to support application services, such as the Internet of things (IoT). The mMTC requires large-scale terminal access support in a cell, terminal coverage enhancement, improved battery time, and terminal cost reduction to efficiently provide the IoT. The IoT is attached to various sensors and various devices to provide communication functions and accordingly should be able to support a great number of terminals (e.g., 1,000,000 terminals/km$^2$) in the cell. In addition, the terminal supporting the mMTC is highly likely to be located in a shaded area not covered by the cell, such as a basement of building due to its service characteristics, and thus may require wider coverage than other services provided by the 5G communication system. A terminal supporting mMTC should be configured with a low-priced terminal, and may require a quite long battery lifetime, such as 10~15 years because it is difficult to frequently replace the battery of the terminal.

Finally, URLLC is a cellular-based wireless communication service used for mission-critical purposes. For example, services used for robot or machinery remote control, industrial automation, unmanaged aerial vehicle, remote health care, emergency situations, or the like may be considered. Thus, the communication provided by URLLC should provide very low latency and very high reliability. For example, a service supporting URLLC should meet air interface latency smaller than 0.5 milliseconds and at the same time has requirements of a packet error rate below $10^{-5}$. Hence, for the service supporting URLLC, the 5G system should provide a transmit time interval (TTI) smaller than other services, and concurrently requires design issues for allocating a wide resource in the frequency band to obtain communication link reliability.

Three services of the 5G, that is, eMBB, URLLC, and mMTC may be multiplexed and transmitted in one system. At this time, to satisfy the different requirements of the respective services, different transmission and reception schemes and transmission and reception parameters may be used between the services. Notably, 5G is not limited to the aforementioned three services.

A multiple transmission and reception point (M-TRP) scheme in which a UE performs communication through multiple transmission and reception nodes has been standardized through 3GPP Rel-16 as a common scheme for satisfying opposite requirements between a URLLC service requiring high reliability and an eMBB service requiring a high transmission rate and, thereafter, a method of applying the technology to various channels, such as a PDCCH, a PDSCH, a PUSCH, and a physical uplink control channel (PUCCH) has presented through Rel-17. The M-TRP scheme is divided into two schemes, such as a single control information scheme (single downlink control information) (hereinafter, referred to S-DCI) for controlling transmission and reception through a plurality of nodes through one control information and a multiple control information scheme (hereinafter, referred to as M-DCI) for separately transmitting information on respective nodes. The S-DCI scheme is a scheme suitable for a network having a relatively simple structure in which only one of a plurality of nodes controls the UE and is suitable for being used by a cell and a BS serving to perform communication in a small area. On the other hand, the M-DCI scheme used in a situation in which a plurality of nodes controls the UE provides communication in a relatively wide area and is expected to be mainly used by a network in which the distance between respective nodes is long.

The disclosure describes a beam control scheme in the case in which the UE connected to the network operates based on a common beam performs communication through multiple transmission and reception nodes. Further, a method of rapidly changing an access mode through single/multiple nodes according to control information is described, and a method of simultaneously changing beam switching and the access mode is described.

According to an embodiment of the disclosure, in the beam control of communication between multiple transmission and reception nodes and the UE, an amount of control information used for controlling beams and the number of transmissions of the control information can be reduced through a configuration and an indication of a common beam. Further, rapid switching between single/multiple node communication or a rapid change in a communication node can be supported through additional transmission of temporarily used beam information, and a rapid beam change can be supported. In addition, it is possible to use beam control information application procedures in different types according to importance of each channel by introducing a control information processing procedure supporting high reliability for the application of common beam control information and introducing a control information processing procedure of rapid application to the application of temporary beam control information.

NR Time-Frequency Resources

Hereinafter, a frame structure of the 5G system is described below with reference to the drawings.

Figure 1:
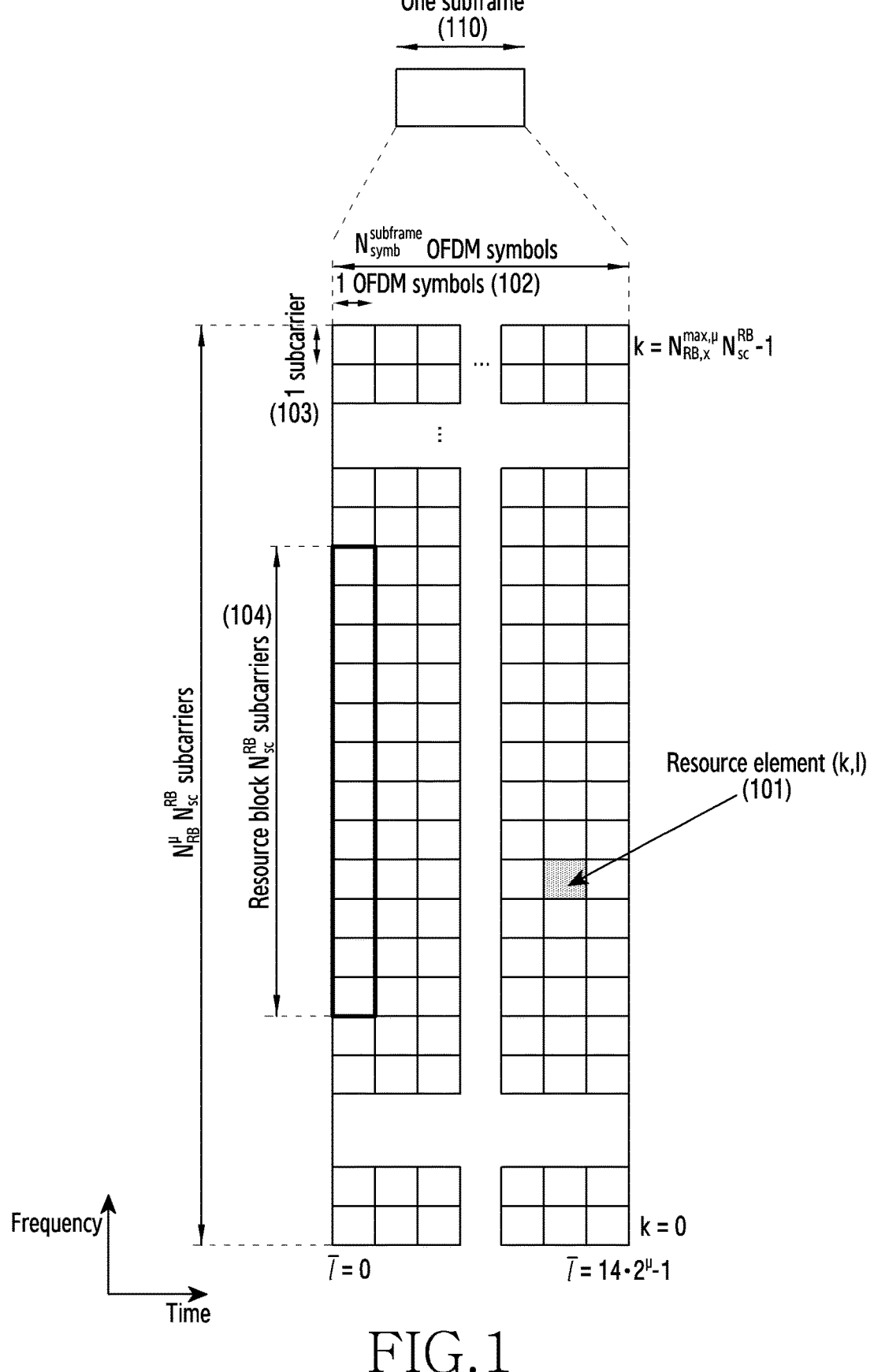
FIG. 1 illustrates a basic structure of time-frequency domains in a wireless communication system according to an embodiment of the disclosure.

FIG. 1 illustrates a basic structure of time-frequency domains that are radio resource areas in which data or control channels are transmitted in the 5G system according to an embodiment of the disclosure.

Referring to FIG. 1, it illustrates an example of a structure of a subframe 110 where a horizontal axis indicates a time domain and a vertical axis indicates a frequency domain. A basic unit of resources in the time and frequency domains is a resource element (RE) 101 and may be defined as 1 orthogonal frequency division multiplexing (OFDM) symbol 102 in the time axis and 1 subcarrier 103 in the frequency axis. In the frequency domain, $$N_{sc}^{RB}$$

(e.g., 12) consecutive REs may configure 1 resource block (RB) 104.

Figure 2:
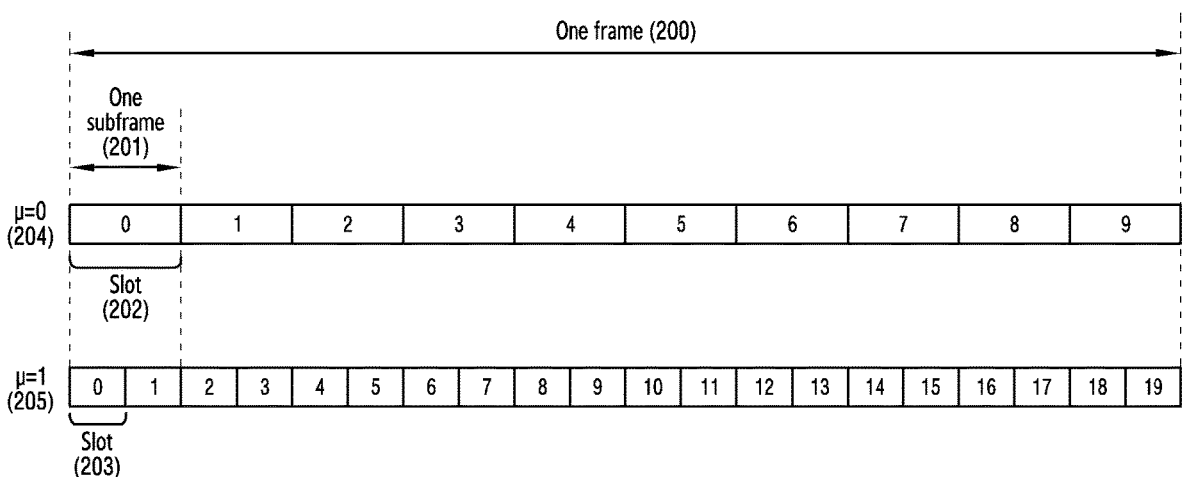
FIG. 2 illustrates frame, subframe, and slot structures in a wireless communication system according to an embodiment of the disclosure.

FIG. 2 illustrates frame, subframe, and slot structures in a wireless communication system according to an embodiment of the disclosure.

Referring to FIG. 2, it illustrates an example of the structure of a frame 200, a subframe 201, and a slot 202. One frame 200 may be defined as 10 ms. One subframe 201 may be defined as 1 ms and, accordingly, one frame 200 may include a total of 10 subframes 201. One slot 202 or 203 may be defined as 14 OFDM symbols (that is, the number of symbols $$N_{symb}^{slot}$$

for one slot=14). One subframe 201 may include one or a plurality of slots 202 or 203, and the number of slots 202 or 203 per subframe 201 may vary depending on a configuration value μ 204 or 205 for subcarrier spacing. In the example of FIG. 2, the case in which the subcarrier spacing configuration values μ=0 204 and μ=1 205 is illustrated. In the case of μ=0 204, one subframe 201 may include one slot 202. In the case of μ=1 205, one subframe 201 may include two slots 203. For example, the number of slots $$N_{slot}^{subframe,\mu}$$

per subframe may vary depending on the configuration value μ for subcarrier spacing, and accordingly, the number of slots $$N_{slot}^{frame,\mu}$$

per frame may be different.

$$N_{slot}^{subframe,\mu}$$

and $$N_{slot}^{frame,\mu}$$

according to each subcarrier spacing configuration μ may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Bandwidth Part (BWP)

Next, a configuration of a bandwidth part (BWP) in the 5G communication system will be described below with reference to the drawings.

Figure 3:
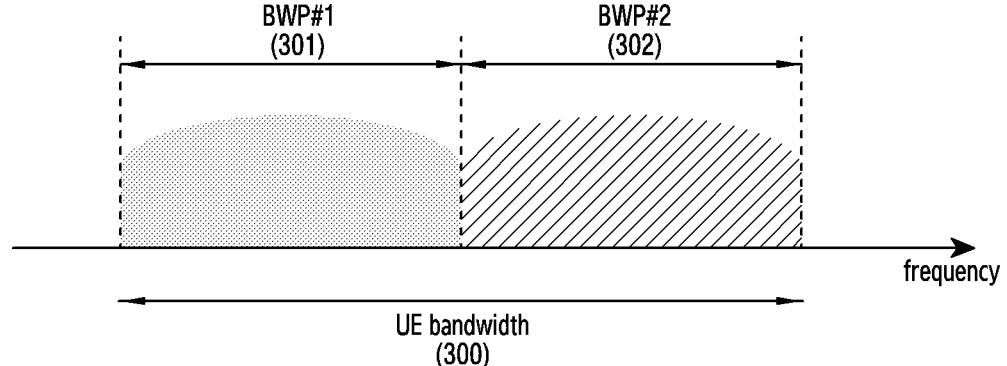
FIG. 3 illustrates a bandwidth part (BWP) configuration in a wireless communication system according to an embodiment of the disclosure.

FIG. 3 illustrates a configuration of a BWP in a wireless communication system according to an embodiment of the disclosure.

Referring to FIG. 3, it shows an example in which a UE bandwidth 300 is configured as two bandwidth parts, that is, BWP #1 301 and BWP #2 302. The BS may configure one or a plurality of BWPs in the UE, and may configure information shown in Table 2 for each BWP.

TABLE 2

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, |
| n2, n3, n4, n5}, | |
| cyclicPrefix | ENUMERATED |
| { extended } | |
| } | |

Of course, the configuration for the BWP is not limited to Table 2, and various parameters related to the BWP as well as the configuration information in Table 2 may be configured in the UE. The configuration information may be transmitted to the UE by the BS through higher-layer signaling, for example, radio resource control (RRC) signaling. Among one or a plurality of configured BWPs, at least one BWP may be activated. Information indicating whether to activate the configured BWPs may be semi-statically transferred from the BS to the UE through RRC signaling or may be dynamically transferred through downlink control information (DCI).

According to an embodiment, the UE before the radio resource control (RRC) connection may receive a configuration of an initial BWP for initial access from the BS through a master information block (MIB). More specifically, the UE may receive configuration information for a control resource set (CORESET) and a search space in which a PDCCH for receiving system information (remaining system information (RMSI) or system information block 1 (SIB1)) required for initial access through the MIB can be transmitted in an initial access step. Each of the CORESET and the search space configured through the MIB may be considered as an identity (ID) 0. The BS may inform the UE of configuration information, such as frequency allocation information for control resource set #0, time allocation information, and numerology through the MIB. Further, the BS may inform the UE of configuration information for a monitoring period and an occasion of control resource set #0, that is, configuration information for search space #0 through the MIB. The UE may consider a frequency region configured as control resource set #0 acquired from the MIB as an initial bandwidth part for initial access. At this time, the ID of the initial BWP may be considered as 0.

According to an embodiment of the disclosure, the configuration for the BWP supported in the 5G may be used for various purposes.

According to an embodiment, when a bandwidth supported by the UE is smaller than a system bandwidth, it may be supported through the BWP configuration. For example, the BS may configure a frequency location (configuration information 2) of the BWP in the UE, and thus the UE may transmit and receive data at a specific frequency location within the system bandwidth.

Further, according to an embodiment, the BS may configure a plurality of BWPs in the UE to support different numerologies. For example, in order to support the UE to perform data transmission and reception using both subcarrier spacing of 15 kilohertz (kHz) and subcarrier spacing of 30 kHz, two BWPs may be configured as subcarrier spacings of 15 kHz and 30 kHz, respectively. Different BWPs may be frequency-division-multiplexed, and when data is transmitted/received at particular subcarrier spacing, the BWP configured at the corresponding subcarrier spacing may be activated.

Further, according to an embodiment, the BS may configure BWPs having different sizes of bandwidths in the UE to reduce power consumption of the UE. For example, when the UE supports a very large bandwidth, for example, 100 MHz and always transmits and receives data through the corresponding bandwidth, very high power consumption may be generated. More particularly, monitoring an unnecessary downlink control channel through a large bandwidth of 100 MHz in the state in which there is no traffic is very inefficient from the aspect of power consumption. In order to reduce power consumption of the UE, the BS may configure a BWP having a relatively narrow bandwidth, for example, a bandwidth of 20 MHz. The UE may perform a monitoring operation in the bandwidth part of 20 MHz in the state in which there is no traffic, and if data is generated, may transmit and receive data through the bandwidth part of 100 MHz according to an instruction from the BS.

According to an embodiment of the disclosure, in a method of configuring the BWP, UEs before the RRC connection may receive configuration information for an initial BWP through a master information block (MIB) in an initial access step. More specifically, the UE may receive a configuration of a control resource set (CORESET) for a downlink control channel in which downlink control information (DCI) for scheduling a system information block (SIB) can be transmitted from an MIB of a physical broadcast channel (PBCH). A bandwidth of the control resource set configured as the MIB may be considered as an initial bandwidth part, and the UE may receive a physical downlink shared channel (PDSCH), in which the SIB is transmitted, through the configured initial bandwidth part. The initial bandwidth part may be used not only for receiving the SIB but also other system information (OSI), paging, or random access.

Bandwidth Part (BWP) Change

When one or more BWPs are configured in the UE, the BS may indicate a change (or switching or transition) in the BWPs to the UE through a BWP indicator field within the DCI. For example, in FIG. 3, when a currently activated BWP of the UE is BWP #1 301, the BS may indicate BWP #2 302 to the UE through a BWP indicator within DCI and the UE may make a BWP change to BWP #2 302 indicated by the received BWP indicator within DCI.

As described above, since the DCI-based BWP change may be indicated by the DCI for scheduling the PDSCH or the PUSCH, the UE should be able to receive or transmit the PDSCH or the PUSCH scheduled by the corresponding DCI in the changed BWP without any difficulty if the UE receives a BWP change request. To this end, requirements for a delay time (T_{BWP}) required for a BWP change is defined in the standard, and may be defined as shown in, for example, Table 3. Of course, the disclosure is not limited to the following examples.

TABLE 3

| | NR Slot | BWP switch delay T_{BWP} (slots) | |
| μ | length (ms) | Type 1^{Note 1} | Type 2^{Note 1} |
| 0 | 1 | 1 | 3 |
| 1 | 0.5 | 2 | 5 |

14

TABLE 3-continued

| | NR Slot | BWP switch delay T_{BWP} (slots) | |
| μ | length (ms) | Type 1^{Note 1} | Type 2^{Note 1} |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirements for the BWP change delay time support type 1 or type 2 according to a capability of the UE. The UE may report a supportable BWP delay time type to the BS.

When the UE receives DCI including a BWP change indicator in slot n according to the requirements for the BWP change delay time, the UE may complete a change to a new BWP indicated by the BWP change indicator at a time point that is not later than slot n+T_{BWP} and transmit and receive a data channel scheduled by the corresponding DCI in the changed new BWP. If scheduling the data channel with the new BWP, the base station may determine time domain resource assignment for the data channel, by considering the BWP change delay time T_{BWP} of the UE. For example, when scheduling the data channel in the new BWP, the BS may schedule the corresponding data channel after the BWP change delay time through a method of determining allocation of time domain resources for the data channel. Accordingly, the UE may not expect that the DCI indicating the BWP change indicates a slot offset (K0 or K2) value smaller than the BWP change delay time (T_{BWP}).

If the UE receives DCI (for example, DCI format 1_1 or 0_1) indicating the BWP change, the terminal may perform no transmission or reception during a time interval corresponding to symbols from a third symbol of a slot for receiving the PDCCH including the corresponding DCI to a start point of the slot indicated by the slot offset (K0 or K2) indicated by a time domain resource allocation field within the corresponding DCI. For example, when the UE receives DCI indicating the BWP change in slot n and a slot offset value indicated by the corresponding DCI is K, the UE may perform no transmission or reception from the third symbol of slot n to a symbol before slot n+K (that is, the last symbol of slot n+K−1).

SS/PBCH Block

Subsequently, a synchronization signal (SS)/PBCH block in 5G is described.

The SS/PBCH block may be a physical layer channel block including a primary SS (PSS), a secondary SS (SSS), and a PBCH. A detailed description thereof is made below.

PSS: is a signal which is a reference of downlink time/frequency synchronization and provides some pieces of information of a cell ID.

SSS: is a reference of downlink time/frequency synchronization and provides the remaining cell ID information which the PSS does not provides. In addition, the SSS serves as a reference signal for demodulation of a PBCH.

PBCH: provides necessary system information required for transmitting and receiving a data channel and a control channel by the UE. The necessary system information may include control information related to a search space indicating radio resource mapping information of a control channel, scheduling control information for a separate data channel for transmitting system information, and the like.

SS/PBCH block: includes a combination of PSS, SSS, and PBCH. One or a plurality of SS/PBCH blocks may be transmitted within a time of 5 ms, and each of the transmitted SS/PBCH blocks may be separated by an index.

The UE may detect the PSS and the SSS in an initial access operation and decode the PBCH. The UE may acquire an MIB from the PBCH and receive a configuration of control resource set (CORESET) #0 (corresponding to a control resource set having control resource set index 0) therefrom. The UE may monitor control resource set #0 based on the assumption that the selected SS/PBCH block and a demodulation reference signal (DMRS) transmitted in control resource set #0 are quasi co-located (QCLed). The UE may receive system information through downlink control information transmitted in control resource set #0. The UE may acquire configuration information related to a random access channel (RACH) required for initial access from the received system information. The UE may transmit a physical RACH (PRACH) to the BS based on the selected SS/PBCH index, and the BS receiving the PRACH may acquire information on the SS/PBCH block index selected by the UE. The BS may know which block is selected by the UE from among the SS/PBCH blocks and that CORESET #0 related thereto is monitored.

DRX

Figure 6:
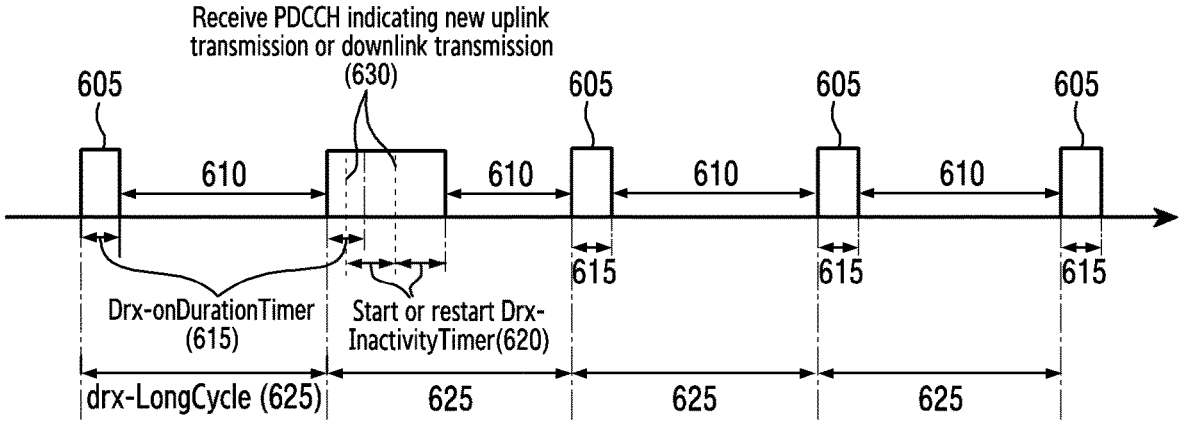
FIG. 6 illustrates a discontinuous reception (DRX) operation in a wireless communication system according to an embodiment of the disclosure.

FIG. 6 describes discontinuous reception (DRX) according to an embodiment of the disclosure.

Discontinuous reception (DRX) is an operation in which the terminal using a service discontinuously receives data in an RRC-connected state in which a radio link is established between the BS and the UE. When DRX is applied, the UE may turn on a receiver at a specific time point and monitor a control channel, and when there is no data received for a predetermined period, turn off the receiver to reduce power consumption of the UE. The DRX operation may be controlled by a MAC layer device based on various parameters and a timer.

Referring to FIG. 6, an active time 605 is a time during which the UE wakes up every DRX cycle and monitors a PDCCH. The active time 605 may be defined as follows.

drx-onDurationTimer or drx-InactivityTimer or drx-RetransmissionTimerDL or drx-RetransmissionTimerUL or ra-ContentionResolutionTimer is running; or a Scheduling Request is sent on PUCCH and is pending; or a PDCCH indicating a new transmission addressed to the cell radio network temporary identifier (C-RNTI) of the MAC entity has not been received after successful reception of a Random Access Response for the Random Access Preamble not selected by the MAC entity among the contention-based Random Access Preamble drx-onDurationTimer, drx-InactivityTimer, drx-RetransmissionTimerDL, drx-RetransmissionTimerUL, ra-ContentionResolutionTimer, and the like are timers of which values are configured by the BS, and have functions configured to monitor a PDCCH by the UE in the state in which a predetermined condition is satisfied.

The drx-onDurationTimer 615 is a parameter for configuring a minimum time during which the UE is awake in a DRX cycle. The drx-InactivityTimer 620 may be a parameter for configuring a time during which the UE is additionally awake when a PDCCH indicating new uplink transmission or downlink transmission is received as indicated by reference numeral 630. The drx-RetransmissionTimerDL may be a parameter for configuring a maximum time during which the UE is awake in order to receive downlink retransmission in a downlink hybrid automatic repeat request (HARQ) procedure. The drx-RetransmissionTimerUL may be a parameter for configuring a maximum time during which the UE is awake in order to receive a grant of uplink retransmission in an uplink HARQ procedure. The drx-onDurationTimer, drx-InactivityTimer, drx-RetransmissionTimerDL, and drx-RetransmissionTimerUL may be configured as, for example, a time, the number of subframes, the number of slots, and the like. The ra-ContentionResolutionTimer may be a parameter for monitoring a PDCCH in a random access procedure.

An inactive time 610 is a time in which no PDCCH monitoring is performed or a time in which no PDCCH reception is performed during the DRX operation, and the remaining time except for the active time 605 in the entire time in which the DRX operation is performed. When the PDCCH is not monitored during the active time 605, the UE may enter a sleep or inactive state and reduce power consumption.

The DRX cycle refers to a cycle on which the UE wakes up and monitors a PDCCH. For example, the DRX cycle is a time interval or a cycle of on duration from monitoring of the PDCCH to monitoring of the next PDCCH by the UE. The DRX cycle has two types, such as a short DRX cycle and a long DRX cycle. The short DRX cycle may be optionally applied.

The long DRX cycle 625 may be a longer cycle among the two DRX cycles configured in the UE. The UE starts the drx-onDurationTimer 615 again at a time point at which the long DRX cycle 625 passes after a start point (for example, a start symbol) of the drx-onDurationTimer 615 while the long DRX cycle operates. In the operation of the long DRX cycle 625, the UE may start the drx-onDurationTimer 615 in a slot after drx-SlotOffset in a subframe that satisfies Equation 1 below. Here, the drx-SlotOffset may be a delay before the drx-onDurationTimer 615 starts. The drx-SlotOffset may be configured as, for example, a time, the number of slots, or the like.

$$[(SFN \times 10) + subframe\ number] modulo\ (drx\text{-}LongCycle) = \\ drx\text{-}StartOffset$$

Equation 1

The drx-LongCycleStartOffset and drx-StartOffset may be used to define a subframe for starting the Long DRX cycle 625. The drx-LongCycleStartOffset may be configured as, for example, a time, the number of subframes, the number of slots, or the like.

PDCCH: Related to DCI

Subsequently, downlink control information (DCI) in the 5G system will be described below.

In the 5G system, scheduling information for uplink data (or a physical uplink data channel (physical uplink shared channel (PUSCH)) or downlink data (or physical downlink data channel (physical downlink shared channel (PDSCH)) may be transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a physical downlink control channel (PDCCH) after passing through a channel coding and modulation process. A cyclic redundancy check (CRC) is added to a DCI message payload and is scrambled by a radio network temporary identifier (RNTI) corresponding to the identity of the UE. Depending on the purpose of the DCI message, for example, UE-specific data transmission, a power control command, a random access response, or the like, different RNTIs may be used. For example, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct based on the CRC identification result.

For example, DCI for scheduling a PDSCH for system information (SI) may be scrambled by an SI-RNTI. DCI for scheduling a PDSCH for a random access response (RAR) message may be scrambled by a random access (RA)-RNTI. DCI for scheduling a PDSCH for a paging message may be scrambled by a paging (P)-RNTI. DCI for notifying of a slot format indicator (SFI) may be scrambled with an SFI-RNTI. DCI for notifying of transmit power control (TPC) may be scrambled with a TPC-RNTI. DCI for scheduling a UE-specific PDSCH or PUSCH may be scrambled by a cell RNTI (C-RNTI).

DCI format 0_0 may be used for fallback DCI for scheduling a PUSCH in which case the CRC may be scrambled by a C-RNTI. DCI format 0_0 in which the CRC is scrambled by the C-RNTI may include, for example, information in Table 4 below. Of course, the disclosure is not limited to the following examples.

TABLE 4

| Identifier for DCI formats - [1] bit |
| --- |
| Frequency domain resource ssignment<br>$-\left[\left\lceil \log_2\left(N_{RB}^{UL,BWP}\left(N_{RB}^{UL,BWP}+1\right)/2\right)\right\rceil\right]$ bits |
| Time domain resource assignment - X bits<br>Frequency hopping flag - 1 bit.<br>Modulation and coding scheme - 5 bits<br>New data indicator - 1 bit<br>Redundancy version - 2 bits<br>HARQ process number - 4 bits<br>TPC command for scheduled PUSCH - [2] bits<br>UL/SUL indicator - 0 or 1 bit |

DCI format 0_1 may be used for non-fallback DCI for scheduling a PUSCH in which case the CRC may be scrambled with a C-RNTI. DCI format 0_1 in which the CRC is scrambled by the C-RNTI may include, for example, information in Table 5 below. Of course, the disclosure is not limited to the following examples.

TABLE 5

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP}+1)/2 \rceil$ bits
    Time domain resource assignment - 1, 2, 3, or 4 bits
    VRB(virtual resource block)--to-PRB(physical resource block) mapping - 0
or 1 bit, only for resource allocation type 1.
0 bit if only resource allocation type 0 is configured;
1 bit otherwise.
    Frequency hopping flag - 0 or 1 bit, only for resource allocation type 1.
0 bit if only resource allocation type 0 is configured;
1 bit otherwise.
    Modulation and coding scheme - 5 bits
    New data indicator - 1 bit
    Redundancy version - 2 bits
    HARQ process number - 4 bits
    1st downlink assignment index - 1 or 2 bits
1 bit for semi-static HARQ-acknowledgment (ACK) codebook;
2 bits for dynamic HARQ-ACK codebook with single HARQ-ACK codebook.
    2nd downlink assignment index - 0 or 2 bits
2 bits for dynamic HARQ-ACK codebook with two HARQ-ACK sub-codebooks;
0 bit otherwise.
    TPC command for scheduled PUSCH - 2 bits Sounding reference signal (SRS) resource indicator $-\left\lceil \log_2\left(\sum_{k=1}^{L_{max}\Sigma}\binom{N_{SRS}}{k}\right)\right\rceil$ or $\lceil \log_2 (N_{SRS})\rceil$ bits $\left\lceil \log_2\left(\sum_{k=1}^{L_{max}\Sigma}\binom{N_{SRS}}{k}\right)\right\rceil$ bits for non − codebook based PUSCH transmission;

$\lceil \log_2(N_{SRS})\rceil$ bits for codebook based PUSCH transmission;
    Precoding information and number of layers -up to 6 bits
    Antenna ports - up to 5 bits
    SRS request - 2 bits
    CSI request - 0, 1, 2, 3, 4, 5, or 6 bits
    CBG(code block group) transmission information - 0, 2, 4, 6, or 8 bits
    PTRS-DMRS association - 0 or 2 bits.
    beta offset indicator - 0 or 2 bits
    DMRS sequence initialization - 0 or 1 bit DCI format 1_0 may be used for fallback DCI for scheduling a PDSCH in which case the CRC may be scrambled with a C-RNTI. DCI format 1_0 in which the CRC is scrambled by the C-RNTI may include, for example, information in Table 6 below. Of course, the disclosure is not limited to the following examples.

TABLE 6

Identifier for DCI formats - [1] bit
Frequency domain resource assignment $$-\left[\left[\log_2\left(N_{RB}^{DL,BWP}\left(N_{RB}^{DL,BWP}+1\right)/2\right)\right]\right] \text{ bits}$$

Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits DCI format 1_1 may be used for non-fallback DCI for scheduling a PDSCH in which case the CRC may be scrambled by a C-RNTI. DCI format 1_1 in which the CRC is scrambled by the C-RNTI may include, for example, information in Table 7 below. Of course, the disclosure is not limited to the following examples.

TABLE 7

Carrier indicator - 0 or 3 bits
Identifier for DCI formats - [1] bits
Bandwidth part indicator - 0, 1 or 2 bits
Frequency domain resource assignment For resource allocation type 0, $\left[N_{RB}^{DL,BWP}/P\right]$ bits For resource allocation type 1, $\left[\log_2\left(N_{RB}^{DL,BWP}\left(N_{RB}^{DL,BWP}+1\right)/2\right)\right]$ bits Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit

PDCCH: CORESET, REG, CCE, Search Space

Hereinafter, the downlink control channel in the 5G communication system will be described below with reference to the drawings.

Figure 4:
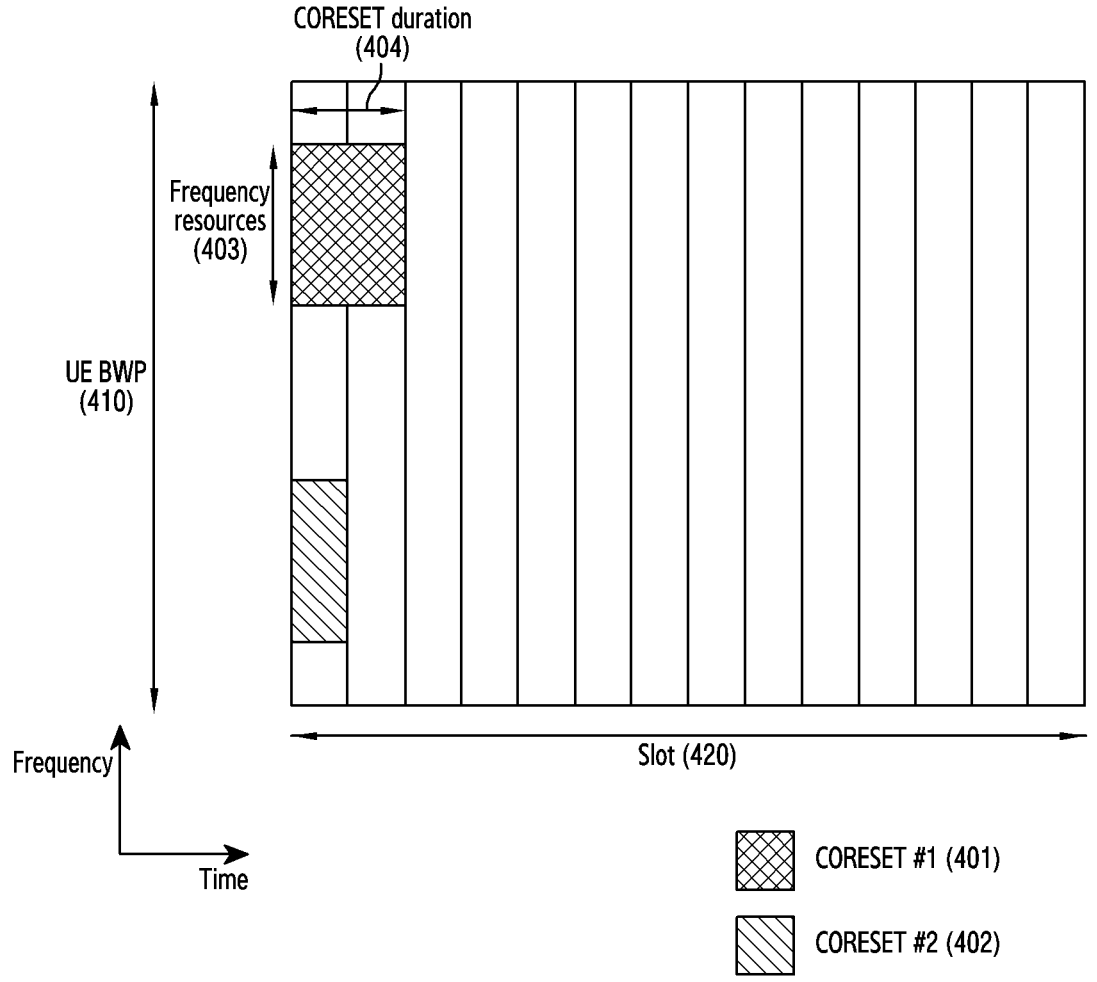
FIG. 4 illustrates a configuration of a control resource set of a downlink control channel in a wireless communication system according to an embodiment of the disclosure.

FIG. 4 illustrates a control region (control resource set (CORESET) in which a downlink control channel is transmitted in a 5G wireless communication system according to an embodiment of the disclosure.

Referring to FIG. 4, it illustrates an example in which a UE bandwidth part 410 is configured in the frequency axis and two control resource sets (control resource set #1 401 and control resource set #2 402) are configured within one slot 420 in the time axis. The control resource sets 401 and 402 may be configured in specific frequency resources 403 within a total UE BWP 410 in the frequency axis. The control resource set may be configured as one or a plurality of OFDM symbols in the time axis, which may be defined as a control resource set duration 404.

Referring to FIG. 4, control resource set #1 401 may be configured as a control resource set duration of 2 symbols, and control resource set #2 402 may be configured as a control resource set duration of 1 symbol.

The resource control set in 5G may be configured in the UE by the BS through higher-layer signaling (for example, system information, a master information block (MIB), or radio resource control (RRC) signaling). Configuring the control resource set in the UE may mean providing information, such as a control resource set identity, a frequency location of the control resource set, and a symbol length of the control resource set. For example, the following information may be included.

TABLE 8

| ControlResourceSet ::= | | SEQUENCE { |
|---|---|---|
| -- Corresponds to L1 parameter 'CORESET-ID' | | |
| controlResourceSetId | , | |
| frequencyDomainResources | | BIT STRING (SIZE (45)), |
| duration | | INTEGER |
| (1..maxCoReSetDuration), | | |
| cce-REG-MappingType | | CHOICE { |
| interleaved | | |
| SEQUENCE { | | |
| reg-BundleSize | | |
| ENUMERATED {n2, n3, n6}, | | |
| precoderGranularity | | |
| ENUMERATED {sameAsREG-bundle, allContiguousRBs}, | | |
| interleaverSize | | |
| ENUMERATED {n2, n3, n6} | | |
| shiftIndex | | |
| INTEGER(0..maxNrofPhysicalResourceBlocks-1) | | |
| OPTIONAL | | |
| }, | | |
| nonInterleaved | | NULL |
| }, | | |
| tci-StatesPDCCH | | |
| SEQUENCE(SIZE (1..maxNrofTCI-StatesPDCCH)) OF TCI-StateId | | |
| OPTIONAL, | | |
| tci-PresentInDCI | | ENUMERATED |
| {enabled} | | |
| OPTIONAL, -- Need S | | |
| } | | |

In Table 8, tci-StatesPDCCH (simply, referred to as a transmission configuration indication (TCI) state) configuration information may include information on one or a plurality of synchronization signal (SS)/physical broadcast channel (PBCH) block indexes or channel state information reference signal (CSI-RS) indexes having the quasi co-located (QCL) relationship with a demodulation reference signal (DMRS) transmitted in the corresponding CORESET. Of course, the disclosure is not limited to the example.

Figure 5A:
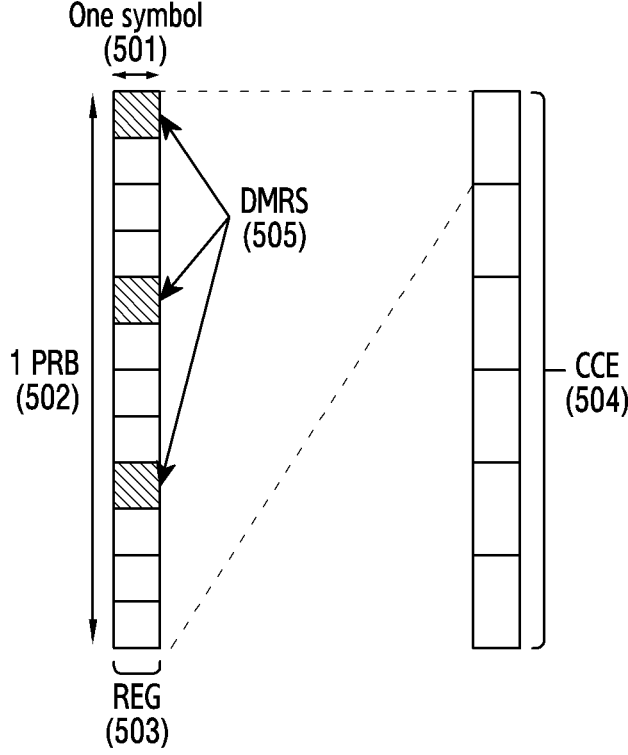
FIG. 5A illustrates a structure of a downlink control channel in a wireless communication system according to an embodiment of the disclosure.

FIG. 5A illustrates a basic unit of time and frequency resources included in a downlink control channel which can be used in 5G according to an embodiment of the disclosure.

Referring to FIG. 5A, the basic unit of time and frequency resources included in the control channel may be a resource element group (REG) 503, and the REG 503 may be defined as one OFDM symbol 501 in the time axis and one physical resource block (PRB) 502 in the frequency axis, that is, as 12 subcarriers. The BS may configure a downlink control channel allocation unit by concatenating the REGs 503.

As illustrated in FIG. 5A, if the basic unit in which the downlink control channel is allocated in 5G is a control channel element (CCE) 504, one CCE 504 may consist of a plurality of REGs 503. In a description of the REG 503 illustrated in FIG. 5A by way of example, the REG 503 may include 12 REs and, when 1 CCE 504 includes 6 REGs 503, 1 CCE 504 may include 72 REs. When a downlink control resource set is configured, the corresponding resource set may include a plurality of CCEs 504, and a specific downlink control channel may be mapped to 1 or a plurality of CCEs 504 according to an aggregation level (AL) within the control resource set and then transmitted. CCEs 504 within the CORESET may be distinguished by numbers and the numbers of the CCEs 504 may be assigned according to a logical mapping scheme.

The basic unit of the downlink control channel illustrated in FIG. 5A, that is, the REG 503, may include all of REs to which the DCI is mapped and the region to which a DMRS 505, which is a reference signal for decoding the REs, is mapped. As illustrated in FIG. 5A, three DMRSs 505 may be transmitted in one REG 503. The number of CCEs required to transmit the PDCCH may be 1, 2, 4, 8, or 16 according to the aggregation level (AL), and the different number of CCEs may be used to implement link adaptation of the downlink control channel. For example, if AL=L, one downlink control channel may be transmitted through L CCEs. The UE is required to detect a signal in the state in which the UE is not aware of information on the downlink control channel, and a search space indicating a set of CCEs is defined for blind decoding. The search space is a set of downlink control channel candidates including CCEs for which the UE should attempt decoding at the given aggregation level, and there are several aggregation levels at which one set of CCEs is configured by 1, 2, 4, 8, and 16 CCEs, so that the UE may have a plurality of search spaces. The search space set may be defined as a set of search spaces at all configured aggregation levels.

The search spaces may be classified into a common search space and a UE-specific search space. UEs in a predetermined group or all UEs may search for a common search space of the PDCCH in order to receive cell-common control information, such as dynamic scheduling for system information or paging messages. For example, PDSCH scheduling allocation information for transmission of an SIB including information on a service provider of a cell may be received by searching for a common-search space of the PDCCH. In the case of the common search space, UEs in a predetermined group or all UEs should receive the PDCCH, so that the common-search space may be defined as a set of pre-arranged CCEs. Scheduling allocation information for the UE-specific PDSCH or PUSCH may be received by searching for a UE-specific search space of the PDCCH. The U-specific search space may be U-specifically defined as a UE identity and a function of various system parameters.

In 5G, parameters for the search space of the PDCCH may be configured in the UE by the BS through higher-layer signaling (for example, SIB, MIB, or RRC signaling). For example, the BS may configure, in the UE, the number of PDCCH candidates at each aggregation level L, a monitoring period of the search space, a monitoring occasion in units of symbols within the slot for the search space, a search space type, that is, a common search space or a UE-specific search space, a combination of a DCI format and an RNTI to be monitored in the corresponding search space, and a CORESET index for monitoring the search space. For example, information in Table 9 may be included. Of course, the disclosure is not limited to the following examples.

TABLE 9

| | |
|---|---|
| SearchSpace ::= | SEQUENCE { |
| -- Identity of the search space. SearchSpaceId = 0 identifies the SearchSpace configured via PBCH (MIB) or ServingCellConfigCommon. | |
| searchSpaceId | SearchSpaceId, |
| controlResourceSetId | ControlResourceSetId, |
| monitoringSlotPeriodicityAndOffset | CHOICE { |
| sl1 | |
| NULL, | |
| sl2 | |
| INTEGER (0..1), | |
| sl4 | |
| INTEGER (0..3), | |
| sl5 | |
| INTEGER (0..4), | |
| sl8 | |
| INTEGER (0..7), | |
| sl10 | |
| INTEGER (0..9), | |
| sl16 | |
| INTEGER (0..15), | |
| sl20 | |
| INTEGER (0..19) | |
| } | |
| | OPTIONAL, |
| duration INTEGER (2..2559) | |
| monitoringSymbolsWithinSlot | BIT STRING (SIZE (14)) |
| OPTIONAL, | |
| nrofCandidates | SEQUENCE { |
| aggregationLevel1 | ENUMERATED |
| {n0, n1, n2, n3, n4, n5, n6, n8}, | |
| aggregationLevel2 | ENUMERATED |
| {n0, n1, n2, n3, n4, n5, n6, n8}, | |

TABLE 9-continued

```
        aggregationLevel4              ENUMERATED
{n0, n1, n2, n3, n4, n5, n6, n8},
        aggregationLevel8              ENUMERATED
{n0, n1, n2, n3, n4, n5, n6, n8},
        aggregationLevel16             ENUMERATED
{n0, n1, n2, n3, n4, n5, n6, n8}
    },
    searchSpaceType                    CHOICE {
        -- Configures this search space as common search space (CSS) and DCI formats to
monitor.
        common
    SEQUENCE {
  }
    ue-Specific
    SEQUENCE {
        -- Indicates whether the UE monitors in this USS for DCI formats 0-0 and
1-0 or for formats 0-1 and 1-1.
        formats
    ENUMERATED {formats0-0-And-1-0, formats0-1-And-1-1},
        ...
    }
```

The BS may configure one or a plurality of search space sets in the UE according to configuration information. According to some embodiments, the BS may configure search space set 1 and search space 2 in the UE, and the configuration may be performed such that DCI format A scrambled by an X-RNTI in search space set 1 is monitored in the common search space and DCI format B scrambled by a Y-RNTI in search space set 2 is monitored in the UE-specific search space.

According to configuration information, one or a plurality of search space sets may exist in the common search space or the UE-specific search space. For example, search space set #1 and search space set #2 may be configured as common search spaces, and search space set #3 and search space set #4 may be configured as UE-specific search spaces.

In the common search space, the following combinations of DCI formats and RNTIs may be monitored. Of course, the disclosure is not limited to the following examples.

DCI format 0_0/1_0 with CRC scrambled by C-RNTI, configured scheduling (CS)-RNTI, semi-persistent (SP)-CSI-RNTI, RA-RNTI, temporary cell (TC)-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The described RNTIs may follow the following definition and use.

C-RNTI (cell RNTI): used for UE-specific PDSCH scheduling

TC-RNTI (temporary cell RNTI): used for UE-specific PDSCH scheduling

Configured scheduling (CS)-RNTI: used for semi-statically configured UE-specific PDSCH scheduling Random access (RA)-RNTI: used for scheduling PDSCH at random access stage Paging (P)-RNTI: used for scheduling PDSCH through which paging is transmitted System information (SI)-RNTI: used for scheduling PDSCH through which system information is transmitted Interruption (INT)-RNTI: used for indicating whether puncturing is performed for PDSCH Transmit power control for (TPC)-PUSCH-RNTI: used for indicating PUSCH power control command Transmit power control for (TPC)-PUCCH RNTI: used for indicating PUCCH power control command Transmit power control for (TPC)-SRS RNTI: used for indicating SRS power control command The DCI formats may follow definitions below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

A search space at an aggregation level L in a search space set s in a control resource set p of 5G may be expressed as shown in the Equation 2 below.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i \qquad \text{Equation 2}$$

L: AL $n_{CI}$: carrier index $N_{CCE,p}$: the total number of CCEs in the CORESET p $n_{sf}^{\mu}$ slot index $$M^{(L)}_{s,max}$$

the number of PDCCH candidates of the AL L $m_{s,n_{CI}}=0, \ldots ,$ $$M^{(L)}_{s,max}$$

−1: PDCCH candidate index of the AL L i=0, . . . , L−1

$$Y_{p,n_{s,f}^{\mu}}=\left(A_p \cdot Y_{p,n_{s,f}^{\mu}-1}\right) \bmod D,$$

$Y_{p,-1}=n_{RNTI}\neq0$, $A_p$=39827 for p mod 3=0, $A_p$=39829 for p mod 3=1, $A_p$=39839 for p mod 3=2, D=65537

$n_{RNTI}$: UE ID

The value $$Y_{p,n_{s,f}^{\mu}}$$

may correspond to 0 in the common search space.

The value $$Y_{p,n_{s,f}^{\mu}}$$

may correspond to a value which varies depending on the UE identity (C-RNTI or an ID set to the UE by the base station) and a time index, in the UE-specific search space.

Since a plurality of search space sets may be configured as different parameters (for example, the parameters in Table 9) in 5G, a search space set which the UE monitors may be different each time. For example, when search space set #1 is configured on an X-slot period, search space set #2 is configured on a Y-slot period, and X and Y are different from each other, the UE may monitor all of search space set #1 and search space set #2 in a specific slot and monitor one of search space set #1 and search space set #2 in another specific slot.

PDCCH: Span

The UE may report a UE capability in the case in which a plurality of PDCCH monitoring occasions exist within the slot and, at this time, the concept "span" may be used. The span is consecutive symbols in which the UE can monitor a PDCCH within the slot, and each PDCCH monitoring occasion may be within 1 span. The span may be expressed by (X,Y), in which X refers to the minimum number of symbols which should be spaced apart between first symbols of two consecutive spans and Y refers to the number of consecutive symbols for monitoring a PDCCH within one span. At this time, the UE may monitor the PDCCH in a section within Y symbols from the first symbol of the span within the span.

Figure 5B:
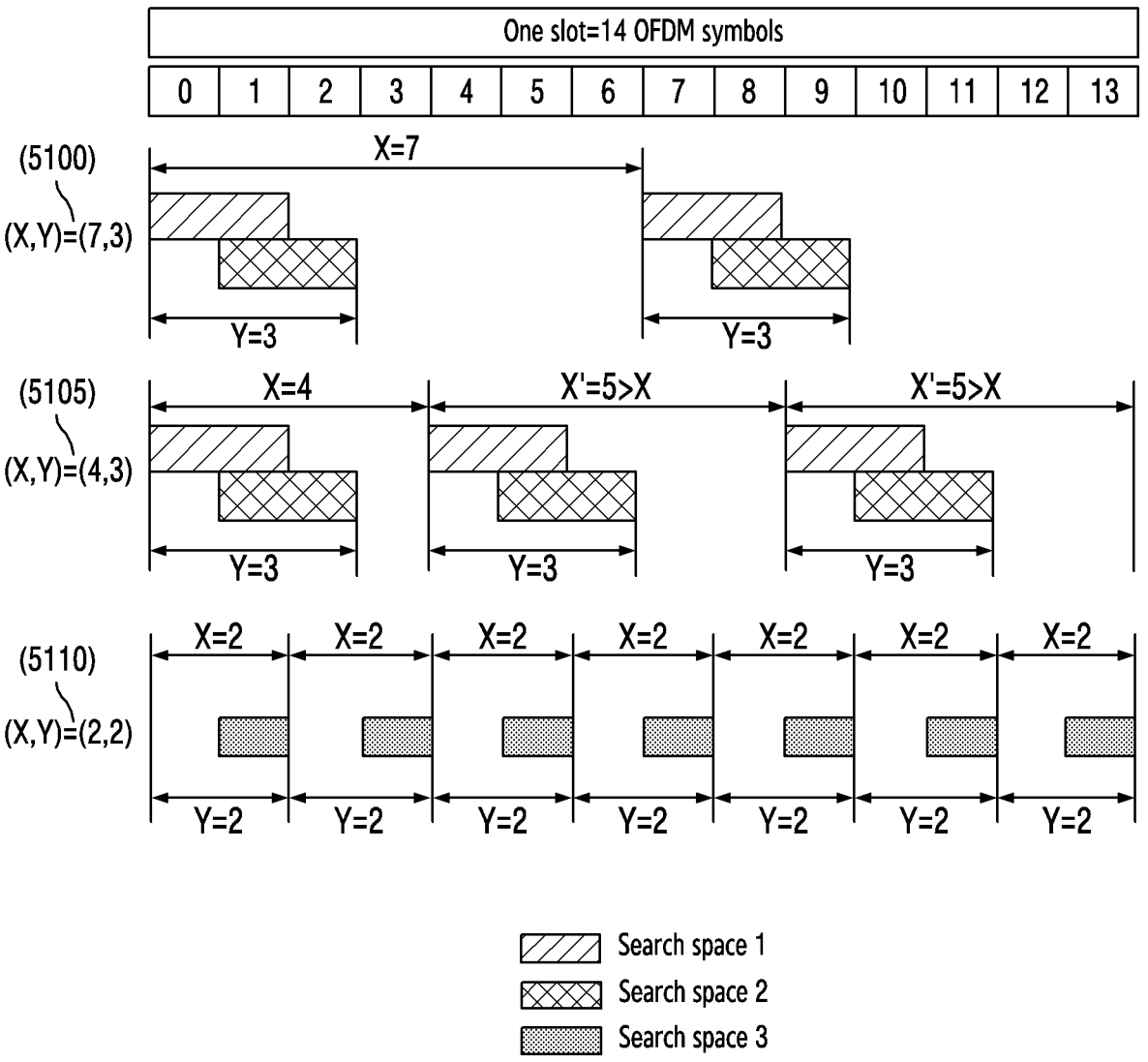
FIG. 5B illustrates the case in which the UE may have a plurality of PDCCH monitoring locations within the slot through the span in a wireless communication system according to an embodiment of the disclosure.

FIG. 5B illustrates the case in which the UE can have a plurality of PDCCH monitoring occasions within the slot through the span in a wireless communication system according to an embodiment of the disclosure.

The span in FIG. 5B can be expressed by (X,Y)=(7,3), (4,3), and (2,2), and the three cases are indicated by 5100, 5105, and 5110 in FIG. 5B. For example, 5100 indicates the case in which the number of spans which can be expressed by (7,4) is 2 in the slot. An interval between first symbols of the 2 spans is expressed as X=7, a PDCCH monitoring occasion may exist within a total of Y=3 symbols from the first symbol of each span, and search spaces 1 and 2 exist within Y=3 symbols. In another example, 5105 indicates the case in which the total number of spans which can be expressed by (4,3) is 3 in the slot, and an interval between a second span and a third span is X'=5 symbols larger than X=4.

PDCCH: UE Capability Report

The slot location of the common search space and the UE-specific search space is indicated by a monitoringSymbolsWithinSlot parameter in Table 11-1, and the symbol location within the slot is indicated by a bitmap through a monitoringSymbolsWithinSlot parameter in Table 9. Meanwhile, the symbol location within the slot in which the UE can perform search space monitoring may be reported to the BS through the following UE capability.

UE capability 1 (hereinafter, interchangeably used with FG 3-1): when the number of monitoring occasions (MOs) for type 1 and type 3 search spaces or the UE-specific search space is 1 within the slot, the UE capability is a capability to monitor the corresponding MO if the corresponding MO is within first 3 symbols in the slot. UE capability 1 is a mandatory capability which should be supported by all UEs supporting NR, and whether UE capability 1 is supported may not be explicitly reported to the BS. Of course, the disclosure is not limited to the example.

TABLE 11-1

| Index | Feature group | Components | Field name in TS 38.331 [2] |
|---|---|---|---|
| 3-1 | Basic DL control channel | 1) One configured CORESET per BWP per cell in addition to CORESET0 CORESET resource allocation of 6RB bit-map and duration of 1-3 OFDM symbols for FR1 For type 1 CSS without dedicated RRC configuration and for type 0, 0A, and 2 CSSs, CORESET resource allocation of 6RB bit-map and duration 1-3 OFDM symbols for FR2 For type 1 CSS with dedicated RRC configuration and for type 3 CSS, UE specific SS, CORESET resource allocation of 6RB bit-map and duration 1-2 OFDM symbols for FR2 REG-bundle sizes of 2/3 RBs or 6 RBs Interleaved and non-interleaved CCE-to-REG mapping | n/a |

TABLE 11-1-continued

| Index | Feature group | Components | Field name in TS 38.331 [2] |
|---|---|---|---|
| | | Precoder-granularity of REG-bundle size | |
| | | PDCCH DMRS scrambling determination | |
| | | TCI state(s) for a CORESET configuration | |
| | | 2) CSS and UE-SS configurations for unicast | |
| | | PDCCH transmission per BWP per cell | |
| | | PDCCH aggregation levels 1, 2, 4, 8, 16 | |
| | | UP to 3 search space sets in a slot for a scheduled | |
| | | secondary cell (SCell) per BWP | |
| | | This search space limit is before applying all | |
| | | dropping rules. | |
| | | For type 1 CSS with dedicated RRC | |
| | | configuration, type 3 CSS, and UE-SS, the | |
| | | monitoring occasion is within the first 3 OFDM | |
| | | symbols of a slot | |
| | | For type 1 CSS without dedicated RRC | |
| | | configuration and for type 0, 0A, and 2 CSS, the | |
| | | monitoring occasion can be any OFDM symbol(s) | |
| | | of a slot, with the monitoring occasions for any of | |
| | | Type 1- CSS without dedicated RRC configuration, | |
| | | or Types 0, 0A, or 2 CSS configurations within a | |
| | | single span of three consecutive OFDM symbols | |
| | | within a slot | |
| | | 3) Monitoring DCI formats 0_0, 1_0, 0_1, 1_1 | |
| | | 4) Number of PDCCH blind decodes per slot with | |
| | | a given SCS follows Case 1-1 table | |
| | | 5) Processing one unicast DCI scheduling DL and | |
| | | one unicast DCI scheduling UL per slot per | |
| | | scheduled CC for frequency division duplex (FDD) | |
| | | 6) Processing one unicast DCI scheduling DL and | |
| | | 2 unicast DCI scheduling UL per slot per scheduled | |
| | | CC for time division duplex (TDD) | |

UE capability 2 (hereinafter, interchangeably used with FG 3-2): when the number of monitoring occasions (MOs) for the common search space or the UE-specific search space is one within the slot, the UE capability is a capability to perform monitoring regardless of the start symbol location of the corresponding MO. UE capability 2 can be optionally supported by the UE, and whether UE capability 2 is supported may be explicitly reported to the BS. Of course, the disclosure is not limited to the following examples.

TABLE 11-2

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (hereinafter, interchangeably used with FG 3-5, 3-5a, or 3-5b): when the number of monitoring occasions (MOs) for the common search space or the UE-specific search space is plural within the slot, the UE capability indicates a pattern of MOs which the UE can monitor The pattern may include an interval X between start symbols of different MOs and a maximum symbol length U for one MO. A combination of (X, Y) supported by the UE may be one or more of $\{(2,2), (4,3), (7,3)\}$. UE capability 3 can be optionally supported by the UE, and whether UE capability 3 is supported and the combination of (X,Y) may be explicitly reported to the BS. Of course, the disclosure is not limited to the following examples.

TABLE 11-3

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions { 3-5. withoutDCI-Gap 3-5a. withDCI-Gap } |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap $b(l)$, $0 <= l <= 13$ is generated, where $b(l) = 1$ if symbol l of any slot is part of a monitoring occasion, $b(l) = 0$ otherwise. The first span in the span pattern begins at the smallest l for which $b(l) = 1$. The next span in the span pattern begins at the smallest l not included in the previous span(s) for which $b(l) = 1$. The span duration is max{maximum value of all CORESET durations, minimum value of Y in the UE reported | |

TABLE 11-3-continued

| Index | Feature group | Components | Field name in TS 38.331 [2] |
|---|---|---|---|
| | | candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The UE may report whether UE capability 2 and/or UE capability 3 is supported and relevant parameters to the BS. The BS receiving the report thereon may perform time axis resource allocation for the common search space and the UE-specific search space based on the UE capabilities. In the resource allocation, the BS may not place the MO at the location at which the UE cannot perform monitoring.

PDCCH: BD/CCE Limit

When a plurality of search space sets are configured in the UE, a method of determining a search space set which the UE should monitor may consider the following conditions.

If the UE receives a configuration of a value of monitoringCapabilityConfig-r16 which is higher-layer signaling as r15monitoringcapability, the UE defines the number of PDCCH candidates which can be monitored and a maximum value for the number of CCEs included in all search spaces (indicating all CCE sets corresponding to a union area of a plurality of search space sets) for each slot. If the UE receives a configuration of a value of monitoringCapabilityConfig-r16 as r16monitoringcapability, the UE defines the number of PDCCH candidates which can be monitored and a maximum value for the number of CCEs included in all search spaces (indicating all CCE sets corresponding to a union area of a plurality of search space sets) for each span.

Condition 1: Limit on Maximum Number of PDCCH Candidates

When the maximum number $M^\mu$ of PDCCH candidates which the UE can monitor according to the configuration value of higher-layer signaling as described above is defined based on a slot in a cell in which subcarrier spacing is configured as $15 \cdot 2^\mu$ kHz, the maximum number $M^\mu$ may follow Table 12-1 below, and when the maximum number $M^\mu$ is defined based on a span, the maximum number may follow Table 12-2 below.

TABLE 12-1

| μ | Maximum number of PDCCH candidates per slot and per serving cell ($M^\mu$) |
|---|---|
| 0 | 44 |
| 1 | 36 |
| 2 | 22 |
| 3 | 20 |

TABLE 12-2

| μ | Maximum number $M^\mu$ of monitored PDCCH candidates per span for combination (X, Y) and per serving cell | | |
|---|---|---|---|
| | (2, 2) | (4, 3) | (7, 3) |
| 0 | 14 | 28 | 44 |
| 1 | 12 | 24 | 36 |

Condition 2: Limit on Maximum Number of CCEs

When the maximum number $C^\mu$ of CCEs included in all search spaces (indicating all CCE sets corresponding to a union area of a plurality of search space sets) according to the configuration value of higher-layer signaling is defined based on a slot in a cell in which subcarrier spacing is configured as $15 \cdot 2^\mu$ kHz, the maximum number $C^\mu$ may follow Table 12-3 below, and when the maximum number $C^\mu$ of CCEs is defined based on a span, the maximum number $C^\mu$ may follow Table 12-4 below.

TABLE 12-3

| μ | Maximum number of non-overlapped CCEs per slot and per serving cell ($C^\mu$) |
|---|---|
| 0 | 56 |
| 1 | 56 |
| 2 | 48 |
| 3 | 32 |

TABLE 12-4

| μ | Maximum number $C^\mu$ of non-overlapped CCEs per span for combination (X, Y) and per serving cell | | |
|---|---|---|---|
| | (2, 2) | (4, 3) | (7, 3) |
| 0 | 18 | 36 | 56 |
| 1 | 18 | 36 | 56 |

For convenience of description, a situation satisfying both conditions 1 and 2 at a specific time is defined as a "condition A". Accordingly, non-satisfying the condition A may mean that at least one of conditions 1 and 2 is not satisfied.

PDCCH: Overbooking

The condition A may not be satisfied at a specific time point according to a configuration of search space sets by the BS. When the condition A is not satisfied at a specific time point, the UE may select and monitor only some of the search space sets configured to satisfy the condition A at the corresponding time point, and the BS may transmit the PDCCH through the selected search space sets.

The following method may be applied as a method of selecting some of all the configured search space sets.

If condition A for the PDCCH is not satisfied at a specific time point (slot), the UE (or the BS) may select a search space set of which a search space type is configured as a common-search space among search space sets existing at the corresponding time point in preference to a search space set of which a search space type is configured as a terminal-specific search space.

When all search space sets of which the search space type is configured as the common search space are selected (that is, when condition A is satisfied even after all search spaces of which the search space type is configured as the common search space are selected), the UE (or the BS) may select search space sets having the search space type configured as the UE-specific search space. At this time, when the number of search space sets configured as the UE-specific search space is plural, a search space set having a lower search space set index may have a higher priority. UE-specific search space sets may be selected within a range in which condition A is satisfied based on the priority.

QCL, TCI State

In the wireless communication system, one or more different antenna ports (or replaced with one or more channels, signals, and combinations thereof, but commonly referred to as different antenna ports for convenience in the following description of the disclosure) may be associated by a quasi co-location (QCL) configuration shown in Table 10 below. The TCI state is to inform of a QCL relation between a PDCCH (or a PDCCH DMRS) and another RS or channel, and a reference antenna port A (reference RS #A) and another purpose antenna port B (target RS #B) which are quasi co-located (QCLed) means that the UE is allowed to apply some or all of large-scale channel parameters estimated in the antenna port A to channel measurement from the antenna port B. The QCL is required to associate different parameters according to conditions, such as 1) time tracking influenced by average delay and delay spread, 2) frequency tracking influenced by Doppler shift and Doppler spread, 3) radio resource management (RRM) influenced by an average gain, and 4) beam management (BM) influenced by a spatial parameter. Accordingly, NR supports four types of QCL relations shown in Table 13 below.

TABLE 13

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

A spatial RX parameter may refer to some or all of various parameters, such as angle of arrival (AoA), power angular spectrum (PAS) of AoA, angle of departure (AoD), PAS of AoD, transmit/receive channel correlation, transmit/receive beamforming, spatial channel correlation, and the like.

The QCL relation may be configured in the UE through RRC parameter TCI-state and QCL-Info as shown in Table 14 below. Referring to Table 14 below, the BS may configure one or more TCI states in the UE and inform the UE of a maximum of two QCL relations (qcl-Type 1 and qcl-Type 2) for a reference signal (RS) referring to IDs of the TCI states, that is, a target RS. At this time, each piece of the QCL information (QCL-Info) included in the TCI state includes a serving cell index and a BWP index of a reference RS indicated by the corresponding QCL information, a type and an ID of the reference RS, and the QCL type as shown in Table 13 above. Of course, the disclosure is not limited to the example.

TABLE 14

```
TCI-State ::=                SEQUENCE {
    tci-StateId                 TCI-StateId,
    qcl-Type1                   QCL-Info,
    qcl-Type2                   QCL-Info
        OPTIONAL, -- Need R
    ...
}
QCL-Info ::=                 SEQUENCE {
    cell                        ServCellIndex
        OPTIONAL, -- Need R
    bwp-Id                      BWP-Id
        OPTIONAL, -- Cond CSI-RS-Indicated
    referenceSignal             CHOICE {
        csi-rs                      NZP-CSI-RS-
ResourceId,
        ssb                         SSB-
Index
    },
    qcl-Type                    ENUMERATED {typeA,
typeB, typeC, typeD},
    ...
}
```

Figure 7:
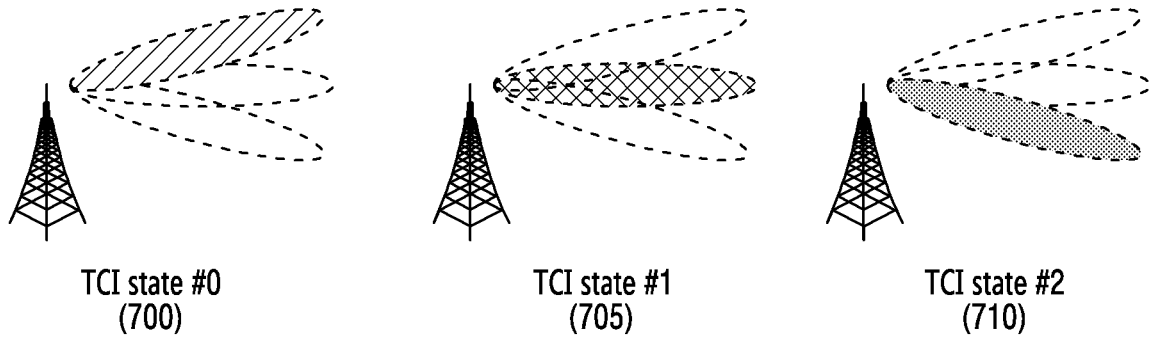
FIG. 7 illustrates BS beam allocation according to a TCI state configuration in a wireless communication system according to an embodiment of the disclosure.

FIG. 7 illustrates BS beam allocation according to a TCI state configuration according to an embodiment of the disclosure.

Referring to FIG. 7, the BS may transmit information on N different beams to the UE through N different TCI states. For example, in the case of N=3 as illustrated in FIG. 7, the BS may make qcl-Type2 parameters included in three TCI states 700, 705, and 710 associated with CSI-RSs or SSBs corresponding to different beams and configured as QCL type D and may notify that antenna ports referring to the different TCI states 700, 705, and 710 are associated with different spatial Rx parameters, that is, different beams.

Table 15-1 to Table 15-5 below show valid TCI state configurations according to the target antenna port type.

Table 15-1 shows valid TCI state configurations when the target antenna port is a CSI-RS for tracking (TRS). The TRS is a non-zero power (NZP) CSI-RS for which a repetition parameter is not configured and trs-Info is configured as true among CSI-RSs. The third configuration in Table 15-1 may be used for an aperiodic TRS. Of course, the disclosure is not limited to the following examples.

TABLE 15-1

| Valid TCI state configuration | DL RS 1 | qcl-Type1 | DL RS 2 (if configured) | qcl-Type 2 (if configured) |
|---|---|---|---|---|
| | | Valid TCI state configurations when target antenna port is CSI-RS for tracking (TRS) | | |
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 15-2 shows valid TCI state configurations when the target antenna port is a CSI-RS for CSI. The CSI-RS for CSI may be an NZP CSI-RS for which a parameter (for example, a repetition parameter) indicating repetition is not configured and trs-Info is not configured as true among the CSI-RSs. Of course, the disclosure is not limited to the following examples.

TABLE 15-2

| Valid TCI state configuration | DL RS 1 | qcl-Type1 | DL RS 2 (if configured) | qcl-Type 2 (if configured) |
|---|---|---|---|---|
| | | Valid TCI state configurations when target antenna port is CSI-RS for CSI | | |
| 1 | TRS | QCL-TypeA | SSB | QCL-TypeD |
| 2 | TRS | QCL-TypeA | CSI-RS (BM) | QCL-TypeD |
| 3 | TRS | QCL-TypeA | TRS (same as DL RS 1) | QCL-TypeD |
| 4 | TRS | QCL-TypeB | | |

Table 15-3 shows valid TCI state configurations when the target antenna port is a CSI-RS for beam management (BM) (that is the same meaning as a CSI-RS for L1 reference signal received power (RSRP) reporting). The CSI-RS for BM may be an NZP CSI-RS for which a repetition parameter is configured to have a value of on or off and trs-Info is not configured as true. Of course, the disclosure is not limited to the following examples.

TABLE 15-3

| Valid TCI state configuration | DL RS 1 | qcl-Type1 | DL RS 2 (if configured) | qcl-Type 2 (if configured) |
|---|---|---|---|---|
| | | Valid TCI state configurations when target antenna port is CSI-RS for BM (for L1 RSRP reporting) | | |
| 1 | TRS | QCL-TypeA | SSB | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 15-4 shows valid TCI state configurations when the target antenna port is a PDCCH DMRS. Of course, the disclosure is not limited to the following examples.

TABLE 15-4

| Valid TCI state configuration | DL RS 1 | qcl-Type1 | DL RS 2 (if configured) | qcl-Type 2 (if configured) |
|---|---|---|---|---|
| | | Valid TCI state configurations when target antenna port is PDCCH DMRS | | |
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 15-5 shows valid TCI state configurations when the target antenna port is a PDCCH DMRS. Of course, the disclosure is not limited to the following examples.

TABLE 15-5

| Valid TCI state configurations when target antenna port is PDSCH DMRS | | | |
| --- | --- | --- | --- |
| Valid TCI state configuration DL RS 1 | qcl-Type1 | DL RS 2 (if configured) | qcl-Type 2 (if configured) |
| 1 TRS | QCL-TypeA | TRS | QCL-TypeD |
| 2 TRS | QCL-TypeA | CSI-RS (BM) | QCL-TypeD |
| 3 CSI-RS (CSI | QCL-TypeA | CSI-RS (CSI) | QCL-TypeD |

In a representative QCL configuration method by Table 15-1 to Table 15-5, the target antenna port and the reference antenna port for each step are configured and operated as "SSB"→"TRS"→"CSI-RS for CSI, CSI-RS for BM, PDCCH DMRS, or PDSCH DMRS". Accordingly, it is possible to assist the UE in the reception operation by associating statistical characteristics which can be measured from the SSB and the TRS with respective antenna ports.

PDCCH: Related to TBC State

Specifically, a combination of TCI states which can be applied to a PDCCH DMRS antenna port is as shown in Table 16 below. In Table 16, a fourth row is a combination assumed by the UE before the RRC configuration, and configurations after RRC are impossible.

TABLE 16

| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
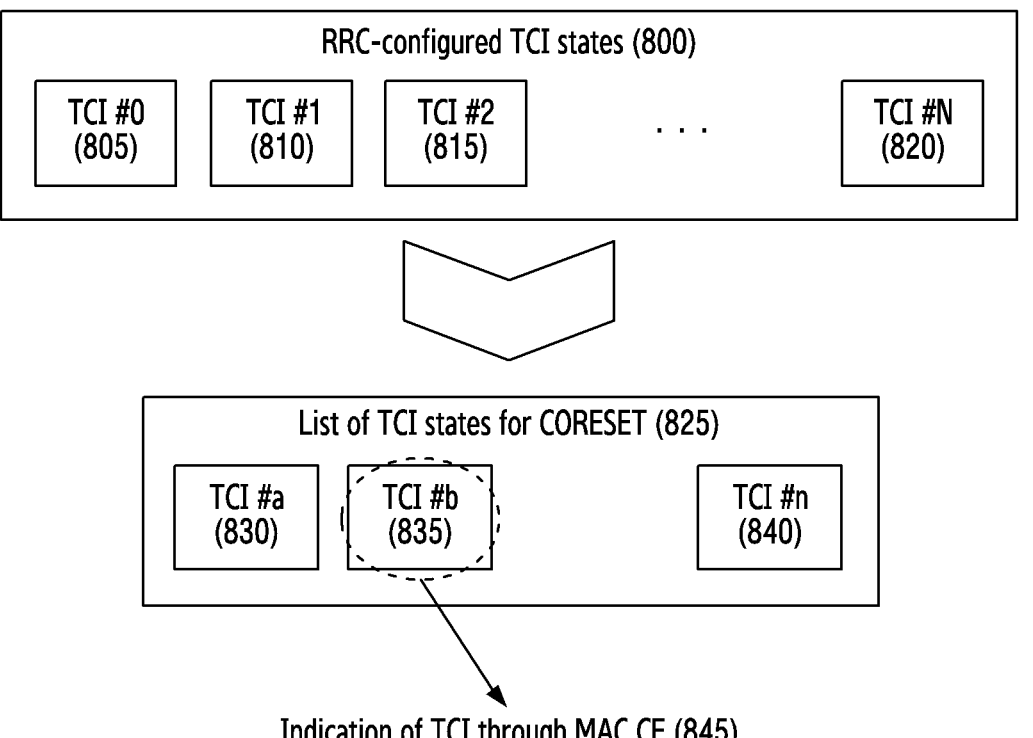
FIG. 8 illustrates a method of allocating TCI states for a PDCCH in a wireless communication system according to an embodiment of the disclosure.

FIG. 8 illustrates a method of allocating TCI states for a PDCCH in a wireless communication system according to an embodiment of the disclosure.

NR supports the hierarchical signaling method as illustrated in FIG. 8 for dynamical allocation of PDCCH beams.

Referring to FIG. 8, the BS may configure N TCI states 805, 810, . . . , 820 in the UE through RRC signaling 800 and configure some thereof as TCI states for the CORESET as indicated by reference numeral 825. Thereafter, the BS may indicate one of the TCI states 830, 835, and 840 for the CORESET to the UE through MAC CE signaling as indicated by reference numeral 845. The UE receives a PDCCH based on beam information included in the TCI state indicated by the MAC CE signaling.

Figure 9:
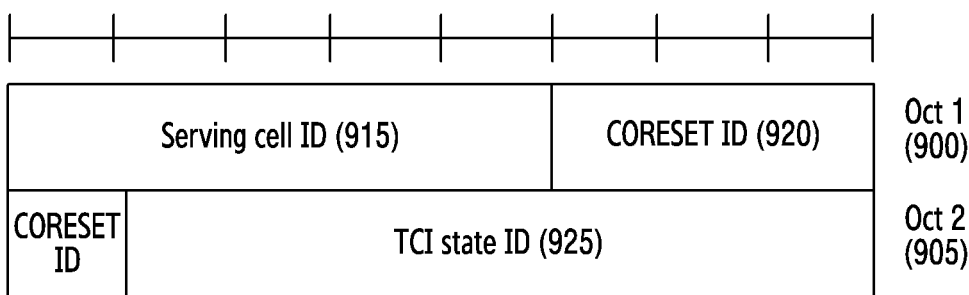
FIG. 9 illustrates a TCI indication medium access control (MAC) control element (CE) signaling structure for a PDCCH demodulation reference signal (DMRS) in a wireless communication system according to an embodiment of the disclosure.

FIG. 9 illustrates a TCI indication MAC CE signaling structure for a PDCCH DMRS according to an embodiment of the disclosure.

Referring to FIG. 9, TCI indication MAC CE signaling for the PDCCH DMRS may consist of 2 bytes (16 bits), and may include a serving cell ID 915 of 5 bits, a CORESET ID 920 of 4 bits, and a TCI state ID 925 of 7 bits.

Figure 10:
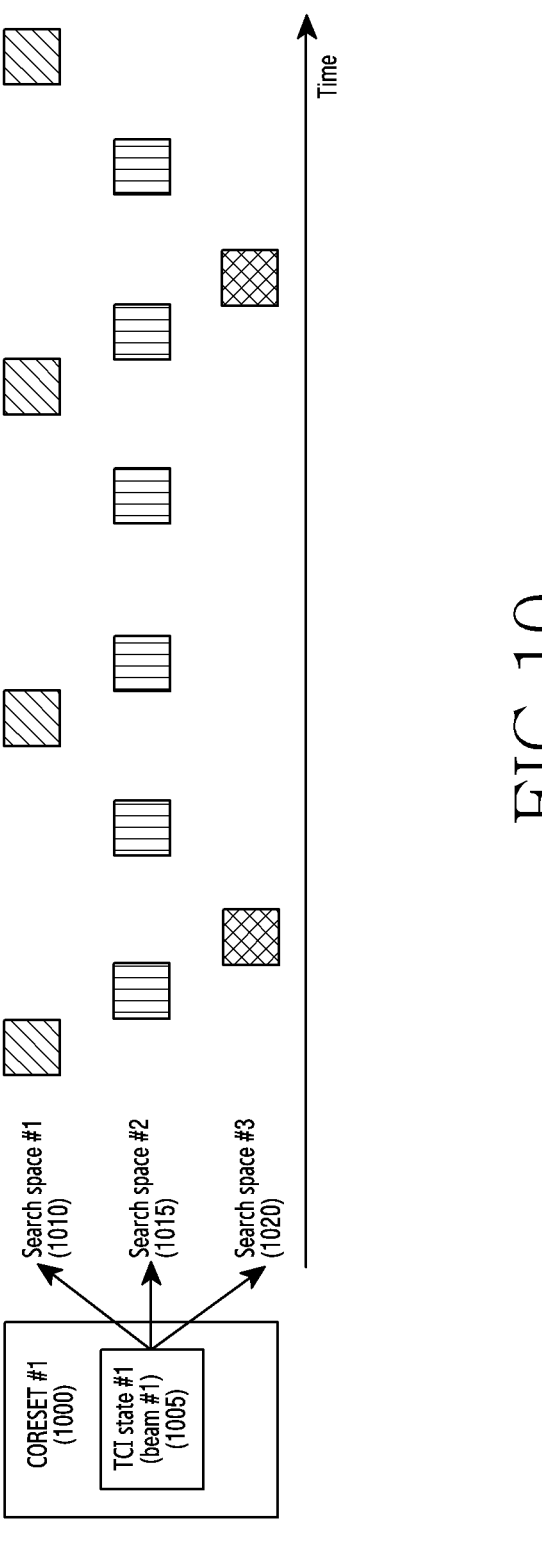
FIG. 10 illustrates a CORESET and search space beam configuration in a wireless communication system according to an embodiment of the disclosure.

FIG. 10 illustrates a control resource set (CORESET) and a beam configuration example of search spaces according to an embodiment of the disclosure.

Referring to FIG. 10, the BS may indicate one TCI state in a TCI state list included in the configuration of a CORSET 1000 through MAC CE signaling as indicated by reference numeral 1005. Thereafter, before another TCI state is indicated to the corresponding CORSET through other MAC CE signaling, the UE may consider or determine that the same QCL information 1005 (beam #1) is applied to one or more search spaces 1010, 1015, and 1020 connected to the CORESET 1000. The PDCCH beam allocation method has difficulty in indicating a beam change earlier than a MAC CE signaling delay and has a disadvantage of applying the same beam to all CORESETs regardless of a search space characteristic, and thus makes flexible PDCCH beam operation difficult. Hereinafter, embodiments of the disclosure provide a more flexible PDCCH beam configuration and operation method. In the following description of embodiments of the disclosure, for convenience of description, some distinguished examples are provided but the examples are not exclusive and may be appropriately combined and applied according to circumstance.

The BS may configure one or a plurality of TCI states for a specific CORESET in the UE and activate one of the configured TCI states through a MAC CE activation command. For example, {TCI state #0, TCI state #1, TCI state #2} are configured in CORESET #1 as the TCI states, and the BS may transmit a command for activating TCI state #0 assumed as the TCI state for CORESET #1 to the UE through the MAC CE. The UE may correctly receive a DMRS of the corresponding CORESET based on QCL information within the activated TCI state by means of the activation command for the TCI state received through the MAC CE.

When the UE does not receive the MAC CE activation command for the TCI state of CORESET #0 for the CORESET (CORESET #0) having an index of 0, the UE may assume that a DMRS transmitted in CORESET #0 is QCLed with an SS/PBCH block identified in an initial access process or a non-contention-based random access process which is not triggered by a PDCCH command.

When the UE does not receive a configuration of the TCI state for CORESET #X or the UE receives the configuration of one or more TCI states but does not receive a MAC CE activation command for activating one of the TCI states for the CORESET (CORESET #X) having an index configured as a value other than 0, the UE may assume that a DMRS transmitted in CORESET #X is QCLed with an SS/PBCH block identified in an initial access process.

PDCCH: Related to QCL Prioritization Rule

Hereinafter, an operation for determining a QCL priority for a PDCCH is described below.

When the UE operates with carrier aggregation in a single or band and a plurality of control resource sets existing within an activated BWP in a single cell or a plurality of cells overlap in the time while having the same or different QCL-TypeD characteristics in a specific PDCCH monitoring occasion, the UE may select a specific control resource set according to a QCL priority determination operation and monitor control resource sets having the same QCL-TypeD characteristic as the corresponding control resource set. For example, a plurality of control resource sets overlap in the time, only one QCL-TypeD characteristic may be received. At this time, a reference to determining the QCL priority is described below.

Reference 1. Control resource set connected to a common search space having the lowest index within a cell corresponding to the lowest index among cells including the common search space.

Reference 2. Control resource set connected to a UE-specific search space having the lowest index within a cell corresponding to the lowest index among cells including the UE-specific search space.

As described above, when the corresponding references are not satisfied, the following reference is applied. For example, when control resource sets overlap in the time in a specific PDCCH monitoring section, if all control resource sets are connected to a UE-specific search space without being connected to a common search space, that is, if reference 1 is not satisfied, the UE may omit applying of reference 1 and apply reference 2. Of course, the disclosure is not limited to the example.

When the control resource set is selected by the references, the UE may additionally consider two matters below for QCL information configured in the control resource set. First, when control resource set 1 has CSI-RS 1 as a reference signal having the relation of QCL-TypeD, a reference signal having the relation of QCL-TypeD with CSI-RS 1 is SSB1, and a reference signal having the relation of QCL-TypeD with control resource set 2 is SSB1, the UE may consider that two control resource sets 1 and 2 have different QCL-TypeD characteristics. Second, when control resource set 1 has CSI-RS 1 configured in cell 1 as a reference signal having the relation of QCL-TypeD, a reference signal having the relation of QCL-TypeD with CSI-RS1 is SSB1, control resource set 2 has CSI-RS 2 configured in cell 2 as a reference signal having the relation of QCL-TypeD, and a reference signal having the relation of QCL-TypeD with CSI-RS 2 is SSB 1, the UE may consider that the two control resource sets have the same QCL-TypeD characteristic.

FIG. 12 illustrates a method of selecting a control resource set which can be received based on a priority when the UE receives a downlink control channel in a wireless communication system according to an embodiment of the disclosure.

Referring to FIG. 12, for example, the UE may receive a configuration of reception of a plurality of control resource sets overlapping in the time in a specific PDCCH monitoring occasion 1210, and the plurality of control resource sets may be connected to a common search space or a UE-specific search space for a plurality of cells. In the corresponding PDCCH monitoring occasion, a first control resource set 1215 connected to a first common search space may exist within a first BWP 1200 of a first cell and a first control resource set 1220 connected to a first common search space and a second control resource set 1225 connected to a second UE-specific search space may exist within a first BWP 1205 of a second cell. The control resource sets 1215 and 1220 may have the relation of QCL-TypeD with a first CSI-RS resource configured within the first BWP of the first cell, and the control resource set 1225 may have the relation of QCL-TypeD with the first CSI-RS resource configured within the first BWP of the second cell. Accordingly, when reference 1 is applied to the corresponding PDCCH monitoring occasion 1210, all other control resource sets having the reference signal of QCL-TypeD which is the same as the first control resource set 1215 may be received. Accordingly, the UE may receive the control resource sets 1210 and 1150 in the corresponding PDCCH monitoring occasion 1215.

For example, the UE may receive a configuration of reception of a plurality of control resource sets overlapping in the time in a specific PDCCH monitoring occasion 1240, and the plurality of control resource sets may be connected to a common search space or a UE-specific search space for a plurality of cells. In the corresponding PDCCH monitoring occasion, a first control resource set 1245 connected to a first UE-specific search space and a second control resource set 1250 connected to a second UE-specific search space may exist within a first BWP 1230 of a first cell and a first control resource set 1255 connected to a first UE-specific search space and a second control resource set 1260 connected to a third UE-specific search space may exist within a first BWP 1235 of a second cell. The control resource sets 1245 and 1250 may have the relation of QCL-TypeD with a first CSI-RS resource configured within the first BWP of the first cell, the control resource set 1255 may have the relation of QCL-TypeD with the first CSI-RS resource configured within the first BWP of the second cell, and the control resource set 1260 may have the relation with QCL-TypeD with a second CSI-RES resource configured within the first BWP of the second cell. However, when reference 1 is applied to the corresponding PDCCH monitoring occasion 1240, there is no common search space, and thus reference 2 which is the following reference may be applied. When reference 2 is applied to the corresponding PDCCH monitoring occasion 1240, all other control resource sets having the reference signal of QCL-TypeD which is the same as the control resource set 1115 may be received. Accordingly, the UE may receive the control resource sets 1245 and 1250 in the corresponding PDCCH monitoring occasion 1240.

Related to Rate Matching/Puncturing

In the following description, a rate matching operation and a puncturing operation are described below.

When a time at which a predetermined symbol sequence A is transmitted and frequency resources A overlap a predetermined time and frequency resources B, a rate matching or puncturing operation may be considered as a transmission/reception operation of a channel A considering of resources C in an area in which the resources A and the resources B overlap each other. A detailed operation may follow the content below.

Rate Matching Operation

The BS may map and transmit the channel A only for the remaining resource areas except for the resources C corresponding to the area in which the entire resources A for transmitting the symbol sequence A to the UE overlap the resources B. For example, when the symbol sequence A includes {symbol #1, symbol #2, symbol #3, symbol #4}, the resources A are {resource #1, resource #2, resource #3, resource #4}, and the resources B are {resource #3, resource #5}, the BS may sequentially map the symbol sequence A to the remaining resources {resource #1, resource #2, resource #4} except for {resource #3} corresponding to the resources C among the resources A and transmit the same. As a result, the BS may map the symbol sequence {symbol #1, symbol #2, symbol #3} to {resource #1, resource #2, resource #4}, respectively, and transmit the same.

The UE may determine the resources A and the resources B based on scheduling information for the symbol sequence A from the BS and determine the resources C in the area in which the resources A and the resources B overlap each other. The UE may receive the symbol sequence A based on the assumption that the symbol sequence A is mapped to and transmitted in the remaining areas except for the resources C among the entire resources A. For example, when the symbol sequence A includes {symbol #1, symbol #2, symbol #3, symbol #4}, the resources A are {resource #1, resource #2, resource #3, resource #4}, and the resources B are {resource #3, resource #5}, the UE may receive the symbol sequence A based on the assumption that the symbol sequence A is sequentially mapped to the remaining resources {resource #1, resource #2, resource #4} except for {resource #3} corresponding to the resources C among the resources A. As a result, the UE may perform a series of reception operations later based on the assumption that the symbol sequences {symbol #1, symbol #2, symbol #3} are mapped to and transmitted in {resource #1, resource #2, resource #4}, respectively. Of course, the disclosure is not limited thereto.

Puncturing Operation

When there are resources C corresponding to an area in which the entire resources A for transmitting the symbol sequence A to the UE overlap the resources B, the BS may map the symbol sequence A to all the resources A, but may perform transmission only in the remaining resource areas except for the resources C among the resources A without transmission in a resource area corresponding to the resources C. For example, when the symbol sequence A includes {symbol #1, symbol #2, symbol #3, symbol #4}, the resources A are {resource #1, resource #2, resource #3, resource #4}, and the resources B are {resource #3, resource #5}, the BS may map the symbol sequence A includes {symbol #1, symbol #2, symbol #3, symbol #4} to the resources A {resource #1, resource #2, resource #3, resource #4}, respectively, and transmit only the symbol sequence {symbol #1, symbol #2, symbol #4} corresponding to the remaining resources {resource #1, resource #2, resource #4} except for {resource #3} corresponding to the resources C among the resources A without transmission of {symbol #3} mapped to {resource #3} corresponding to the resources C. As a result, the BS may map the symbol sequence {symbol #1, symbol #2, symbol #4} to {resource #1, resource #2, resource #4}, respectively, and transmit the same.

The UE may determine the resources A and the resources B based on scheduling information for the symbol sequence A from the BS and determine the resources C in the area in which the resources A and the resources B overlap each other. The UE may receive the symbol sequence A based on the assumption that the symbol sequence A is mapped to the entire resources A but is transmitted only in the remaining areas except for the resources C among the resources A. For example, when the symbol sequence A includes {symbol #1, symbol #2, symbol #3, symbol #4}, the resources A are {resource #1, resource #2, resource #3, resource #4}, and the resources B are {resource #3, resource #5}, the UE may assume that the symbol sequence A {symbol #1, symbol #2, symbol #3, symbol #4} is mapped to the resources A {resource #1, resource #2, resource #3, resource #4}, respectively, but {symbol #3} mapped to {resource #3} corresponding to the resources C is not transmitted, and may perform reception on the basis the assumption that the symbol sequence {symbol #1, symbol #2, symbol #4} corresponding to the remaining resources {resource #1, resource #2, resource #4} except for {resource #3} corresponding to the resources C among the resources A is mapped and transmitted. As a result, the UE may perform a series of reception operation later based on the assumption that the symbol sequence {symbol #1, symbol #2, symbol #4} is mapped to and transmitted in {resource #1, resource #2, resource #4}, respectively.

In the following description, a method of configuring rate matching resources for the purpose of rate matching in the 5G communication system is described. Rate matching refers to the control of the size of a signal based on the amount of resources available for transmitting the signal.

For example, rate matching of a data channel may mean mapping data channels to specific time and frequency resource domains without transmission, so as to control the size of data according thereto.

Figure 11:
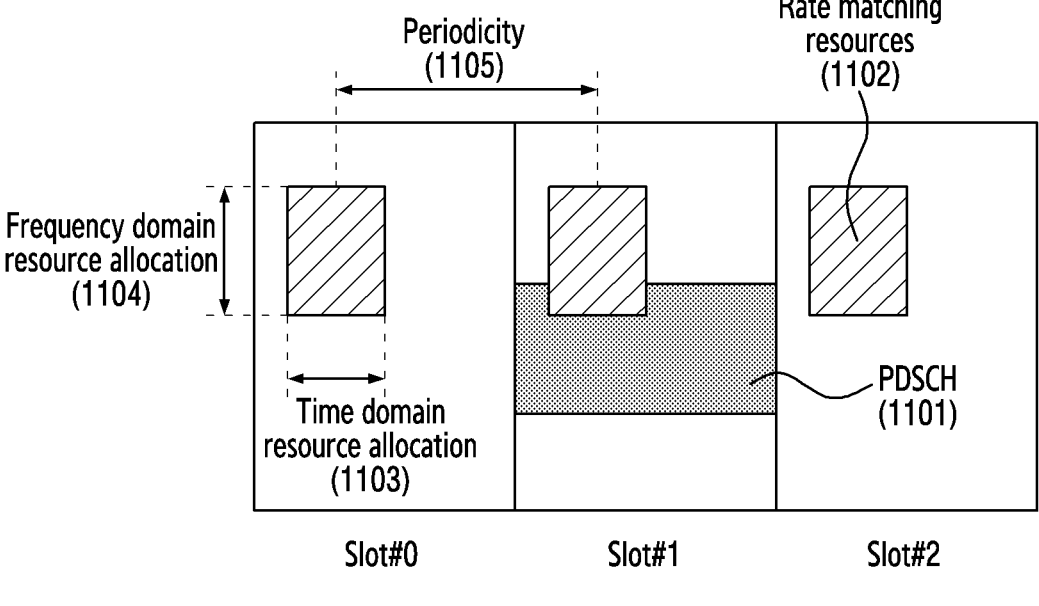
FIG. 11 illustrates a method by which the BS and the UE transmit and receive data based on downlink data channels

FIG. 11 illustrates a method by which the BS and the UE transmit and receive data based on a downlink data channel and rate matching resources according to an embodiment of the disclosure.

Referring to FIG. 11, a physical downlink data channel (PDSCH) 1101 and a rate matching resource 1102 are illustrated. The BS may configure one or a plurality of rate matching resources 1102 in the UE through higher-layer signaling (for example, RRC signaling). The rate matching resource 1102 configuration information may include time axis resource allocation information 1103, frequency axis resource allocation information 1104, and period information 1105. Hereinafter, a bitmap corresponding to the frequency axis resource allocation information 1104 is named a "first bitmap", a bitmap corresponding to the time axis resource allocation information 1103 is named a "second bitmap", and a bitmap corresponding to the period information 1105 is named a "third bitmap". When all or some of the time and frequency resources of the scheduled data channel 1101 overlap the configured rate matching resources 602, the BS may rate-match the data channel 1101 in the part of the rate matching resources 1102 and transmit the data channel, and the UE may perform reception and decoding based on the assumption that the data channel 1101 is rate-matched in the part of the rate matching resources 1102.

The BS may dynamically notify the UE of whether to rate-match the data channel in the rate matching resource part configured through an additional configuration (corresponding to a "rate matching indicator" in the above-described DCI format). Specifically, the BS may select some of the configured rate matching resources, group the selected rate matching resources into a rate matching resource group, and inform the UE of whether to perform rate matching on the data channel for each rate matching resource group through DCI using a bitmap scheme. For example, when 4 rate matching resources, RMR #1, RMR #2, RMR #3, and RMR #4 are configured, the BS may configure rate matching groups RMG #1={RMR #1, RMR #2} and RMG #2={RMR #3, RMR #4}, and inform the UE of whether to perform rate matching in each of RMG #1 and RMG #2 by using 2 bits within a DCI field. For example, "1" may be indicated when the rate matching is needed, and "0" may be indicated when the rate matching is not needed.

In 5G, granularity at an "RB symbol level" and an "RE level" is supported as a method of configuring the rate matching resource in the UE. More specifically, the following configuration method may be used.

RB Symbol Level

The UE may receive a configuration of a maximum of 4 RateMatchPatterns through higher-layer signaling, and one RateMatchPattern may include the following content. Of course, the disclosure is not limited to the following examples.

As reserved resources within a BWP, resources in which time and frequency resource areas of the corresponding reserved resources are configured by a combination of a bitmap at an RB level and a bitmap at a symbol level in the frequency axis may be included. The reserved resource may be over (span) one or two slots. A time domain pattern ((periodicityAndPattern) in which frequency and time domains including a pair of the RB level bitmap and the symbol level bitmap are repeated may be additionally configured.

Time and frequency domain resource areas configured as CORESETs within the BWP and resource areas corresponding to a time domain pattern configured as a search space configuration in which the corresponding resource areas are repeated may be included.

RE Level

The UE may receive a configuration of the following content through higher-layer signaling. Of course, the disclosure is not limited to the following examples.

As configuration information for REs corresponding to a LTE cell-specific reference signal or common reference signal (CRS) pattern, the number of LTE CSR ports (nrofCRS-Ports), values of LTE-CRS-vshift(s) (v-shift), information on a center subcarrier location (carrierFreqDL) of an LTE carrier from a frequency point that is a reference (for example, reference point A), information on a bandwidth size of an LTE carrier (carrierBandwidthDL), subframe configuration information (mbsfn-SubframConfigList) corresponding to a multicast-broadcast single-frequency network (MBSFN), and the like. The UE may determine the location of the CRS within the NR slot corresponding to the LTE subframe based on the above-described information.

Configuration information for a resource set corresponding to one or a plurality of zero power (ZP) CSI-RSs within the BWP may be included.

Related to LTE CRS Rate Match

Subsequently, the rate match process for the LTE CRS is described below. For the coexistence of long-term evolution (LTE) and new radio access technology (RAT) (NR) (LTE-NR coexistence), NR may provide a function of configuring a pattern of cell-specific reference signal (CRS) of LTE to an NR UE. More specifically, the CRS pattern may be provided by RRC signaling including at least one parameter within a ServingCellConfig information element (IE) or a Serving-CellConfigCommon IE. The parameters may be, for example, lte-CRS-ToMatchAround, lte-CRS-PatternList1-r16, lte-CRS-PatternList2-r16, crs-RateMatch-PerCORE-SETPoolIndex-r16, and the like.

In Rel-15 NR, a function of configuring one CRS pattern per serving cell may be provided through the parameter lte-CRS-ToMatchAround. In Rel-16 NR, the function of configuring one CRS pattern per serving cell has expanded to configure a plurality of CRS patterns per serving cell. More specifically, one CRS pattern per LTE carrier may be configured in a single-transmission and reception point (TRP) configuration UE, and two CRS patterns per LTE carrier may be configured in a multi-TRP configuration UE. For example, a maximum of three CRS patterns per serving cell may be configured in the single-TRP configuration UE through the parameter lte-CRS-PatternList1-r16. In another example, the CRS may be configured for each TRP in the multi-TRP configuration UE.

For example, a CRS pattern for TRP1 may be configured through the parameter lte-CRS-PatternList1-r16, and a CRS pattern for TRP2 may be configured through the parameter lte-CRS-PatternList2-r16. Meanwhile, when the two TRPs are configured, whether to apply all of the CRS patterns of TRP1 and TRP2 or only the CRS pattern for one TRP is determined through the parameter crs-RateMatch-Per-CORESETPoolIndex-r16, and only the CRS pattern of one TRP is applied when the parameter crs-RateMatch-Per-CORESETPoolIndex-r16 is configured to be enabled and, otherwise, all of the CRS patterns of the two TRPs are applied.

Table 17 shows the ServingCellConfig IE including the CRS pattern, and Table 18 shows the RateMatchPatternLTE-CRS IE including at least one parameter for the CRS pattern.

TABLE 17

| | | |
|---|---|---|
| ServingCellConfig ::= | SEQUENCE { | |
| tdd-UL-DL-ConfigurationDedicated | | TDD-UL-DL-ConfigDedicated |
| OPTIONAL, -- Cond TDD | | |
| initialDownlinkBWP | BWP-DownlinkDedicated | OPTIONAL, |
| -- Need M | | |
| downlinkBWP-ToReleaseList | | SEQUENCE (SIZE (1..maxNrofBWPs)) OF BWP-Id |
| OPTIONAL, -- NeedN | | |
| downlinkBWP-ToAddModList | | SEQUENCE (SIZE (1..maxNrofBWPs)) OF BWP- |
| Downlink | OPTIONAL, -- Need N | |
| firstActiveDownlinkBWP-Id | BWP-Id | OPTIONAL, |
| -- Cond SyncAndCellAdd | | |
| bwp-InactivityTimer | ENUMERATED {ms2, ms3, ms4, ms5, ms6, ms8, ms10, ms20, | |
| ms30, | | |
| | ms40,ms50, ms60, ms80,ms100, ms200,ms300, ms500, | |
| | ms750, ms1280, ms1920, ms2560, spare10, spare9, spare8, | |
| | spare7, spare6, spare5, spare4, spare3, spare2, spare1 } | |
| OPTIONAL, --Need R | | |
| defaultDownlinkBWP-Id | BWP-Id | OPTIONAL, |
| -- Need S | | |
| uplinkConfig | | OPTIONAL, -- Need M |
| supplementaryUplink | UplinkConfig | OPTIONAL, |
| -- Need M | | |
| pdcch-ServingCellConfig | | SetupRelease { PDCCH-ServingCellConfig } |
| OPTIONAL, -- Need M | | |
| pdsch-ServingCellConfig | | SetupRelease { PDSCH-ServingCellConfig } |
| OPTIONAL, -- Need M | | |
| csi-MeasConfig | SetupRelease {CSI-MeasConfig} | OPTIONAL, |
| -- Need M | | |
| sCellDeactivationTimer | ENUMERATED {ms20, ms40, ms80, ms 160, ms200, ms240, | |
| | ms320, ms400, ms480, ms520, ms640, ms720, | |
| | ms840, ms1280, spare2,spare1} | OPTIONAL, -- Cond |
| ServingCellWithoutPUCCH | | |
| crossCarrierSchedulingConfig | | CrossCarrierSchedulingConfig |
| OPTIONAL, -- Need M | | |
| tag-Id | TAG-Id, | |
| dummy | ENUMERATED {enabled} | OPTIONAL, |

US 12,640,860 B2

45

46

TABLE 17-continued

```
-- Need R
  pathlossReferenceLinking                                    ENUMERATED {spCell, sCell}
OPTIONAL, -- Cond SCellOnly
  servingCellMO              MeasObjectId                     OPTIONAL, -
- Cond MeasObject
  ...,
  [[
  lte-CRS-ToMatchAround                                       SetupRelease { RateMatchPatternLTE-CRS }
OPTIONAL, -- Need M
  rateMatchPatternToAddModList                           SEQUENCE (SIZE (1..maxNrofRateMatchPatterns)) OF
RateMatchPattern              OPTIONAL, -- Need N
  rateMatchPatternToReleaseList                          SEQUENCE (SIZE (1..maxNrofRate MatchPatterns)) OF
RateMatchPatternId            OPTIONAL, -- Need N
  downlinkChannelBW-PerSCS-List                             SEQUENCE (SIZE (1..maxSCSs)) OF SCS-
SpecificCarrier               OPTIONAL -- Need S
  ]],
  [[
  supplementaryUplinkRelease               ENUMERATED {true}              OPTIONAL,
-- Need N
  tdd-UL-DL-ConfigurationDedicated-IAB-MT-r16   TDD-UL-DL-ConfigDedicated-IAB-MT-r16
OPTIONAL, -- Cond TDD_IAB
  dormantBWP-Config-r16                                    SetupRelease { DormantBWP-Config-r16 }
OPTIONAL, -- Need M
  ca-SlotOfset-r16                    CHOICE {
     refSCS15kHz                     INTEGER (-2..2),
     refSCS30KHz                     INTEGER (-5..5),
     refSCS60KHz                     INTEGER (-10..10),
     refSCS120KHz                    INTEGER (-20..20)
  }                                                              OPTIONAL, -- Cond
AsyncCA
  channelAccessConfig-r16                                  SetupRelease { ChannelAccessConfig-r16 }
OPTIONAL, -- Need M
  intraCellGuardBandsDL-List-r16                            SEQUENCE (SIZE (1..maxSCSs)) OF
IntraCellGuardBandsPerSCS-r16            OPTIONAL, -- Need S
  intraCellGuardBandsUL-List-r16                            SEQUENCE (SIZE (1..maxSCSs)) OF
IntraCellGuardBandsPerSCS-r16            OPTIONAL, -- Need S
  csi-RS-ValidationWith-DCI-r16                              ENUMERATED {enabled}
OPTIONAL, -- Need R
  lte-CRS-PatternList1-r16                                  SetupRelease { LTE-CRS-PatternList-r16 }
OPTIONAL, -- Need M
  lte-CRS-PatternList2-r16                                  SetupRelease { LTE-CRS-PatternList-r16 }
OPTIONAL, -- Need M
  crs-RateMatch-PerCORESETPoolIndex-r16                     ENUMERATED {enabled}
OPTIONAL, -- Need R
  enableTwoDefaultTCI-States-r16                            ENUMERATED {enabled}
OPTIONAL, -- Need R
  enableDefaultTCI-StatePerCoresetPoolIndex-r16             ENUMERATED{enabled}
OPTIONAL, -- Need R
  enableBeamSwitchTiming-r16                                ENUMERATED {true}
OPTIONAL, -- Need R
  cbg-TxDiffTBsProcessingType1-r16                          ENUMERATED {enabled}
OPTIONAL, -- Need R
  cbg-TxDiffTBsProcessingType2-r16                          ENUMERATED {enabled}
OPTIONAL -- Need R
  ]]
}
```

TABLE 18

```
- RateMatchPatterLTE-CRS
The IE RateMatchPatternLTE-CRS is used to configure a pattern to rate match around LTE
CRS. See TS 38.214 [19], clause 5.1.4.2.
RateMatchPatternLTE-CRS information element
-- ASN1START
-- TAG-RATEMATCHPATTERNLTE-CRS-START
RateMatchPatternLTE-CRS : :=          SEQUENCE {
   carrierFreqDL                        INTEGER (0..16383),
   carrierBandwidthDL                   ENUMERATED {n6, n15, n25, n
50, n75, n100, spare2, spare1},
   mbsfn-SubframeConfigList                 EUTRA-MBSFN-SubframeConfig
List                                 OPTIONAL, -- Need M
   nrofCRS-Ports                        ENUMERATED {n1, n2, n4 } ,
   v-Shift                              ENUMERATED {n0, n1, n2, n3,
n4, n5}
}
```

TABLE 18-continued

| | |
|---|---|
| LTE-CRS-PatternList-r16 ::= | SEQUENCE (SIZE (1..maxLTE-CRS- |
| Patterns-r16) ) OF RateMatchPatternLTE-CRS | |

```
-- TAG-RATEMATCHPATTERNLTE-CRS-STOP
-- ASN1STOP
RateMatchPatternLTE-CRS field descriptions
carrierBandwidthDL
BW of the LTE carrier in number ofPRBs (see TS 38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause 5.1.4.2).
v-Shift
Shifting value v-shift in LTE to rate match around LTE CRS (see TS 38.214 [19], clause 5.1.4.2).
```

PDSCH: Related to Frequency Resource Allocation

FIG. 13 illustrates frequency axis resource allocation of a physical downlink shared channel (PDSCH) in a wireless communication system according to an embodiment of the disclosure.

FIG. 13 illustrates three frequency axis resource allocation methods of type 0 1300, type 1 1305, and dynamic switch 1310 which can be configured through a higher layer in an NR wireless communication system.

Referring to FIG. 13, when the UE is configured to use only resource type 0 through higher-layer signaling as indicated by reference numeral 1300, some pieces of downlink control information (DCI) for allocating the PDSCH to the corresponding UE includes a bitmap of $N_{RBG}$ bits. A condition therefor is described again later. At this time, $N_{RBG}$ is the number of resource block groups (RBGs) determined as shown in Table 19 below according to a BWP size allocated by a BWP indicator and a higher-layer parameter rbg-Size, and data is transmitted in an RBG indicated as 1 by the bitmap.

TABLE 19

| Bandwidth Part Size | Configuration 1 | Configuration 2 |
|---|---|---|
| 1-36 | 2 | 4 |
| 37-72 | 4 | 8 |
| 73-144 | 6 | 16 |
| 145-275 | 8 | 16 |

When the UE is configured to use only resource type 1 through higher-layer signaling as indicated by reference numeral 1305, some pieces of DCI for allocating the PDSCH to the corresponding UE may contain frequency axis resource allocation information including $$\lceil \log_2(N_{RB}^{DL,BWP}(N_{RB}^{DL,BWP} + 1)2) \rceil$$

-ary bits. A condition therefor is described again later. The BS may configure a starting VRB 1320 and a length 1325 of frequency axis resources allocated successively therefrom.

When the UE is configured to use both resource type 0 and resource type 1 through higher-layer signaling as indicated by reference numeral 1310, some pieces of DCI for allocating the PDSCH to the corresponding UE includes frequency axis resource allocation information of bits of a larger value 1335 among payload 1315 for configuring resource type 0 and payload 1320 and 1325 for configuring resource type 1. A condition therefor is described again later. At this time, one bit may be added to the first part (MSB) of the frequency axis resource allocation information within the DCI, and the use of resource type 0 may be indicated when the corresponding bit is "0" and the use of resource type 1 may be indicated when the corresponding bit is "1".

PDSCH/PUSCH: Related to Time Resource Allocation

Hereinafter, a time domain resource allocation method for a data channel in the next-generation mobile communication system (5G or NR system) is described.

The BS may configure a table for time domain resource allocation information for a downlink data channel (physical downlink shared channel (PDSCH)) and an uplink data channel (physical uplink shared channel (PUSCH)) in the terminal through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. In an embodiment, the time domain resource allocation information may include PDCCH-to-PDSCH slot timing (corresponding to a time interval in units of slots between a time point at which a PDCCH is received and a time point at which a PDSCH scheduled by the received PDCCH is transmitted, and indicated by K0) or PDCCH-to-PUSCH slot timing (corresponding to a time interval in units of slots between a time point at which a PDCCH is received and a time point at which a PUSCH scheduled by the received PDCCH is transmitted, and indicated by K2), a location and a length of a start symbol in which a PDSCH or a PUSCH is scheduled within the slot, a mapping type of a PDSCH or a PUSCH, and the like. For example, information shown in Table 20 or Table 21 below may be transmitted from the BS to the UE. Of course, the disclosure is not limited to the example.

TABLE 20

```
PUSCH-TimeDomainResourceAllocation information element
-- ASN1START
-- TAG-PUSCH-TIMEDOMAINRESOURCEALLOCATIONLIST-START
PUSCH-TimeDomainResourceAllocationList    ::= SEQUENCE (SIZE(1.. maxN
rofDL-Allocations ) ) OF PUSCH-TimeDomainResourceAllocation
```

TABLE 20-continued

```
PUSCH-TimeDomainResourceAllocation       ::= SEQUENCE {
    k0                                          INTEGER(0..32)
                                                OPTIONAL, -- Need S
    mappingType                                 ENUMERATED {typeA, type
B},
    startSymbolAndLength                        INTEGER (0..127)
}
```

TABLE 21

```
PUSCH-TimeDomainResourceAllocation information element
-- ASN1START
-- TAG-PUSCH-TIMEDOMAINRESOURCEALLOCATIONLIST-START
PUSCH-TimeDomainResourceAllocationList    ::= SEQUENCE (SIZE(1.. maxN
rofUL-Allocations ) ) OF PUSCH-TimeDomainResourceAllocation
PUSCH-TimeDomainResourceAllocation        ::= SEQUENCE { type
    k2                                          INTEGER(0..32)
                                                OPTIONAL, -- Need S
    mappingType                                 ENUMERATED {typeA, type
B},
    startSymbolAndLength                        INTEGER (0..127)
}
```

The BS may inform the UE of one of the entries in the table for the time domain resource allocation information through L1 signaling (for example, DCI) (for example, indicated through a 'time domain resource allocation' field within DCI). The UE may acquire time domain resource allocation information for a PDSCH or a PUSCH based on the DCI received from the BS.

FIG. 14 illustrates time axis resource allocation of a PDSCH in a wireless communication system according to an embodiment of the disclosure.

Referring to FIG. 14, the BS may indicate a time axis location of PDSCH resources according to subcarrier spacing (SCS) ($\mu_{PDSCH}$, $\mu_{PDCCH}$) of a data channel and a control channel configured using a higher layer, a scheduling offset (K0) value, and an OFDM symbol start location 1400 and length 1405 within one slot dynamically indicated through DCI.

FIG. 15 illustrates time axis resource allocation according to subcarrier spacing of a data channel and a control channel in a wireless communication system according to an embodiment of the disclosure.

Referring to FIG. 15, when subcarrier spacings of a data channel and a control channel are the same as each other ($\mu_{PDSCH}=\mu_{PDCCH}$) as indicated by reference numeral 1500, slot numbers for the data and the control are the same as each other, and thus the BS and the UE may generate a scheduling offset according to a predetermined slot offset K0. On the other hand, when subcarrier spacings of a data channel and a control channel are different from each other ($\mu_{PDSCH}\neq\mu_{PDCCH}$) as indicated by reference numeral 1505-05, slot numbers for the data and the control are different from each other, and thus the BS and the UE may generate a scheduling offset according to a predetermined slot offset K0 based on subcarrier spacing of the PDCCH.

PDSCH: Processing Time

Subsequently, a PDSCH processing time (PDSCH processing procedure time) is described. When the BS schedules to transmit a PDSCH to the UE through DCI format 1_0 1_1, or 1_2, the UE may need a PDSCH processing time for receiving the PDSCH by applying a transmission method indicated through DCI (modulation/demodulation and coding indication index (MCS), demodulation reference signal-related information, and time and frequency resource allocation information). In NR, a PDSCH processing time is defined in consideration thereof. The PDSCH processing time of the UE may follow Equation 3 below.

$$T_{proc,1} = (N_1 + d_{1,1} + d_2)(2048 + 144)k2^{-\mu}T_c + T_{ext} \qquad \text{Equation 3}$$

In $T_{proc,1}$ of Equation 3, respective parameters may have meanings described below.

$N_1$: the number of symbols determined according to UE processing capability 1 or 2 based on a UE capability and numerology μ. $N_1$ may have a value in Table 22 when UE processing capability 1 is reported according to a UE capability report and may have a value in Table 23 when UE processing capability 2 is reported and information indicating that UE processing capability 2 can be used is configured through higher-layer signaling. The numerology μ may correspond to a minimum value among $\mu_{PDCCH}$, $\mu_{PDSCH}$, and $\mu_{UL}$ to maximize, and $\mu_{PDCCH}$, $\mu_{PDSCH}$, and $\mu_{UL}$ may be numerology of a PDCCH scheduling a PDSCH, numerology of a scheduled PDSCH, and numerology of an uplink channel to transmit HARQ-ACK, respectively.

TABLE 22

| | PDSCH processing time in PDSCH processing capability 1 | |
|---|---|---|
| | PDSCH decoding time $N_1$ [symbols] | |
| $\mu$ | Both of PDSCH mapping type A and B are dmrs-AdditionalPosition = pos0 included in high layer signaling DMRS-DownlinkConfig | Both of PDSCH mapping type A and B are not dmrs-AdditionalPosition = pos0 included in high layer signaling DMRS-DownlinkConfig or high layer parameter is not configured |
| 0 | 8 | $N_{1,0}$ |
| 1 | 10 | 13 |
| 2 | 17 | 20 |
| 3 | 20 | 24 |

TABLE 23

| $\mu$ | PDSCH decoding time $N_1$ [symbols] Both of PDSCH mapping type A and B are dmrs-AdditionalPosition = pos0 included in high layer signaling DMRS-DownlinkConfig |
|---|---|
| 0 | 3 |
| 1 | 4.5 |
| 2 | 9 for frequency range 1 | k: 64

$T_{ext}$: the UE may calculate $T_{ext}$ and apply the same to a PDSCH processing time when the UE uses a shared spectrum channel access scheme. Otherwise, it may be assumed that $T_{ext}$ is 0.

When $l_1$ indicating a location value of a PDSCH DMRS is 12, N1,0 has a value of 14 and, otherwise, has a value of 13.

When the last symbol of the PDSCH is an $i^{th}$ symbol in a slot for transmitting the PDSCH and i<7 for PDSCH mapping type A, $d_{1,1}$ is 7-i and, otherwise, $d_{1,1}$ is 0.

$d_2$: $d_2$ of a PUCCH having a high priority index may be configured as a value reported from the UE when the PUCCH having the high priority index and a PUCCH or PUSCH having a low priority index overlap in the time. Otherwise, $d_2$ is 0.

$d_{1,1}$ may be determined according to the number L of symbols of the scheduled PDSCH and the number d of overlapping symbols between the PDCCH scheduling the PDSCH and the scheduled PDSCH as described below when PDSCH mapping type B is used for UE processing capability 1.

If L≥7, $d_{1,1}$=0.

If L≥4 and L≤6, $d_{1,1}$=7-L.

If L=3, $d_{1,1}$=min(d, 1).

If L=2, $d_{1,1}$=3+d.

$d_{1,1}$ may be determined according to the number L of symbols of the scheduled PDSCH and the number d of overlapping symbols between the PDCCH scheduling the PDSCH and the scheduled PDSCH as described below when PDSCH mapping type B is used for UE processing capability 2.

If L≥7, $d_{1,1}$=0.

If L≥4 and L≤6, $d_{1,1}$=7-L.

In the case of L=2,

If the PDCCH performing scheduling exists within a CORESET including 3 symbols and the corresponding CORESET and the scheduled PDSCH have the same start symbol, $d_{1,1}$=3.

Otherwise, $d_{1,1}$=d.

A UE supporting capability 2 within a given serving cell may apply a PDSCH processing time according to UE processing capability 2 when processingType2Enabled that is higher-layer signaling is configured as enable for the corresponding cell.

When a location of a first uplink transmission symbol of a PUCCH including HARQ-ACK information (the corresponding location may consider K1-defined as a transmission time point of HARQ-ACK, PUCCH resources used for HARQ-ACK transmission, and a timing advance effect) does not start earlier than a first uplink transmission symbol appearing after a time of $T_{proc,1}$ from a last symbol of a PDSCH, the UE should transmit a valid HARQ-ACK message. For example, the UE should transmit the PUCCH including HARQ-ACK only when the PDSCH processing time is sufficient. Otherwise, the UE cannot provide the BS with valid HARQ-ACK information corresponding to the scheduled PDSCH. $T_{proc,1}$ may be used for all of the normal or expanded CP. When the number of PDSCH transmission locations within one slot is 2, $d_{1,1}$ may be calculated based on the first PDSCH transmission location within the corresponding slot.

PDSCH: Reception Preparation Time in Cross-Carrier Scheduling

Hereinafter, in the case of cross-carrier scheduling in which numerology $\mu_{PDCCH}$ for transmitting the PDCCH performing scheduling and numerology $\mu_{PDSCH}$ for transmitting the PDSCH scheduling the corresponding PDCCH are different from each other, a PDSCH reception preparation time $N_{pdsch}$ of the UE defined for a time interval between the PDCCH and the PDSCH is described.

When $\mu_{PDCCH}<\mu_{PDSCH}$, the scheduled PDSCH cannot be transmitted earlier than the first symbol of the slot existing after $N_{pdsch}$ symbols from the last symbol of the PDCCH scheduling the corresponding PDSCH. Transmission symbols of the corresponding PDSCH may include a DM-RS.

When $\mu_{PDCCH}>\mu_{PDSCH}$, the scheduled PDSCH may be transmitted after $N_{pdsch}$ symbols from the last symbol of the PDCCH scheduling the corresponding PDSCH. Transmission symbols of the corresponding PDSCH may include a DM-RS.

TABLE 24

| $N_{pdsch}$ according to scheduled PDCCH subcarrier spacing | |
|---|---|
| $\mu_{PDCCH}$ | $N_{pdsch}$ [symbols] |
| 0 | 4 |
| 1 | 5 |

TABLE 24-continued

| $N_{pdsch}$ according to scheduled PDCCH subcarrier spacing | |
| --- | --- |
| $\mu_{PDCCH}$ | $N_{pdsch}$ [symbols] |
| 2 | 10 |
| 3 | 14 |

PDSCH: TCI State Activation MAC-CE

Subsequently, a beam configuration method for a PDSCH is described.

FIG. 16 illustrates a process for beam configuration and activation of the PDSCH according to an embodiment of the disclosure.

Referring to FIG. 16, a list of TCI states 1600, 1620, 1640, 1650, and 1655 for the PDSCH may be indicated though a higher layer list, such as RRC as indicated by reference numeral 16-00. The T state list may be indicated, for example, as tci-StateosToAddModList and/or tci-States-ToReleaseList within a PDSCH-Config for each BWP. Subsequently, some of the TCI states in the TCI state list may be activated though a MAC-CE as indicated by reference numeral 16-20. The maximum number of activated TCI states may be determined according to a capability reported by the UE. Reference numeral 16-50 shows an example of a MAC-CE format for PDSCH TCI state activation/deactivation.

The meaning of each field within the MAC CE and a value configurable in each field are as described below.

---

Serving Cell ID : This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
BWP ID : This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells;
$T_i$ (TCI state identifier): If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e., the first TCI State with $T_i$ field set to 1 shall be mapped to the codepoint value 0, second TCI State with Ti field set to 1 shall be mapped to the codepoint value 1 and so on. The maximum number of activated TCI states is 8;
CORESET Pool ID : This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall ignore the CORESET Pool ID field in this MAC CE when receiving the MAC CE. If the Serving Cell in the MAC CE is configured in a cell list that contains more than one Serving Cell, the CORESET Pool ID field shall be ignored when receiving the MAC CE.

---

Related to SRS

Subsequently, a method of estimating an uplink channel using sounding reference signal (SRS) transmission by the UE is described. The BS may configure at least one SRS configuration in every uplink BWP and configure at least one SRS resource set in every SRS configuration in order to transmit configuration information for SRS transmission. For example, the BS and the UE may exchange higher-layer signaling information below in order to transmit information related to an SRS resource set.

srs-ResourceSetId: SRS resource set index
srs-ResourceIdList: set of SRS resource indexes referred to by SRS resource set
resourceType: indicates a time-axis transmission configuration of SRS resources referred to by an SRS resource set and is configured as one of 'periodic', 'semi-persistent', and 'aperiodic'. When 'periodic' or 'semi-persistent' is configured, associated CSI-RS information may be provided according to a used place of the SRS resource set. When 'aperiodic' is configured, an aperiodic SRS resource trigger list and slot offset information may be provided and associated CSI-RS information may be provided according to a used place of the SRS resource set.
usage: indicates a configuration for a used place of SRS resources referred to by the SRS resource set and is configured as one of 'beamManagement', 'codebook', 'nonCodebook', and 'antennaSwitching'.
alpha, p0, pathlossReferenceRS, srs-PowerControlAdjustmentStates: provides a parameter configuration for controlling transmission power of SRS resources referred to by the SRS resource set.

The UE may understand that SRS resources included in the set of SRS resource indexes referred to by the SRS resource set follow information configured in the SRS resource set.

Further, the BS and the UE may transmit and receive high-layer signaling information in order to transmit individual configuration information for SRS resources. For example, the individual configuration information for SRS resources may include time-frequency axis mapping information within the slot of SRS resources, which may include information on intra-slot or inter-slot frequency hopping of SRS resources. Further, the individual configuration information for SRS resources may include a time-axis transmission configuration of SRS resources and may be configured as one of 'periodic', 'semi-persistent', and 'aperiodic'. This may be limited to have the time-axis transmission configuration, such as the SRS resources set including SRS resources. When the time-axis transmission configuration of SRS resources is configured as 'periodic' or 'semi-persistent', an SRS resource transmission period and a slot offset (for example, periodicityAndOffset) may be additionally configured in the time-axis transmission configuration.

The BS may activate, deactivate, or trigger SRS transmission to the UE through higher-layer signaling including RRC signaling or MAC CE signaling or L1 signaling (for example, DCI). For example, the BS may activate or deactivate periodic SRS transmission to the UE through higher-layer signaling. The BS may indicate activation of an SRS resource set having a resourceType configured as periodic through higher-layer signaling, and the UE may transmit SRS resources referred to by the activated SRS resource set. Time-frequency axis resource mapping within the slot of the transmitted SRS resources follows resource mapping information configured in the SRS resources, and slot mapping including the transmission period and the slot offset follows a periodicityAndOffset configured in the SRS resources. Further, a spatial domain transmission filter applied to the transmission SRS resources may refer to spatial relation info configured in the SRS resources or refer to associated CSI-RS information configured in the SRS resource set including the SRS resources. The UE may transmit SRS resources within an uplink BWP activated for activated semi-persistent SRS resources through higher-layer signaling.

For example, the BS may activate or deactivate semi-persistent SRS transmission to the UE through high-layer signaling. The BS may indicate activation of the SRS resource set through MAC CE signaling, and the UE may transmit SRS resources referred to by the activated SRS resource set. The SRS resource set activated through MAC CE signaling may be limited to an SRS resource set having the resourceType configured as semi-persistent. Time-frequency axis resource mapping within the slot of the transmitted SRS resources follows resource mapping information configured in the SRS resources, and slot mapping including the transmission period and the slot offset follows a periodicityAndOffset configured in the SRS resources.

Further, a spatial domain transmission filter applied to the transmission SRS resources may refer to spatial relation info configured in the SRS resources or refer to associated CSI-RS information configured in the SRS resource set including the SRS resources. When spatial relation info is configured in the SRS resources, a spatial domain transmission filter may be determined with reference to configuration information for spatial relation info transmitted through MAC CE signaling activating semi-persistent SRS transmission without following the spatial relation info. The UE may transmit SRS resources within an uplink BWP activated for activated semi-persistent SRS resources through higher-layer signaling.

For example, the BS may trigger aperiodic SRS transmission to the UE through DCI. The BS may indicate one of the aperiodic SRS resource triggers (aperiodicSRS-ResourceTrigger) through an SRS request field of DCI. The UE may understand that an SRS resource set including the aperiodic SRS resource trigger indicated through DCI in an aperiodic SRS resource trigger list among SRS resource set configuration information is triggered. The UE may transmit the SRS resources referred to by the triggered SRS resource set. Time-frequency axis resource mapping within the slot of the transmitted SRS resources follows resource mapping information configured in the SRS resources. Further, slot mapping of the transmitted SRS resources may be determined through a slot offset between a PDCCH including DCI and the SRS resources, which may refer to a value(s) included in a slot offset set configured in the SRS resource set.

Specifically, the slot offset between the PDCCH including DCI and the SRS resources may apply a value indicated by a time domain resource assignment field of DCI among an offset value(s) included in the slot offset set configured in the SRS resource set. Further, a spatial domain transmission filter applied to the transmission SRS resources may refer to spatial relation info configured in the SRS resources or refer to associated CSI-RS information configured in the SRS resource set including the SRS resources. The UE may transmit SRS resources within an uplink BWP activated for triggered aperiodic SRS resources through DCI.

When the BS triggers aperiodic SRS transmission to the UE through DCI, the UE may need a minimum time interval between the PDCCH including DCI for triggering aperiodic SRS transmission and the transmitted SRS in order to transmit the SRS through the application of configuration information for SRS resource. The time interval for SRS transmission by the UE may be defined as the number of symbols between the last symbol of the PDCCH including DCI for triggering aperiodic SRS transmission and the first symbol to which the SRS resource that is first transmitted among the transmitted SRS resource(s) is mapped. The minimum time interval may be defined with reference to a PUSCH preparation procedure time required for preparing PUSCH transmission by the UE. Further, the minimum time interval may have different values according to a used place of the SRS resource set including the transmitted SRS resource. For example, the minimum time interval may be defined as N2 symbols defined based on the UE processing capability according to the UE capability with reference to the PUSCH preparation procedure of the UE. Further, the minimum time interval may be determined as N2 symbols when the used place of the SRS resource set is configured as 'codebook' or 'antennaSwitching' based on the used place of the SRS resource set including the transmitted SRS resource, and may be determined as N2+14 symbols when the used place of the SRS resource set is configured as 'nonCodebook' or 'beamManagement'. The UE may perform aperiodic SRS transmission when the time interval for aperiodic SRS transmission is longer than or equal to the minimum time interval, and may ignore DCI for triggering the aperiodic SRS when the time interval for aperiodic SRS transmission is shorter than the minimum time interval.

TABLE 25

| SRS-Resource ::= | SEQUENCE { | |
|---|---|---|
| srs-ResourceId | SRS-ResourceId, | |
| nrofSRS-Ports | ENUMERATED {port1, ports2, ports4}, | |
| ptrs-PortIndex | ENUMERATED {n0, n1 } | OPTIONAL, - |
| - Need R | | |
| transmissionComb | CHOICE { | |
| n2 | SEQUENCE { | |
| combOffset-n2 | INTEGER (0..1), | |

TABLE 25-continued

```
        cyclicShift-n2                    INTEGER (0..7)
    },
    n4                      SEQUENCE {
        combOffset-n4                        INTEGER (0..3),
        cyclicShift-n4                       INTEGER (0..11)
    }
},
resourceMapping                     SEQUENCE {
    startPosition                   INTEGER (0..5),
    nrofSymbols                        ENUMERATED {n1, n2, n4},
    repetitionFactor                   ENUMERATED {n1, n2, n4}
},
freqDomainPosition                  INTEGER (0..67),
freqDomainShift                     INTEGER (0..268),
freqHopping                     SEQUENCE {
    c-SRS                       INTEGER (0..63),
    b-SRS                       INTEGER (0..3),
    b-hop                       INTEGER (0..33)
},
groupOrSequenceHopping                          ENUMERATED { neither, groupHopping,
sequenceHopping },
resourceType                CHOICE {
    aperiodic                   SEQUENCE {
        ...
    },
    semi-persistent                     SEQUENCE {
        periodicityAndOffset-sp                 SRS-PeriodicityAndOffset,
        ...
    },
    periodic                SEQUENCE {
        periodicityAndOffset-p                  SRS-PeriodicityAndOffset,
        ...
    }
},
sequenceId                  INTEGER (0..1023),
spatialRelationInfo                     SRS -SpatialRelationInfo          OPTIONAL, --
Need R
    ...
}
```

35

In Table 25, spatialRelationInfo configuration information may be applied to a beam used for corresponding SRS transmission of beam information of the corresponding reference signal with reference to one reference signal. For example, the configuration of spatialRelationInfo may include information shown in Table 26 below. Of course, the disclosure is not limited to the following examples.

TABLE 26

```
SRS-SpatialRelationInfo ::=     SEQUENCE {
    servingCellId               ServCellIndex    OPTIONAL, -- Need S
    referenceSignal             CHOICE {
        ssb-Index               SSB-Index,
        csi-RS-Index            NZP-CSI-RS-ResourceId,
        srs                 SEQUENCE {
            resourceId              SRS-ResourceId,
            uplinkBWP               BWP-Id
        }
    }
}
```

Referring to the spatialRelationInfo configuration, the UE may receive a configuration of an SS/PBCH block index, a CSI-RS index, or an SRS index from the BS as an index of a reference signal to be referred to for using beam information of a specific reference signal. Higher-layer signaling referenceSignal is configuration information indicating a reference signal of which beam information is referred to for corresponding SRS transmission, ssb-Index is an index of an SS/PBCH block, csi-RS-Index is an index of a CSI-RS, and srs is an index of an SRS. When a value of higher-layer signaling referenceSignal is configured as 'ssb-Index', the UE may apply a reception beam used for receiving the CSI-RS corresponding to ssb-Index as a transmission beam of the corresponding SRS transmission. When a value of higher-layer signaling referenceSignal is configured as 'csi-RS-Index', the UE may apply a reception beam used for receiving the CSI-RS corresponding to csi-RS-Index as a transmission beam of the corresponding SRS transmission. When a value of higher-layer signaling referenceSignal is configured as 'srs', the UE may apply a reception beam used for receiving the SRS corresponding to srs as a transmission beam of the corresponding SRS transmission.

PUSCH: Related to Transmission Scheme

Subsequently, a scheduling scheme of PUSCH transmission is described. PUSCH transmission may be dynamically scheduled by a UL grant within DCI or may operate by configured grant Type 1 or Type 2. The dynamic scheduling indication for PUSCH transmission may be provided through DCI format 0_0 or 0_1.

Configured grant Type 1 PUSCH transmission may be semi-statically configured through reception of configuredGrantConfig including rrc-ConfiguredUplinkGrant in Table 27 through higher-layer signaling without reception of a UL grant within DCI. Configured grant Type 2 PUSCH transmission may be semi-persistently scheduled by a UL grant within DCI after reception of configuredGrantConfig which does not include rrc-ConfiguredUplinkGrant in Table 27 through higher-layer signaling. When PUSCH transmission operates by a configured grant, parameters applied to PUSCH transmission may be applied through configuredGrantConfig which is higher-layer signaling of Table 27 except for dataScramblingIdentityPUSCH, txConfig, codebookSubset, maxRank, and scaling of UCI-OnPUSCH provided as pusch-Config of Table 28 which is higher-layer signaling. When the UE receives transformPrecoder within configuredGrantConfig which is higher-layer signaling of Table 27, the UE may apply tp-pi2BPSK within pusch-Config of Table 28 to PUSCH transmission operating by the configured grant. Of course, the disclosure is not limited to the example.

As described above, PUSCH transmission may be dynamically scheduled through DCI format 0_0 or 0_1 or semi-statically configured by the configured grant. When the UE receives an indication of scheduling of PUSCH transmission through DCI format 0_0, the UE performs a beam configuration for PUSCH transmission by using pucch-spatialRelationInfoID corresponding to a UE-specific PUCCH resource corresponding to a minimum ID within the

TABLE 27

```
ConfiguredGrantConfig ::=                SEQUENCE {
    frequencyHopping                                              ENUMERATED {intraSlot, interSlot}
OPTIONAL, -- Need S,
    cg-DMRS-Configuration            DMRS-UplinkConfig,
    mcs-Table                                            ENUMERATED {qam256, qam64LowSE}
OPTIONAL, -- Need S
    mcs-TableTransformPrecoder                       ENUMERATED {qam256, qam64LowSE}
OPTIONAL, -- Need S
    uci-OnPUSCH              SetupRelease {CG-UCI-OnPUSCH}              OPTIONAL,
-- Need M
    resourceAllocation                                   ENUMERATED { resourceAllocationType0,
resourceAllocationType1, dynamicSwitch },
    rbg-Size                 ENUMERATED {config2}                      OPTIONAL,
-- Need S
    powerControlLoopToUse                   ENUMERATED {n0, n1},
    p0-PUSCH-Alpha                          P0-PUSCH-AlphaSetId,
    transformPrecoder                       ENUMERATED {enabled, disabled}        OPTIONAL,
-- Need S
    nrofHARQ-Processes                      INTEGER(1..16),
    repK                          ENUMERATED {n1, n2, n4, n8},
    repK-RV                                       ENUMERATED {s1-0231, s2-0303, s3-0000}
OPTIONAL, -- Need R
    periodicity                   ENUMERATED {
                         sym2, sym7, sym1x14, sym2x14, sym4x14, sym5x14, sym8x14,
sym10x14, sym16x14, sym20x14,
                         sym32x14, sym40x14, sym64x14, sym80x14,sym 128x14,
sym160x14, sym256x14, sym320x14, sym512x14,
                         sym640x14, sym1024x14, sym1280x14, sym2560x14, sym5120x14,
                         sym6, sym1x12, sym2x12, sym4x12, sym5x12, sym8x12, sym 10x12,
sym16x12, sym20x12, sym32x12,
                         sym40x12, sym64x12, sym80x12, sym128x12, sym160x12,
sym256x12, sym320x12, sym512x12, sym640x12,
                         sym 1280x12, sym2560x12
    },
    configuredGrantTimer                    INTEGER (1..64)                       OPTIONAL,
-- Need R
    rrc-ConfiguredUplinkGrant                SEQUENCE {
       timeDomainOffset                      INTEGER (0..5119),
       timeDomainAllocation                   INTEGER (0..15),
       frequencyDomainAllocation              BIT STRING (SIZE(18)),
       antennaPort                  INTEGER (0..31),
       dmrs-SeqInitialization                 INTEGER (0..1)                     OPTIONAL,
-- Need R
       precodingAndNumberOfLayers                INTEGER (0..63),
       srs-ResourceIndicator                 INTEGER (0..15)                     OPTIONAL,
-- Need R
       mcsAndTBS                    INTEGER (0..31),
       frequencyHoppingOffset                      INTEGER (1.. maxNrofPhysicalResourceBlocks-1)
OPTIONAL, -- Need R
       pathlossReferenceIndex                      INTEGER (0..maxNrofPUSCH-PathlossReferenceRSs-1),
       ...
    }                                                    OPTIONAL, -- Need R
    ...
}
```

Subsequently, a PUSCH transmission method is described. A DMRS antenna port for PUSCH transmission is the same as an antenna port for SRS transmission. PUSCH transmission may follow each of a codebook-based transmission method and a non-codebook-based transmission method according to whether a value of txConfig within pusch-Config of Table 28 which is higher-layer signaling is 'codebook' or 'nonCodebook'.

activated uplink BWP in the serving cell in which case the PUSCH transmission is based on a single antenna port. The UE does not expect scheduling of PUSCH transmission through DC format 0_0 within a BWP in which the PUCCH resource including pucch-spatialRelationInfo is not configured. When the UE does not receive a configuration of txConfig within pusch-Config of Table 28, the UE does not expect reception of scheduling through DCI format 0_1.

TABLE 28

```
PUSCH-Config ::=                              SEQUENCE {
    dataScramblingIdentityPUSCH                  INTEGER (0..1023)                OPTIONAL,
-- Need S
    txConfig                                         ENUMERATED {codebook, nonCodebook}
OPTIONAL, -- Need S
    dmrs-UplinkForPUSCH-MappingTypeA                  SetupRelease { DMRS-UplinkConfig }
OPTIONAL, -- Need M
    dmrs-UplinkForPUSCH-MappingTypeB                  SetupRelease { DMRS-UplinkConfig }
OPTIONAL, -- Need M
    pusch-PowerControl                       PUSCH-PowerControl                  OPTIONAL,
-- Need M
    frequencyHopping                                 ENUMERATED {intraSlot, interSlot}
OPTIONAL, -- Need S
    frequencyHoppingOffsetLists                SEQUENCE (SIZE (1..4)) OF INTEGER (1..
maxNrofPhysicalResourceBlocks-1)
                                                                        OPTIONAL, -- Need M
    resourceAllocation                          ENUMERATED { resourceAllocationType0,
resourceAllocationType1, dynamicSwitch},
    pusch-TimeDomainAllocationList                        SetupRelease { PUSCH-
TimeDomainResourceAllocationList }          OPTIONAL, -- Need M
    pusch-AggregationFactor                           ENUMERATED { n2, n4, n8 }
OPTIONAL, -- Need S
    mcs-Table                                    ENUMERATED {qam256, qam64LowSE}
OPTIONAL, -- Need S
    mcs-TableTransformPrecoder                   ENUMERATED {qam256, qam64LowSE}
OPTIONAL, -- Need S
    transformPrecoder                              ENUMERATED {enabled, disabled}
OPTIONAL, -- Need S
    codebookSubset                          ENUMERATED {fullyAndPartialAndNonCoherent,
partialAndNonCoherent,noncoherent}
                                                             OPTIONAL, -- Cond
codebookBased
    maxRank                         INTEGER (1..4)                   OPTIONAL, -- Cond
codebookBased
    rbg-Size                         ENUMERATED { config2}            OPTIONAL, --
Need S
    uci-OnPUSCH                          SetupRelease {UCI-OnPUSCH}          OPTIONAL,
-- Need M
    tp-pi2BPSK                           ENUMERATED {enabled}               OPTIONAL,
-- Need S
    ...
}
```

Subsequently, codebook-based PUSCH transmission is described. Codebook-based PUSCH transmission may be dynamically scheduled through DCI format 0_0 or 0_1 or semi-statically operate by the configured grant. When codebook-based PUSCH is dynamically scheduled by DCI format 0_1 or is semi-statically configured by the configured grant, the UE may determine a precoder for PUSCH transmission based on an SRS resource indicator (SRI), a transmission precoding matrix indicator (TPMI), and a transmission rank (the number of PUSCH transmission layers).

At this time, the SRI may be given through an SRS resource indicator field within DCI or may be configured through srs-ResourceIndicator which is higher-layer signaling. In codebook-based PUSCH transmission, the UE may receive a configuration of at least one SRS resource and a maximum of two SRS resources. When the UE receives the SRI through DCI, the SRS resource indicated by the corresponding SRI is the SRS resource corresponding to the SRI among SRS resources transmitted earlier than the PDCCH including the corresponding SRI. Further, the TPMI and the transmission rank may be given through field information and number of layers within DCI or may be configured through precodingAndNumberOfLayers which is higher-layer signaling. The TPMI may be used to indicate a precoder applied to PUSCH transmission. If the UE receives a configuration of one SRS resource, the TPMI may be used to indicate a precoder to be applied to the one configured SRS resource. If the UE received a configuration of a plurality of SRS resources, the TPMI may be used to indicate a precoder to be applied to SRS resources indicated through the SRI.

The precoder to be used for PUSCH transmission may be selected from an uplink codebook having the number of antenna ports which is the same as a value of nrofSRS-Ports within SRS-Config which is higher-layer signaling. In codebook-based PUSCH transmission, the UE may determine a codebook subset based on the TPMI and a codebookSubset within pusch-Config which is higher-layer signaling. The codebookSubset within pusch-Config which is higher-layer signaling may be configured as one of 'fullyAndPartialAndNonCoherent', 'partialAndNonCoherent', or 'nonCoherent' based on the UE capability which the UE reports to the BS. If the UE reports 'partialAndNonCoherent' as the UE capability, the UE may not expect a configuration of the value of the codebookSubset which is higher-layer signaling as 'fullyAndPartialAndNonCoherent'. Further, if the UE reports 'nonCoherent' as the UE capability, the UE may not expect a configuration of the value of the codebookSubset which is higher-layer signaling as 'fullyAndPartialAndNonCoherent' or 'partialAndNonCoherent'. When nrofSRS-Ports within SRS-ResourceSet which is higher-layer signaling indicate two SRS antenna ports, the UE may not expect a configuration of the value of the codebookSubset which is higher-layer signaling as 'partialAndNonCoherent'.

The UE may receive a configuration of one SRS resource set having a value of usage within SRS-ResourceSet which is higher-layer signaling configured as 'codebook', and one SRS resource may be indicated through the SRI within the corresponding SRS resource set. If several SRS resources are configured within the SRS resource set having a usage value within SRS-ResourceSet, which is higher-layer signaling, configured as 'codebook', the UE may expect a configuration of the same value of nrofSRS-Ports within the SRS-Resource which is higher-layer signaling for all SRS resources.

The UE may transmit one or a plurality of SRS resources included in the SRS resource set having the value of usage configured as 'codebook' to the BS according to higher-layer signaling, and the BS may select one of the SRS resources transmitted by the UE and instruct the UE to perform PUSCH transmission by using transmission beam information of the corresponding SRS resource. At this time, in codebook-based PUSCH transmission, the SRI may be used as information for selecting an index of one SRS resource and may be included in DCI. In addition, the BS may insert information indicating the TPMI and the rank to be used for PUSCH transmission by the UE into DCI. The UE may perform PUSCH transmission by applying a precoder indicated by the rank and the TPMI indicated based on the transmission beam of the corresponding SRS resource using the SRS resource indicated by the SRI.

Subsequently, non-codebook-based PUSCH transmission is described. Non-codebook-based PUSCH transmission may be dynamically scheduled through DCI format 0_0 or 0_1 or semi-statically operate by the configured grant. When at least one SRS resource is configured within the SRS resource set having the value of usage configured as 'non-Codebook' within SRS-ResourceSet which is higher-layer signaling, the UE may receive scheduling of non-codebook-based PUSCH transmission through DCI format 0_1.

For the SRS resource set having the value of usage configured as 'nonCodebook' within SRS-ResourceSet which is higher-layer signaling, the UE may receive a configuration of one connected non-zero power CSI-RS (NZP CSI-RS). The UE may calculate a precoder for SRS transmission through measurement for the NZP CSI-RS resource connected to the SRS resource set. If a difference between the last reception symbol of the aperiodic NZP CSI-RS resource connected to the SRS resource set and the first symbol of aperiodic SRS transmission in the UE is smaller than 42 symbols, the UE may not expect an update of information on the precoder for SRS transmission.

When the value of resource Type within SRS-Resource-Set which is higher-layer signaling is configured as 'aperiodic', the connected NZP CSI-RS may be indicated by an SRS request which is a field within DCI format 0_1 or 1_1. At this time, when the connected NZP CSI-RS resource is an aperiodic NZP CSI-RS resource, the case in which the value of the SRS request field within DCI format 0_1 or 1_1 is not '00' may indicate the existence of the connected NZP CSI-RS. At this time, the corresponding DCI should not indicate cross carrier or cross BWP scheduling. Further, when the value of the SRS request indicates the existence of the NZP CSI-RS, the corresponding NZP CSI-RS may be located in a slot in which the PDCCH including the SRS request field is transmitted. At this time, TCI states configured in the scheduled subcarrier may not be configured as QCL-TypeD.

If the periodic or semi-persistent SRS resource set is configured, the connected NZP CSI-RS may be indicated through an associatedCSI-RS within SRS-ResourceSet which is higher-layer signaling. For non-codebook-based transmission, the UE may not expect configurations of both spatialRelationInfo which is higher layer signaling for the SRS resource and associatedCSI-RS within SRS-Resource-Set which is higher-layer signaling.

When the UE receives a configuration of a plurality of SRS resources, the UE may determine a precoder and a transmission rank to be applied to PUSCH transmission based on an SRI indicated by the BS. At this time, the SRI may be indicated through an SRS resource indicator field within DCI or may be configured through srs-ResourceIndicator which is higher-layer signaling. Like the codebook-based PUSCH transmission, when the UE receives the SRI through DCI, the SRS resource indicated by the corresponding SRI may be the SRS resource corresponding to the SRI among SRS resources transmitted earlier than the PDCCH including the corresponding SRI. The UE may use one or a plurality of SRS resources for SRS transmission, and the maximum number of SRS resources which can be simultaneously transmitted in the same symbol within one SRS resource set and the maximum number of SRS resources may be determined by the UE capability which the UE reports to the BS. At this time, SRS resources which the UE simultaneously transmits occupy the same RB. The UE configures one SRS port for each SRS resource. The number of SRS resource sets having the value of usage configured as 'nonCodebook' within SRS-ResourceSet which is higher-layer signaling is only one, and the maximum number of SRS resources for non-codebook-based PUSCH transmission can be 4.

The BS may transmit one NZP-CSI-RS connected to the SRS resource set, and the UE may calculate a precoder to be used for one or a plurality of SRS resource transmissions within the corresponding SRS resource set based on the measurement result when the corresponding NZP-CSI-RS is received. When transmitting one or a plurality of SRS resources within the SRS resource set having usage configured as 'nonCodebook' to the BS, the UE may apply the calculated precoder and the BS may select one or a plurality of SRS resources from among the one or plurality of received SRS resources. At this time, in non-codebook-based PUSCH transmission, the SRI indicates an index which may express one SRS resource or a combination of a plurality of SRS resources, and the SRI may be included in the DCI. The number of SRS resources indicated by the SRI transmitted by the BS may be the number of transmission layers of the PUSCH, and the UE may transmit the PUSCH by applying the precoder applied to SRS resources to each layer.

PUSCH: Preparation Process Time

Subsequently, a PUSCH preparation procedure time (PUSCH preparation procedure time) is described. When the BS schedules to transmit a PUSCH to the UE by using DCI format 0_0, 0_1, or 0_2, the UE may need a PUSCH preparation process time for transmitting a PUSCH by applying a transmission method (a transmission precoding method of SRS resources, the number of transmission layers, and a spatial domain transmission filter) indicated through DCI. In NR, the PUSCH preparation process time considering the same is defined. The PUSCH preparation process time of the UE may follow Equation 4 below.

$$T_{proc.2} = \max((N_2 + d_{2,1} + d_2)(2048 + 144) \qquad \text{Equation 4}$$
$$k2^{-\mu}T_c + T_{ext} + T_{switch}, d_{2,2})$$

In $T_{proc,2}$ described in Equation 4, each parameter may have the following meaning.

$N_2$: the number of symbols determined according to UE processing capability 1 or 2 based on a UE capability and numerology μ. $N_1$ may have a value in Table 29 when UE processing capability 1 is reported according to a UE capability report and may have a value in Table 30 when UE processing capability 2 is reported and information indicating that UE processing capability 2 can be used is configured through higher-layer signaling.

TABLE 29

| μ | PUSCH preparation time $N_2$ [symbols] |
|---|---|
| 0 | 10 |
| 1 | 12 |
| 2 | 23 |
| 3 | 36 |

TABLE 30

| μ | PUSCH preparation time $N_2$ [symbols] |
|---|---|
| 0 | 5 |
| 1 | 5.5 |
| 2 | 11 for frequency range 1 |

$d_{2,1}$: the number of symbols determined as 0 when all resource elements of a first OFDM symbol in PUSCH transmission include only DM-RSs and, otherwise, determined as 1.

k: 64

μ: This follows a value which more increases $T_{proc.2}$, among $μ_{DL}$ or $μ_{UL}$. $μ_{DL}$ indicates the numerology of the downlink transmitting the PDCCH including the DCI for scheduling the PUSCH, and $μ_{UL}$ indicates the numerology of the uplink transmitting the PUSCH.

$T_c$: This has $1/(\Delta f_{max} \cdot N_f)$, $\Delta f_{max} = 480 \cdot 10^3$ Hz, $N_f = 4096$.

$d_{2,2}$: follows a BWP switching time when DCI scheduling a PUSCH indicates BWP switching and, otherwise, has 0.

$d_2$: a value of $d_2$ of a PUSCH having a high priority index is used when OFDM symbols of the PUCCH, the PUSCH having the high priority index, and a PUCCH having a low priority index overlap in the time. Otherwise, $d_2$ is 0.

$T_{ext}$: the UE may calculate $T_{ext}$ and apply the same to a PUSCH processing time when the UE uses a shared spectrum channel access scheme. Otherwise, it is assumed that $T_{ext}$ is 0.

$T_{switch}$: it is assumed that $T_{switch}$ is a switching interval time when an uplink switching interval is triggered. Otherwise, it is assumed that $T_{switch}$ is 0.

Based on time axis resource mapping information of the PUSCH scheduled through DCI and an effect of uplink-downlink timing advance, the BS and the UE may determine that the PUSCH preparation process time is not sufficient when a first symbol of the PUSCH starts earlier than a first uplink symbol at which the CP starts after $T_{proc,2}$ from a last symbol of the PDCCH including the DCI scheduling the PUSCH. Otherwise, the BS and the UE determine that the PUSCH preparation process time is sufficient. The UE may transmit the PUSCH only when the PUSCH preparation process time is sufficient, and may ignore scheduling of the PUSCH when the PUSCH preparation process time is not sufficient.

PUSCH: Related to Repetitive Transmission

Hereinafter, repetitive transmission of an uplink data channel in a 5G system is described below. In the 5G system, two types, such as a PUSCH repetitive transmission type A and a PUSCH repetitive transmission type B are supported as the repetitive transmission method of the uplink data channel. The UE may receive a configuration of one of PUSCH repetitive transmission type A or B through higher-layer signaling.

PUSCH Repetitive Transmission Type A

As described above, the symbol length of the uplink data channel and the location of a start symbol may be determined through the time domain resource allocation method within one slot, and the BS may notify the UE of the number of repetitive transmissions through higher-layer signaling (for example, RRC signaling) or L1 signaling (for example, DCI).

The UE may repeatedly transmit uplink data channels having the configured same uplink data channel length and start symbol in successive slots based on the number of repetitive transmissions received from the BS. At this time, when slots which are configured as the downlink in the UE by the BS or one or more symbols among the symbols of the uplink data channel configured in the UE are configured as the downlink, the UE omits uplink data channel transmission but counts the number of repetitive transmissions of the uplink data channel.

PUSCH Repetitive Transmission Type B

As described above, the symbol length of the uplink data channel and the location of a start symbol may be determined through the time domain resource allocation method within one slot, and the BS may notify the UE of the number numberofrepetitions of repetitive transmissions through higher-layer signaling (for example, RRC signaling) or L1 signaling (for example, DCI).

First, nominal repetition of the uplink data channel is determined based on the start symbol and the length of the configured uplink data channel. A slot in which $n^{th}$ nominal repetition starts is given by $$K_s + \left\lfloor \frac{S + n \cdot L}{N_{symb}^{slot}} \right\rfloor$$

and a symbol starting in the slot is given by mod $$\left(S + n \cdot L, N_{symb}^{slot}\right)$$

A slot in which $n^{th}$ nominal repetition ends is given by $$K_s + \left\lfloor \frac{S + (n+1) \cdot L - 1}{N_{symb}^{slot}} \right\rfloor,$$

and a symbol ending in the slot is given by $$\mod\left(S + (n+1) \cdot L - 1, N_{symb}^{slot}\right).$$

Here, n=0, . . . , numberofrepetitions–1, S is a start symbol of a configured uplink data channel, and L is the symbol length of the configured uplink data channel. $K_s$ denotes the slot starting the PUSCH transmission, and $$N_{symb}^{slot}$$

denotes the number of symbols per slot.

The UE determines an invalid symbol for the PUSCH repetitive transmission type B. A symbol configured as the downlink by tdd-UL-DL-ConfigurationCommon or tdd-UL-DL-ConfigurationDedicated is determined as an invalid symbol for the PUSCH repetitive transmission type B. In addition, the invalid symbol may be configured in a higher-layer parameter (for example, InvalidSymbolPattern). The higher-layer parameter (for example, InvalidSymbolPattern) provides a symbol level bitmap over one or two slots to configure the invalid symbol. In the bitmap, 1 may indicate an invalid symbol. In addition, a period and a pattern of the bitmap may be configured through a higher-layer parameter (for example, periodicityAndPattern). When the higher-layer parameter (for example, InvalidSymbolPattern) is configured, the UE may apply an invalid symbol pattern if an InvalidSymbolPatternIndicatorForDCIFormat0_1 or InvalidSymbolPatternIndicatorForDCIFormat0_2 parameter indicates 1, or the UE may not apply the invalid symbol pattern if the parameter indicates 0. When the higher-layer parameter (for example, InvalidSymbolPattern) is configured and the InvalidSymbolPatternIndicator-ForDCIFormat0_1 or InvalidSymbolPatternIndicator-ForDCIFormat0_2 parameter is not configured, the UE applies the invalid symbol pattern.

After the invalid symbol is determined, for each nominal repetition, the UE may consider symbols except for the invalid symbol as valid symbols. When one or more valid symbols are included in each nominal repetition, the nominal repetition may include one or more actual repetitions. Each actual repetition may include successive sets of valid symbols which can be used for the PUSCH repetitive transmissions type B in one slot.

FIG. 17 illustrates a PUSCH repetitive transmission type B in a wireless communication system according to an embodiment of the disclosure.

The UE may receive a configuration of the start symbol S of the uplink data channel as 0, the length L of the uplink data channel as 14, and the number of repetitive transmissions as 16. In this case, nominal repetition may appear in 16 successive slots as indicated by reference numeral 1701. Thereafter, the UE may determine a symbol configured as a downlink system in each nominal repetition 1701 as an invalid symbol. Further, the UE may determine that symbols configured as 1 in an invalid symbol pattern 1702 are invalid symbols. When valid symbols other than the invalid symbol in each nominal repetition includes one or more successive symbols in one slot, the valid symbols may be configured as actual repetition and transmitted as indicated by reference number 1703.

Further, for PUSCH repetitive transmission, the following additional methods may be defined for UL grant-based PUSCH transmission and configured grant-based PUSCH transmission beyond the slot boundary in NR Release 16.

Method 1 (mini-slot level repetition): two or more PUSCH repetitive transmissions within one slot or beyond the boundary of successive slots may be scheduled through one UL grant. Further, in method 1, time domain resource allocation information within DCI may indicate resources of first repetitive transmission. In addition, time domain resource information of the remaining repetitive transmissions may be determined according to the domain resource information of first repetitive transmission and an uplink or downlink direction determined for each symbol. Each repetitive transmission may occupy successive symbols.

Method 2 (multi-segment transmission): two or more PUSCH repetitive transmissions may be scheduled in successive slots through one UL grant. At this time, one transmission is designated for each slot, and start points or repetition lengths may vary depending on each transmission. Further, in method 2, time domain resource allocation information within DCI may indicate a start point and a repetition length of all repetitive transmissions. When repetitive transmission is performed within a single slot through method 2 and there are sets of successive uplink symbols within the corresponding slot, each repetitive transmission may be performed for each uplink symbol set. If there is only one set of successive uplink symbols within the corresponding slot, one PUSCH repetitive transmission may be performed according to the method of NR Release 15.

Method 3: two or more PUSCH repetitive transmissions are scheduled in successive slots through two or more UL grants. At this time, one transmission is designated for each slot, and an $n^{th}$ UL grant may be received before PUSCH transmission scheduled by an $(n-1)^{th}$ UL grant ends.

Method 4: one or a plurality of PUSCH repetitive transmissions may be supported within a signal slot or two or more PUSCH repetitive transmissions may be supported over boundaries of successive slots through one UL grant or one configured grant. The number of repetitions which the BS indicates to the UE is only a nominal value, and the number of PUSCH repetitive transmissions which the UE actually performs may be larger than the nominal number of repetitions. Time domain resource allocation information within the DCI or the configured grant may be resources of the first repetitive transmission indicated by the BS. Time domain resource information of the remaining repetitive transmissions may be determined with reference to resource information of the first repetitive transmission and uplink or downlink directions of symbols. If the time domain resource information of repetitive transmission indicated by the BS is over the slot boundary or includes an uplink/downlink switching point, the corresponding repetitive transmission may be divided into a plurality of repetitive transmissions. At this time, one repetitive transmission may be included for each uplink period in one slot.

PUSCH: Frequency Hopping Process

Hereinafter, frequency hopping of an uplink data channel (physical uplink shared channel (PUSCH)) in a 5G system is described below.

In 5G, two methods may be supported for each PUSCH repetitive transmission type as the frequency hopping method of the uplink data channel. First, intra-slot frequency hopping and inter-slot frequency hopping may be supported in the PUSCH repetitive transmission type A, and inter-repetition frequency hopping and inter-slot frequency hopping may be supported in the PUSCH repetitive transmission type B. Of course, the disclosure is not limited to the example.

The intra-slot frequency hopping method supported in the PUSCH repetitive transmission type A may include a method of changing allocated resources in the frequency domain by a configured frequency offset in two hops within one slot to perform transmission. In intra-slot frequency hopping, a start RB of each hop may be indicated through Equation 5.

$$RB_{start}(i) = \begin{cases} RB_{start} & i = 0 \\ (RB_{start} + RB_{offset}) \bmod N_{BWP}^{size} & i = 1 \end{cases} \quad \text{Equation 5}$$

In Equation 5, i=0 and i=1 denote a first hop and a second hop, and $RB_{start}$ denotes a start RB in an UL BWP and is calculated by a frequency resource allocation method. $RB_{offset}$ denotes a frequency offset between two hops through a higher-layer parameter. The number of symbols of the first hop may be indicated as $$\lfloor N_{symb}^{PUSCH,s}/2 \rfloor,$$

and the number of symbols of the second hop may be indicated as $$N_{symb}^{PUSCH,s} - \lfloor N_{symb}^{PUSCH,s}/2 \rfloor \cdot N_{symb}^{PUSCH,s}$$

denotes the length of PUSCH transmission within one slot and indicated by the number of OFDM symbols.

Subsequently, the inter-slot frequency hopping method supported in the PUSCH repetitive transmission types A and B is a method by which the UE changes allocated resources in the frequency domain by a frequency offset in every slot to perform transmission. In inter-slot frequency hopping, a start RB during $$n_s^{\mu}$$

slots may be indicated through Equation 6.

$$RB_{start}(n_s^{\mu}) = \begin{cases} RB_{start} & n_s^{\mu} \bmod 2 = 0 \\ (RB_{start} + RB_{offset}) \bmod N_{BWP}^{size} & n_s^{\mu} \bmod 2 = 1 \end{cases} \quad \text{Equation 6}$$

In Equation 6, $$n_s^{\mu}$$

denotes a current slot number in multi-slot PUSCH transmission, and $$RB_{start}$$

denotes a start RB in an UP BWP and may be calculated by a frequency resource allocation method.

$$RB_{offset}$$

may indicate a frequency offset between two hops through a higher-layer parameter.

Subsequently, the inter-repetition frequency hopping method supported in the PUSCH repetitive transmission type B may be a method of moving allocated resources in the frequency domain by a configured frequency offset to perform transmission for one or a plurality of actual repetitions within each nominal repetition. For one or a plurality of actual repetitions within an $n^{th}$ nominal repetition, $RB_{start}(n)$ which is an index of the start RB in the frequency domain may follow Equation 7 below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{Equation 7}$$

In Equation 7, n denotes an index of nominal repetition, and $$RB_{offset}$$

denotes an RB offset between two hops through a higher-layer parameter.

Related to UE Capability Report

In LTE and NR, the UE may perform a procedure of reporting a capability supported by the UE to the corresponding BS in the state in which the UE is connected to a serving BS. In the following description, this is referred to as a UE capability report.

The BS may transmit a UE capability enquiry message that makes a request for a capability report to the UE in the connected state. The UE capability enquiry message may include a UE capability request for each radio access technology (RAT) type of the BS. The UE capability request for each RAT type may include supported frequency band combination information. In the case of the UE capability enquiry message, a plurality of UE capabilities for each of a plurality of RAT types may be requested through one RRC message container transmitted by the BS or the BS may insert the UE capability enquiry message including the UE capability request for each RAT type multiple times and transmit the same to the UE. For example, the UE capability enquiry is repeated within one message multiple times and the UE may configure a UE capability information message corresponding thereto and report the same multiple times. In the next-generation mobile communication system, a UE capability request for NR, LTE, E-UTRA-NR dual connectivity (EN-DC), and multi-RAT dual connectivity (MR-DC) may be made. Further, the UE capability enquiry message may be transmitted initially after the connection between the UE and the BS but may be requested in any condition when the BS needs it.

According to an embodiment, the UE receiving the request for the UE capability report from the BS may configure a UE capability according to RAT type and band information requested by the BS. A method by which the UE configures the UE capability in the NR system is described below.

1. If the UE receives a list of LTE and/or NR bands from the BS through a UE capability request, the UE may configure a band combination (BC) for EN-DC and NR stand alone (SA). For example, the UE may configure a candidate list of BCs for EN-DC and NR SA based on requested bands in FreqBandList. Further, priorities of the bands may be sequentially assigned as stated in FreqBandList.

2. If the BS sets a "eutra-nr-only" flag or a "eutra" flag and makes a request for the UE capability report, the UE may completely remove NR SA BCs from the configured candidate list of BCs. Such an operation may occur only when the LTE BS (eNB) makes a request for a "eutra" capability.

3. Thereafter, the UE may remove fallback BCs from the candidate list of BCs configured in the above operation. The fallback BC is a BC which can be obtained by removing a band corresponding to at least one SCell from a predetermined BC, and a BC before the removal of the band corresponding at least one SCell can cover the fallback BC and thus the fallback BC can be omitted. This operation may be applied to MR-DC, that is, LTE bands. BCs left after the operation may be a final "candidate BC list".

4. The UE may select BCs suitable for a requested RAT type in the final "candidate BC list" and selects BCs to be reported. In this operation, the UE may configure supportedBandCombinationList according to a determined order. For example, the UE may configure BCs and UE capability to be reported according to an order of a preset rat-Type (nr→eutra-nr→eutra). Further, the UE configures featureSetCombination for the configured supportedBandCombinationList and configures a list of "candidate feature set combination" in a candidate BC list from which a list for fallback BCs (including capability at the same or lower stage) is received. The "candidate feature set combination" may include all feature set combinations for NR and EUTRA-NR BCs, and may be acquired from a feature set combination of UE-NR-Capabilities and UE-MRDC-Capabilities containers.

5. If the requested rat Type is eutra-nr and influences, featureSetCombinations may be included in all of the two containers of UE-MRDC-Capabilities and UE-NR-Capabilities. However, the NR feature set may include only UE-NR-Capabilities.

After configuring the UE capability, the UE may transfer a UE capability information message including the UE capability to the BS. The BS may perform scheduling for the corresponding UE and transmission/reception management based on the UE capability received from the UE.

3GPP RAN1 is a scheme of reducing transmission/reception load of control information used for beam control and simplifying the operations of the UE and the BS to reduce total complexity and may define the use of a common beam, and the common beam may be operated by designated a common TCI state.

In the use of the common beam, the BS may transmit information on beams commonly used for transmission/reception of one or more channels or signals in the form of a TCI index and a TCI state, and accordingly, the BS may perform beam control through the transmission of beam control information smaller than the number of channels or signals which should be transmitted/received by the UE.

The UE may acquire information on the TCI state from the received beam control information and, when the acquired TCI state value is different from the common state value which the UE remembers, may change the common TCI value to the acquired TCI state value and transmit an Ack signal to the BS, so as to inform the BS that the TCI state value is successively received. According to an embodiment of the disclosure, the received common TCI state value may be applied to transmission/reception of the channel and signal between the UE and the BS thereafter.

FIG. 18 illustrates a scheme for controlling transmission/reception beams of channels or signals based on the common TCI state according to an embodiment of the disclosure.

Referring to FIG. 18, a UE 1805 may perform communication through one transmission/reception node. Accordingly, the UE 1805 may receive information on one beam through one TCI state information. For example, as illustrated in FIG. 18, a BS 1801 may schedule a PDSCH channel through one PDCCH and perform beam control for PDSCH channel reception and PUCCH channel transmission through one TCI state value (TCI=2) (common TCI state value).

Further, when the BS 1801 provides a new TCI state value (TCI=n) and the new TCI state value (TCI=n) is different from the common TCI state value (TCI=2) stored in the UE, the UE 1805 may change the stored common TCI state value (TCI=2) to the new TCI state value (TCI=2) and transmit the Ack signal to the BS 1801, and thus inform the BS 1801 that the TCI state value is successfully received.

The received new TCI state value (TCI=n) can be applied after a predetermined beam application time after the TCI state value is changed and the Ack is transmitted to the BS 1801.

FIG. 19 illustrates a method of providing information on a plurality of beams through a plurality of pieces of TCI information according to an embodiment of the disclosure.

Referring to FIG. 19, when a UE 1905 performs communication through multiple transmission and reception nodes, communication between the UE 1905 and each node may be performed through a different beam, and accordingly, the UE may receive the information on the plurality of beams through the plurality of pieces of TCI state information. For example, referring to FIG. 19, when a first BS 1901 and a second BS 1903 schedules reception of two PDSCHs 1920 and 1930 through transmission of one PDCCH 1910, the UE 1905 should receive one TCI state value for the reception of the PDCCH 1910 and the first PDSCH 1820 and another TCI state value for the reception of the second PDSCH 1930. Accordingly, multi-node communication may be supported by the common TCI state-based beam control scheme of the related art for performing beam control through one TCI state value.

As described above, when multi-node communication is supported, a TCI state indicated and applied through a scheme which is the same as the common TCI state of the related art is defined as a permanent TCI state (hereinafter, referred to as a P-TCI state) and another TCI state which can be more rapidly applied to the beam control is defined as a temporary TCI state (hereinafter, referred to as a T-TCI state). As illustrated in FIG. 19, when communication is performed through multiple transmission and reception nodes, the UE may receive information on a plurality of beams through a plurality of pieces of TCI state information. At this time, the plurality of pieces of TCI state information may include both the P-TCI state and the T-TCI state, and the UE may communication with different BSs through the P-TCI state and the T-TCI state. More specifically, as illustrated in FIG. 19, when the first BS 1901 schedules reception of two PDSCHs 1920 and 1930 through transmission of one PDCCH 1910, beams used for the reception of the PDCCH 1910 and the first PDSCH 1920 may be indicated through the P-TCI, and the beam used for the reception of the second PDSCH 1930 may be indicated through the T-TCI state.

FIG. 20 illustrates an operation of changing the P-TCI state according to an embodiment of the disclosure.

When the UE receives a TCI state or a TCI state index indicating the P-TCI state, if the received TCI state value is different from the P-TCI state value stored in the UE, the UE may change the P-TCI state value to the indicated TCI state value and transmit an Ack signal to the BS, so as to inform the BS that the TCI state value is successfully received. The received new TCI state value can be applied to transmission and reception of channels and signals after a predetermined beam application time after the P-TCI state value is changed to and Ack is transmitted to the BS.

Referring to FIG. 20, the UE may receive a PDCCH 2010 through the stored P-TCI state value (TCI=0) 2001 of the related art and receive a new TCI state value (TCI=1) 2002. Since there is difference between the new TCI state value (TCI=1) 2002 and the stored P-TCI state value (TCI=0) of the related art, the UE changes the P-TCI state value to the new TCI state value (TCI=1) 2002. Thereafter, the UE may transmit the Ack signal to the BS through the PUCCH 2020 to inform the UE that the TCI state value is successfully received.

The received changed P-TCI state value (TCI=1) 2002 can be applied after a predetermined beam application time after the TCI state value is changed and the Ack is transmitted to the BS 1801.

FIG. 21 illustrates an operation of changing a T-TCI state according to an embodiment of the disclosure.

When the UE receives a TCI index or a TCI state indicating a T-TCI state through control information, the UE performs the beam control for transmission/reception of channels or signals controlled by the control information through the received TCI state value. In the case of a T-TCI state, the UE does not perform Ack transmission for informing of successful reception of the TCI state value. When the UE designates a T-TCI state, the T-TCI state value may be immediately changed after a new TCI state value is received. Further, the UE may operate to not separately store the T-TCI state value.

Referring to FIG. 21, the UE may receive a PDCCH 2110 through the applied T-TCI state value (TCI=0) 2101 of the related art and receive a new TCI state value (TCI=1). Since there is difference between the new TCI state value (TCI=1) 2102 and the applied T-TCI state value (TCI=0) 2101 of the related art, the UE changes the T-TCI state value to the new TCI state value (TCI=1) 2101. At this time, the UE may directly change the T-TCI state value to the new TCI state value (TCI=1) 2102 and apply the changed TCI state value without performing Ack transmission for informing of successful reception of the TCI state value. Accordingly, the new TCI state value (TCI=1) 2102 may be immediately applied to a channel transmitted/received after the PDCCH 2110, for example, the PDSCH/PUCCH 2120.

FIG. 22 illustrates an operation of rapidly changing a communication mode and a communication beam by the mixed use of a P-TCI state and a T-TCI state according to an embodiment of the disclosure.

When the UE simultaneously receives an indication of the P-TCI state and an indication of the T-TCI state through one control information, the TCI state indicating the T-TCI state may be immediately applied to relevant channel or signal transmission/reception and the beam control using the P-TCI state of the related art may be performed for transmission/reception of channels or signals related to the TCI state indicating the P-TCI state, but the P-TCI state value may be changed and applied according to the procedure illustrated in FIG. 20.

When the UE receives the TCI-state through control information indicating channel or signal transmission/reception and the TCI state indicates the P-TCI state, the UE may determine that the use of a beam corresponding to the P-TCI state is indicated for the channel and signal transmission/reception. When the TCI state indicates the T-TCI state, the UE may determine that the indicated TCI state is applied to channel and signal transmission/reception.

When the number of received TCI states is plural and both the indication for the P-TCI state and the indication for the T-TCI state are transmitted, the UE may determine that both the indication for the P-TCI state and the indication for the T-TCI state are applied to transmission/reception of a plurality of channels and signals indicated by the control information. For example, the beam control through the P-TCI may be performed for some of the channels or signals indicated to be transmitted/received through control information, and the beam control by the TCI state indicating the T-TCI may be performed for other channels or signals.

As described above, by the type of the TCI state and the number of TCI states transmitted by the control information indicating transmission/reception of channels or signals, the UE may acquire information indicating whether transmission/reception of the channels and signals indicated by the control information is transmission/reception through a single node communication scheme or transmission/reception through a multi-node communication scheme. Further, the UE may acquire information indicating whether transmission/reception through one of the multiple nodes is indicated. The information is secured through reception of the control information, and the beam can be rapidly controlled and changed through the use of the T-TCI state, and as a result, rapid switching between the single node scheme and the multi-node scheme may be supported.

FIG. 22 illustrates a case in which, when a BS indicates PUSCH transmission through signal node and multi-node schemes, rapid beam conversion and scheme switch using a P-TCI state and a T-TCI state are performed according to an embodiment of the disclosure.

Referring to FIG. 22, a UE 2205 communicate with a first TRP 2201 and a second TRP 2202. Three values {0, 1, 2} can be used as a TCI state value in communication through the first TRP 2201, and three values {3, 4, 5} can be used as a TCI state value in communication through the second TRP 2202. The UE starts communication from the first TRP 2201 by using a CI state value of 0 (TCI=0). At this time, the UE receives a new TCI state value from the first TRP 2201 through a PDCCH 2211. The new TCI state value includes a TCI state value (TCI=2) indicating a P-TCI and a TCI state value (TCI=3) indicating a T-TCI. Since the P-TCI state value (TCI=0) of the related art is used for PDCCH reception and a new P-TCI state is indicated, the UE performs first PDSCH reception 2212 through the P-TCI state value (TCI=0). Further, since the T-TCI state value is indicated, the UE perform second PDSCH reception 2231 by using the indicated T-TCI state value 3 (TCI=3). For example, since a TCI state value of 2 which can be applied to first TRP communication and a TCI state value of 3 which can be applied to second TRP communication are simultaneously indicated, the UE performs PDSCH reception through the two TRPs, but a newly indicated T-TCI value of 3 (TCI=3) is immediately applied but a newly indicated P-TCI value of 2 (TCI=2) is not applied before a P-TCI update. After Ack 2213 is transmitted to the first TRP 2201, the P-TCI state value is changed to the indicated new P-TCI state value of 2 (TCI=2), and the TCI state value of 2 (TCI=2) changed after a predetermined beam application time is applied to transmission/reception of channels and signals 2221 and 2222.

Thereafter, the UE receives a new TCI state value from the first TRP 2241 through a PDCCH 2241. Reception of the PDCCH is performed through the P-TCI state value of 2 (TCI=2), and the new TCI state value includes a TCI state value (TCI=4) indicating the T-TCI. The TCI state value of 4 (TCI=4) is a value configured to the second TRP 2202, and thus may be applied to communication with the second TRP 2202. Accordingly, for the second TRP 2202, the T-TCI state is changed to the TCI state value of 4 (TCI=4) and immediately applied to transmission/reception of the channel and signal 2251.

Thereafter, the UE receives a new TCI state value from a first TRP 2261 through a PDCCH 2241. Reception of the PDCCH is performed through the P-TCI state value of 2 (TCI=2), and the new TCI state value includes a TCI state value (TCI=1) indicating the P-TCI. The TCI state value of 1 (TCI=1) is a value configured in the first TRP 2201, and thus the UE communicates with the first TRP 2201. The UE performs PDSCH reception using the P-TCI state value of 2 (TCI=2) of the related art and changes the P-TCI state value to the indicated TCI state value of 1 (TCI=1) after the Ack 2263 is transmitted to the first TRP 2201. The TCI state value of 1 (TCI=1) changed after a predetermined beam application time is applied to channel and signal transmission/reception.

FIG. 22 illustrates a PDSCH transmission, but a same scheme can be applied to PDCCH, PUSCH, and PUCCH transmission as well as the PDSCH according to an embodiment of the disclosure.

Referring to FIG. 22, in an embodiment, when the UE applies a TCI state indicated by downlink control information (DCI) to channel or signal transmission/reception, the UE may define and perform different procedures according to the indicated TCI state or the type of the indicated TCI state, for example, the P-TCI state or the T-TCI state. The UE may simultaneously receive indications for TCI states to which different procedures are applied through one DCI. At this time, the UE may apply TCI states to which different procedures are applied at different times.

In an embodiment, after receiving an indication for a TCI state with respective to some TCI states or TCI states of some types, the UE may perform a procedure of reporting whether the reception is successful to a BS or a node, and then apply the indicated TCI state to channel or signal transmission/reception.

In an embodiment, after receiving an indication for a TCI state with respective to some TCI states or TCI states of some types, the UE may apply the TCI state indicated by transmission or reception of the channel or signal of which reception or transmission is indicated by control information indicating the TCI state without performing the process of reporting whether the reception is successful.

FIG. 23 illustrates a configuration of a UE according to an embodiment of the disclosure.

Referring to FIG. 23, the UE may include a transceiver referring to a UE receiver 2301 and a UE transmitter 2302, a memory (not shown), and a UE processor 2303 (or a UE controller or a processor). According to the communication method of the UE, the transceiver 2301 and 2302 of the UE, the memory, and the UE processor 2303 may operate. However, the elements of the UE are not limited to the above example. For example, the UE may include more or fewer elements than the above elements. Further, the UE processor 2303, the UE transmitter 2302, the UE receiver 2301, and the memory may be implemented in the form of one chip. The transceiver may transmit and receive a signal to and from the BS. The signals may include control information and data. To this end, the transceiver may include a radio frequency (RF) transmitter for up-converting and amplifying a frequency of the transmitted signal and an RF receiver for low-noise amplifying the received signal and down-converting the frequency. However, this is only an embodiment of the transceiver, and the elements of the transceiver are not limited to the RF transmitter and the RF receiver. Further, the transceiver may receive a signal through a radio channel, output the signal to the processor, and transmit the signal output from the processor through the radio channel.

The memory may store a program and data required for the operation of the UE. Further, the memory may store control information or data included in the signal transmitted and received by the UE. The memory may be configured by storage media, such as read only memory (ROM), random access memory (RAM), hard disk, a compact disc (CD)-ROM, and digital versatile disc (DVD), or a combination of the storage media. The number of memories may be plural and may store instructions for performing the communication method.

The UE processor 2303 may control a series of processes to allow the UE to operate according to the embodiments. The number of UE processors 2303 may be plural, and the UE processor 2303 may perform an operation of controlling the UE elements by executing a program stored in the memory.

FIG. 24 illustrates a configuration of a BS according to an embodiment of the disclosure.

Referring to FIG. 24, a transceiver referring to a BS receiver 2401 and a BS transmitter 2402, a memory (not shown), and a BS processor 2403 (or a BS controller or a processor) may be included. According to the communication method of the BS, the BS transceiver 2401 and 2402 of the BS, the memory, and the BS processor 2403 may operate. However, the elements of the BS are not limited to the above example. For example, the BS may include more or fewer elements than the above-described elements. Further, the BS transmitter 2401, the BS receiver 2403, the memory, and the BS processor 2403 may be implemented in the form of one chip. According to an embodiment of the disclosure, the BS may include a transmission and reception point (TRP).

The transceiver may transmit and receive a signal to/from the UE. The signals may include control information and data. To this end, the transceiver may include an RF transmitter for up-converting and amplifying a frequency of the transmitted signal and an RF receiver for low-noise amplifying the received signal and down-converting the frequency. However, this is only an example of the transceiver, and elements of the transceiver are not limited to the RF transmitter and the RF receiver. The transceiver may receive a signal through a radio channel, output the signal to the processor, and transmit the signal output from the processor through the radio channel.

The memory may store a program and data required for the operation of the BS. The memory may store control information or data included in a signal transmitted and received by the BS. The memory may be configured by storage media, such as ROM, RAM, hard disc, CD-ROM, and DVD, or a combination of the storage media. The number of memories may be plural, and may store instructions for performing the communication method.

The BS processor 2403 may control a series of processes to allow the BS to operate according to the embodiments of the disclosure. The number of BS processors 2403 may be plural, and the BS processor 2403 may perform an operation of controlling the BS elements by executing a program stored in the memory.

The methods according to the embodiments described in the claims or the above specification may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification.

Such a program (software module, software) may be stored to a random access memory, a non-volatile memory including a flash memory, a ROM, an electrically erasable programmable ROM (EEPROM), a magnetic disc storage device, a CD-ROM, DVD or other optical storage device, and a magnetic cassette. Alternatively, it may be stored to a memory combining part or all of those recording media. A plurality of memories may be included.

In addition, the program may be stored in an attachable storage device accessible via a communication network, such as Internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

Meanwhile, the embodiments of the disclosure described in the specification and the drawings merely present specific examples to easily explain the technical contents of the disclosure and help understanding of the disclosure, and are not intended to limit the scope of the disclosure. For example, it will be apparent to those skilled in the art that other variants based on the technical idea of the disclosure may be implemented. In addition, the above respective embodiments may be employed in combination, as necessary. For example, one embodiment of the disclosure may be partially combined with another embodiment to operate the base station and the terminal. For example, the first embodiment and the second embodiment of the disclosure may be partially combined to operate the base station and the terminal. In addition, although the above embodiments have been described by way of the FDD LTE system, other variants based on the technical idea of the embodiments may be implemented in other systems, such as TDD LTE and 5G or NR systems.

In the drawings for explaining the method of the disclosure, the order of description does not necessarily correspond to the execution order, and the precedence relationship may be changed or may be executed in parallel.

Alternatively, in the drawings explaining the method of the disclosure, some components may be omitted and only some elements may be included therein without departing from the essential spirit and the scope of the disclosure.

Further, the method of the disclosure may be fulfilled by combining some or all of the contents of each embodiment without departing from the essential spirit and the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a user equipment (UE) in a wireless communication system, the method comprising:
   receiving, from a first transmission reception point, TRP, a configuration information for a plurality of transmission configuration indicator (TCI) state including a common TCI state for a control resource set (CORESET), and physical downlink shared channel, PDSCH, for the first TRP, and a TCI state for a PDSCH for a second TRP;
   receiving, from the first TRP, a first downlink control information (DCI), via a physical downlink control channel (PDCCH), the first DCI including information indicating a first TCI state for the first TRP and a second TCI state for the second TRP;
   transmitting, to the first TRP, a first acknowledgement (ACK) indicating successful reception of the first TCI state and the second TCI state;
   receiving, from the first TRP, a second DCI based on the first TCI state via the PDCCH, the second DCI including information indicating a third TCI state for the first TRP and a fourth TCI state for the second TRP; and
   receiving, from the second TRP, the PDSCH based on the fourth TCI state without transmitting a second ACK indicating successful reception of the third TCI state and the fourth TCI state to the first TRP.

2. The method of claim 1, further comprising:
   applying a TCI state TRP from the first TCI state to the third TCI state after transmitting the second ACK to the first TRP.

3. The method of claim 2, wherein the third TCI state is applied after a beam application time.

4. The method of claim 1,
   wherein TCI state for the first TCI state is a permanent type TCI state, P-TCI state, and
   wherein TCI state for the second TCI state is a temporary type TCI state, TPT-TCI state.

5. A method of a base station in a wireless communication system, the method comprising:
   transmitting, to a user equipment (UE), via a first transmission reception point, TRP, a configuration information for a plurality of transmission configuration indicator (TCI) state including a common TCI state for a control resource set (CORESET), and physical downlink shared channel, PDSCH, for the first TRP, and a TCI state for a PDSCH for a second TRP;
   transmitting, to the UE via the first TRP, a first downlink control information (DCI), via a physical downlink control channel (PDCCH), the first DCI including information indicating a first TCI state for the first TRP and a second TCI state for the second TRP;

receiving, from the UE via the first TRP, a first acknowledgement (ACK) indicating successful reception and of the first TCI state and the second TCI state;

transmitting, to the UE via the first TRP, a second DCI based on the first TCI state via the PDCCH, the second DCI including information indicating a third TCI state for the first TRP and a fourth TCI state for the second TRP; and transmitting, to the UE via the second TRP, the PDSCH based on the fourth TCI state without receiving a second ACK indicating successful reception of the third TCI state and the fourth TCI state from the first TRP.

6. The method of claim 5, wherein a TCI state for the first TRP from the first TCI state to the third TCI state is applied after receiving the second ACK from the first TRP.

7. The method of claim 6, wherein the third TCI state is applied after a beam application time.

8. The method of claim 5, wherein TCI state of for the first TCI state is a permanent type TCI state, P-TCI state, and wherein TCI state of for the second TCI state is a temporary type TCI state, TPT-TCI state.

9. A user equipment (UE) in a wireless communication system, the UE comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a first transmission reception point, TRP, a configuration information for a plurality of transmission configuration indicator (TCI) state including a common TCI state for a control resource set (CORESET), and physical downlink shared channel, PDSCH, for the first TRP, and a TCI state for a PDSCH for a second TRP, receive, from the first TRP, a first downlink control information (DCI), via a physical downlink control channel (PDCCH), the first DCI including information indicating a first TCI state for the first TRP and a second TCI state for the second TRP, transmit, to the first TRP, a first acknowledgement (ACK) indicating successful reception of the first TCI state and the second TCI state, receive, from the first TRP, a second DCI based on the first TCI state via the PDCCH, the second DCI including information indicating a third TCI state for the first TRP and a fourth TCI state for the second TRP, and receive, from the second TRP, the PDSCH based on the fourth TCI state without transmitting a second ACK indicating successful reception of the third TCI state and the fourth TCI state to the first TRP.

10. The UE of claim 9, wherein the instructions further cause the UE to apply a TCI state for the first TRP from the first TCI state to the third TCI state after transmitting the second ACK to the first TRP.

11. The UE of claim 10, wherein the third TCI state is applied after a beam application time.

12. The UE of claim 9, wherein TCI state of for the first TCI state is a permanent type TCI state, P-TCI state, and wherein TCI state for the second TCI state is a temporary type TCI state, TPT-TCI state.

13. A base station in a wireless communication system, the base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a user equipment (UE), via a first transmission reception point, TRP, a configuration information for a plurality of transmission configuration indicator (TCI) state including a common TCI state for a control resource set (CORESET), and physical downlink shared channel, PDSCH, for the first TRP, and a TCI state for a PDSCH for a second TRP, transmit, to the UE via the first TRP, a first downlink control information (DCI), via a physical downlink control channel (PDCCH), the first DCI including information indicating a first TCI state for the first TRP and a second TCI state for the second TRP, receive, from the UE via the first TRP, a first acknowledgement (ACK) indicating successful reception of the first TCI state and the second TCI state, transmit, to the UE via the first TRP, a second DCI based on the first TCI state via the PDCCH, the second DCI including information indicating a third TCI state for the first TRP and a fourth TCI state for the second TRP, and transmit, to the UE via the second TRP, the PDSCH based on the fourth TCI state without receiving a second ACK indicating successful reception of the third TCI state and the fourth TCI state from the first TRP.

14. The base station of claim 13, wherein a TCI state for the first TRP from the first TCI state to the third TCI state is applied after receiving the second ACK from the first TRP.

15. The base station of claim 14, wherein the third TCI state is applied after a beam application time.

16. The base station of claim 13, wherein TCI state of for the first TCI state is a permanent type TCI state, P-TCI state, and wherein TCI state for the second TCI state is a temporary type TCI state, TPT-TCI state.

* * * * *